United States Patent
Smayling et al.

(10) Patent No.: US 8,667,443 B2
(45) Date of Patent: Mar. 4, 2014

(54) INTEGRATED CIRCUIT CELL LIBRARY FOR MULTIPLE PATTERNING

(75) Inventors: Michael C. Smayling, Fremont, CA (US); Scott T. Becker, Scotts Valley, CA (US)

(73) Assignee: Tela Innovations, Inc., Los Gatos, CA (US)

( * ) Notice: Subject to any disclaimer, the term of this patent is extended or adjusted under 35 U.S.C. 154(b) by 1173 days.

(21) Appl. No.: 12/041,584

(22) Filed: Mar. 3, 2008

(65) Prior Publication Data

US 2008/0222587 A1  Sep. 11, 2008

Related U.S. Application Data

(60) Provisional application No. 60/892,982, filed on Mar. 5, 2007.

(51) Int. Cl.
*G06F 17/50* (2006.01)
(52) U.S. Cl.
USPC .............................. 716/119; 716/122; 716/50
(58) Field of Classification Search
USPC .............................................. 716/52, 53, 125
See application file for complete search history.

(56) References Cited

U.S. PATENT DOCUMENTS

| | | | |
|---|---|---|---|
| 4,197,555 A | 4/1980 | Uehara et al. | |
| 4,417,161 A | 11/1983 | Uya | |
| 4,424,460 A | 1/1984 | Best | |
| 4,613,940 A | 9/1986 | Shenton et al. | |
| 4,657,628 A | 4/1987 | Holloway et al. | |
| 4,682,202 A | 7/1987 | Tanizawa | |
| 4,745,084 A | 5/1988 | Rowson et al. | |
| 4,780,753 A | 10/1988 | Ohkura et al. | |
| 4,801,986 A | 1/1989 | Chang et al. | |
| 4,804,636 A | 2/1989 | Groover, III | |
| 4,812,688 A | 3/1989 | Chu et al. | |
| 4,884,115 A | 11/1989 | Michel et al. | |
| 4,928,160 A | 5/1990 | Crafts | |
| 4,975,756 A | 12/1990 | Haken et al. | |
| 5,068,603 A | 11/1991 | Mahoney | |

(Continued)

FOREIGN PATENT DOCUMENTS

| | | |
|---|---|---|
| EP | 0102644 | 7/1989 |
| EP | 0788166 | 8/1997 |

(Continued)

OTHER PUBLICATIONS

U.S. Appl. No. 60/625,342, filed May 25, 2006, Pileggi et al.

(Continued)

*Primary Examiner* — Leigh Garbowski
(74) *Attorney, Agent, or Firm* — Martine Penilla Group, LLP

(57) ABSTRACT

A method is disclosed for defining a multiple patterned cell layout for use in an integrated circuit design. A layout is defined for a level of a cell in accordance with a dynamic array architecture so as to include a number of layout features. The number of layout features are linear-shaped and commonly oriented. The layout is split into a number of sub-layouts for the level of the cell. Each of the number of layout features in the layout is allocated to any one of the number of sub-layouts. Also, the layout is split such that each sub-layout is independently fabricatable. The sub-layouts for the level of the cell are stored on a computer readable medium.

26 Claims, 19 Drawing Sheets

(56) References Cited

U.S. PATENT DOCUMENTS

| | | | |
|---|---|---|---|
| 5,079,614 A | 1/1992 | Khatakhotan | |
| 5,097,422 A | 3/1992 | Corbin et al. | |
| 5,117,277 A | 5/1992 | Yuyama et al. | |
| 5,121,186 A | 6/1992 | Wong et al. | |
| 5,208,765 A | 5/1993 | Turnbull | |
| 5,224,057 A | 6/1993 | Igarashi | |
| 5,242,770 A | 9/1993 | Chen et al. | |
| 5,268,319 A | 12/1993 | Harari | |
| 5,298,774 A | 3/1994 | Ueda et al. | |
| 5,313,426 A | 5/1994 | Sakuma et al. | |
| 5,351,197 A | 9/1994 | Upton et al. | |
| 5,359,226 A | 10/1994 | DeJong | |
| 5,365,454 A | 11/1994 | Nakagawa et al. | |
| 5,367,187 A | 11/1994 | Yuen | |
| 5,378,649 A | 1/1995 | Huang | 437/52 |
| 5,396,128 A | 3/1995 | Dunning et al. | |
| 5,420,447 A | 5/1995 | Waggoner | |
| 5,461,577 A | 10/1995 | Shaw et al. | |
| 5,471,403 A | 11/1995 | Fujimaga | |
| 5,497,334 A | 3/1996 | Russell et al. | |
| 5,497,337 A | 3/1996 | Ponnapalli et al. | |
| 5,526,307 A | 6/1996 | Lin et al. | |
| 5,536,955 A | 7/1996 | Ali | |
| 5,545,904 A | 8/1996 | Orbach | |
| 5,581,098 A | 12/1996 | Chang | 257/211 |
| 5,581,202 A | 12/1996 | Yano et al. | |
| 5,612,893 A | 3/1997 | Hao et al. | |
| 5,636,002 A | 6/1997 | Garofalo | |
| 5,656,861 A | 8/1997 | Godinho et al. | |
| 5,682,323 A | 10/1997 | Pasch et al. | 364/491 |
| 5,684,311 A | 11/1997 | Shaw | |
| 5,684,733 A | 11/1997 | Wu et al. | 365/100 |
| 5,698,873 A | 12/1997 | Colwell et al. | |
| 5,705,301 A | 1/1998 | Garza et al. | |
| 5,723,883 A | 3/1998 | Gheewalla | |
| 5,723,908 A | 3/1998 | Fuchida et al. | |
| 5,740,068 A | 4/1998 | Liebmann et al. | |
| 5,745,374 A | 4/1998 | Matsumoto | |
| 5,764,533 A | 6/1998 | deDood | |
| 5,774,367 A | 6/1998 | Reyes et al. | |
| 5,780,909 A | 7/1998 | Hayashi | |
| 5,789,776 A | 8/1998 | Lancaster et al. | |
| 5,790,417 A | 8/1998 | Chao et al. | |
| 5,796,128 A | 8/1998 | Tran et al. | |
| 5,796,624 A | 8/1998 | Sridhar et al. | |
| 5,814,844 A | 9/1998 | Nagata et al. | |
| 5,825,203 A | 10/1998 | Kusunoki et al. | 326/41 |
| 5,834,851 A | 11/1998 | Ikeda et al. | |
| 5,838,594 A | 11/1998 | Kojima | |
| 5,841,663 A | 11/1998 | Sharma et al. | 364/490 |
| 5,847,421 A | 12/1998 | Yamaguchi | 257/207 |
| 5,850,362 A | 12/1998 | Sakuma et al. | |
| 5,852,562 A | 12/1998 | Shinomiya et al. | |
| 5,858,580 A | 1/1999 | Wang et al. | |
| 5,898,194 A | 4/1999 | Gheewala | 257/206 |
| 5,900,340 A | 5/1999 | Reich et al. | |
| 5,908,827 A | 6/1999 | Sirna | 514/12 |
| 5,915,199 A | 6/1999 | Hsu | |
| 5,917,207 A | 6/1999 | Colwell et al. | |
| 5,920,486 A | 7/1999 | Beahm et al. | |
| 5,923,059 A | 7/1999 | Gheewala | 257/204 |
| 5,923,060 A | 7/1999 | Gheewala | |
| 5,929,469 A | 7/1999 | Mimoto et al. | |
| 5,930,163 A | 7/1999 | Hara et al. | |
| 5,935,763 A | 8/1999 | Caterer et al. | 430/313 |
| 5,949,101 A | 9/1999 | Aritome | |
| 5,973,507 A | 10/1999 | Yamazaki | |
| 5,977,305 A | 11/1999 | Wigler et al. | 530/350 |
| 5,977,574 A | 11/1999 | Schmitt et al. | |
| 5,998,879 A | 12/1999 | Iwaki et al. | |
| 6,009,251 A | 12/1999 | Ho et al. | |
| 6,026,223 A | 2/2000 | Scepanovic et al. | |
| 6,037,613 A | 3/2000 | Mariyama | |
| 6,037,617 A | 3/2000 | Kumagai | |
| 6,044,007 A | 3/2000 | Capodieci | |
| 6,054,872 A | 4/2000 | Fudanuki et al. | |
| 6,063,132 A | 5/2000 | DeCamp et al. | |
| 6,077,310 A | 6/2000 | Yamamoto et al. | |
| 6,080,206 A | 6/2000 | Tadokoro et al. | |
| 6,084,437 A | 7/2000 | Sako | |
| 6,091,845 A | 7/2000 | Pierrat et al. | |
| 6,099,584 A | 8/2000 | Arnold et al. | |
| 6,100,025 A | 8/2000 | Wigler et al. | 435/6 |
| 6,114,071 A | 9/2000 | Chen et al. | |
| 6,144,227 A | 11/2000 | Sato | |
| 6,166,415 A | 12/2000 | Sakemi et al. | |
| 6,166,560 A | 12/2000 | Ogura et al. | |
| 6,174,742 B1 | 1/2001 | Sudhindranath et al. | 438/14 |
| 6,182,272 B1 | 1/2001 | Andreev et al. | 716/13 |
| 6,194,104 B1 | 2/2001 | Hsu | |
| 6,194,252 B1 | 2/2001 | Yamaguchi | 438/129 |
| 6,194,912 B1 | 2/2001 | Or-Bach | 326/38 |
| 6,209,123 B1 | 3/2001 | Maziasz et al. | |
| 6,230,299 B1 | 5/2001 | McSherry et al. | |
| 6,232,173 B1 | 5/2001 | Hsu et al. | |
| 6,240,542 B1 | 5/2001 | Kapur | 716/12 |
| 6,249,902 B1 | 6/2001 | Igusa et al. | |
| 6,255,600 B1 | 7/2001 | Schaper | 174/255 |
| 6,255,845 B1 | 7/2001 | Wong et al. | |
| 6,262,487 B1 | 7/2001 | Igarashi et al. | |
| 6,269,472 B1 | 7/2001 | Garza et al. | |
| 6,275,973 B1 | 8/2001 | Wein | 716/10 |
| 6,282,696 B1 | 8/2001 | Garza et al. | |
| 6,291,276 B1 | 9/2001 | Gonzalez | |
| 6,297,668 B1 | 10/2001 | Schober | |
| 6,297,674 B1 | 10/2001 | Kono et al. | |
| 6,303,252 B1 | 10/2001 | Lin | |
| 6,331,733 B1 | 12/2001 | Or-Bach et al. | 257/758 |
| 6,331,791 B1 | 12/2001 | Huang | |
| 6,335,250 B1 | 1/2002 | Egi | |
| 6,338,972 B1 | 1/2002 | Sudhindranath et al. | 438/14 |
| 6,347,062 B2 | 2/2002 | Nii et al. | |
| 6,356,112 B1 | 3/2002 | Tran et al. | |
| 6,359,804 B2 | 3/2002 | Kuriyama et al. | |
| 6,370,679 B1 | 4/2002 | Chang et al. | |
| 6,378,110 B1 | 4/2002 | Ho | |
| 6,380,592 B2 | 4/2002 | Tooher et al. | |
| 6,388,296 B1 | 5/2002 | Hsu | |
| 6,393,601 B1 | 5/2002 | Tanaka et al. | |
| 6,399,972 B1 | 6/2002 | Masuda et al. | |
| 6,400,183 B2 | 6/2002 | Yamashita et al. | |
| 6,415,421 B2 | 7/2002 | Anderson et al. | |
| 6,416,907 B1 | 7/2002 | Winder et al. | 430/5 |
| 6,417,549 B1 | 7/2002 | Oh | |
| 6,421,820 B1 | 7/2002 | Mansfield et al. | |
| 6,425,112 B1 | 7/2002 | Bula et al. | |
| 6,425,117 B1 | 7/2002 | Pasch et al. | 716/21 |
| 6,426,269 B1 | 7/2002 | Heffner et al. | |
| 6,436,805 B1 | 8/2002 | Trivedi | |
| 6,445,049 B1 | 9/2002 | Iranmanesh | |
| 6,445,065 B1 | 9/2002 | Gheewala et al. | |
| 6,467,072 B1 | 10/2002 | Yang et al. | |
| 6,469,328 B2 | 10/2002 | Yanai et al. | |
| 6,470,489 B1 | 10/2002 | Chang et al. | |
| 6,476,493 B2 | 11/2002 | Or-Bach et al. | 257/758 |
| 6,477,695 B1 | 11/2002 | Gandhi | |
| 6,480,032 B1 | 11/2002 | Aksamit | |
| 6,480,989 B2 | 11/2002 | Chan et al. | 716/8 |
| 6,492,066 B1 | 12/2002 | Capodieci et al. | |
| 6,496,965 B1 | 12/2002 | van Ginneken et al. | |
| 6,504,186 B2 | 1/2003 | Kanamoto et al. | |
| 6,505,327 B2 | 1/2003 | Lin | 716/5 |
| 6,505,328 B1 | 1/2003 | van Ginneken et al. | |
| 6,507,941 B1 | 1/2003 | Leung et al. | |
| 6,509,952 B1 | 1/2003 | Govil et al. | |
| 6,514,849 B1 | 2/2003 | Hui et al. | |
| 6,516,459 B1 | 2/2003 | Sahouria | |
| 6,523,156 B2 | 2/2003 | Cirit | |
| 6,525,350 B1 | 2/2003 | Kinoshita et al. | 257/202 |
| 6,536,028 B1 | 3/2003 | Katsioulas et al. | 716/17 |
| 6,543,039 B1 * | 4/2003 | Watanabe | 716/55 |
| 6,553,544 B2 | 4/2003 | Tanaka et al. | |
| 6,553,559 B2 | 4/2003 | Liebmann et al. | |
| 6,553,562 B2 * | 4/2003 | Capodieci et al. | 716/53 |

(56) References Cited

U.S. PATENT DOCUMENTS

| | | | |
|---|---|---|---|
| 6,566,720 B2 | 5/2003 | Aldrich | |
| 6,570,234 B1 | 5/2003 | Gardner | |
| 6,571,140 B1 | 5/2003 | Wewalaarachchi et al. | 700/83 |
| 6,571,379 B2 | 5/2003 | Takayama | |
| 6,578,190 B2 | 6/2003 | Ferguson et al. | |
| 6,588,005 B1 | 7/2003 | Kobayashi et al. | |
| 6,590,289 B2 | 7/2003 | Shively | 257/758 |
| 6,591,207 B2 | 7/2003 | Naya et al. | 702/81 |
| 6,609,235 B2 | 8/2003 | Ramaswamy et al. | |
| 6,610,607 B1 | 8/2003 | Armbrust et al. | |
| 6,617,621 B1 | 9/2003 | Gheewala et al. | |
| 6,620,561 B2 | 9/2003 | Winder et al. | 430/5 |
| 6,633,182 B2 | 10/2003 | Pileggi et al. | |
| 6,635,935 B2 | 10/2003 | Makino | |
| 6,642,744 B2 | 11/2003 | Or-Bach et al. | |
| 6,643,831 B2 | 11/2003 | Chang et al. | |
| 6,650,014 B2 | 11/2003 | Kariyazaki | |
| 6,661,041 B2 | 12/2003 | Keeth | 257/211 |
| 6,662,350 B2 | 12/2003 | Fried et al. | |
| 6,664,587 B2 | 12/2003 | Guterman et al. | |
| 6,673,638 B1 | 1/2004 | Bendik et al. | |
| 6,677,649 B2 | 1/2004 | Minami et al. | |
| 6,687,895 B2 | 2/2004 | Zhang | |
| 6,691,297 B1 | 2/2004 | Misaka et al. | 716/21 |
| 6,700,405 B1 | 3/2004 | Hirairi | |
| 6,703,170 B1 | 3/2004 | Pindo | |
| 6,709,880 B2 | 3/2004 | Yamamoto et al. | |
| 6,714,903 B1 | 3/2004 | Chu et al. | 703/19 |
| 6,732,338 B2 | 5/2004 | Crouse et al. | |
| 6,732,344 B2 | 5/2004 | Sakamoto et al. | |
| 6,737,199 B1 | 5/2004 | Hsieh | 430/5 |
| 6,737,318 B2 | 5/2004 | Murata et al. | |
| 6,737,347 B1 | 5/2004 | Houston et al. | |
| 6,745,372 B2 | 6/2004 | Cote et al. | 716/2 |
| 6,745,380 B2 | 6/2004 | Bodendorf et al. | |
| 6,749,972 B2 | 6/2004 | Yu | |
| 6,750,555 B2 | 6/2004 | Satomi et al. | |
| 6,760,269 B2 | 7/2004 | Nakase et al. | |
| 6,765,245 B2 | 7/2004 | Bansal | |
| 6,777,138 B2 | 8/2004 | Pierrat et al. | |
| 6,777,146 B1 | 8/2004 | Samuels | |
| 6,787,823 B2 | 9/2004 | Shibutani | |
| 6,789,244 B1 | 9/2004 | Dasasathyan et al. | |
| 6,789,246 B1 | 9/2004 | Mohan et al. | |
| 6,792,591 B2 | 9/2004 | Shi et al. | |
| 6,792,593 B2 | 9/2004 | Takashima et al. | 716/21 |
| 6,794,677 B2 | 9/2004 | Tamaki et al. | |
| 6,794,914 B2 | 9/2004 | Sani et al. | |
| 6,795,332 B2 | 9/2004 | Yamaoka et al. | |
| 6,795,358 B2 | 9/2004 | Tanaka et al. | |
| 6,795,952 B1 | 9/2004 | Stine et al. | 716/5 |
| 6,795,953 B2 | 9/2004 | Bakarian et al. | |
| 6,800,883 B2 | 10/2004 | Furuya et al. | |
| 6,807,663 B2 | 10/2004 | Cote et al. | 716/21 |
| 6,809,399 B2 | 10/2004 | Ikeda et al. | |
| 6,812,574 B2 | 11/2004 | Tomita et al. | |
| 6,818,389 B2 | 11/2004 | Fritze et al. | |
| 6,818,929 B2 | 11/2004 | Tsutsumi et al. | |
| 6,819,136 B2 | 11/2004 | Or-Bach | 326/41 |
| 6,826,738 B2 | 11/2004 | Cadouri | |
| 6,834,375 B1 | 12/2004 | Stine et al. | 716/2 |
| 6,841,880 B2 | 1/2005 | Matsumoto et al. | |
| 6,850,854 B2 | 2/2005 | Naya et al. | 702/81 |
| 6,854,096 B2 | 2/2005 | Eaton et al. | |
| 6,854,100 B1 | 2/2005 | Chuang et al. | 716/5 |
| 6,871,338 B2 | 3/2005 | Yamauchi | |
| 6,872,990 B1 | 3/2005 | Kang | |
| 6,877,144 B1 | 4/2005 | Rittman et al. | 716/10 |
| 6,881,523 B2 | 4/2005 | Smith | |
| 6,884,712 B2 | 4/2005 | Yelehanka et al. | 438/622 |
| 6,885,045 B2 | 4/2005 | Hidaka | |
| 6,889,370 B1 | 5/2005 | Kerzman et al. | |
| 6,897,517 B2 | 5/2005 | Houdt et al. | |
| 6,897,536 B2 | 5/2005 | Nomura et al. | |
| 6,898,770 B2 | 5/2005 | Boluki et al. | |
| 6,904,582 B1 | 6/2005 | Rittman et al. | 716/10 |
| 6,918,104 B2 | 7/2005 | Pierrat et al. | |
| 6,920,079 B2 | 7/2005 | Shibayama | |
| 6,921,982 B2 | 7/2005 | Joshi et al. | |
| 6,922,354 B2 | 7/2005 | Ishikura et al. | |
| 6,924,560 B2 | 8/2005 | Wang et al. | |
| 6,928,635 B2 | 8/2005 | Pramanik et al. | 716/21 |
| 6,931,617 B2 | 8/2005 | Sanie et al. | 716/18 |
| 6,953,956 B2 | 10/2005 | Or-Bach et al. | 257/203 |
| 6,954,918 B2 | 10/2005 | Houston | |
| 6,957,402 B2 | 10/2005 | Templeton et al. | |
| 6,968,527 B2 | 11/2005 | Pierrat | |
| 6,974,978 B1 | 12/2005 | Possley | |
| 6,977,856 B2 | 12/2005 | Tanaka et al. | |
| 6,978,436 B2 | 12/2005 | Cote et al. | |
| 6,978,437 B1 | 12/2005 | Rittman et al. | 716/21 |
| 6,980,211 B2 | 12/2005 | Lin et al. | |
| 6,992,394 B2 | 1/2006 | Park | |
| 6,992,925 B2 | 1/2006 | Peng | 365/177 |
| 6,993,741 B2 | 1/2006 | Liebmann et al. | |
| 6,994,939 B1 | 2/2006 | Ghandehari et al. | |
| 7,003,068 B2 | 2/2006 | Kushner et al. | |
| 7,009,862 B2 | 3/2006 | Higeta et al. | |
| 7,016,214 B2 | 3/2006 | Kawamata | |
| 7,022,559 B2 | 4/2006 | Barnak et al. | |
| 7,028,285 B2 | 4/2006 | Cote et al. | 716/21 |
| 7,041,568 B2 | 5/2006 | Goldbach et al. | 438/387 |
| 7,052,972 B2 | 5/2006 | Sandhu et al. | |
| 7,053,424 B2 | 5/2006 | Ono | |
| 7,063,920 B2 | 6/2006 | Baba-Ali | |
| 7,064,068 B2 | 6/2006 | Chou et al. | 438/687 |
| 7,065,731 B2 | 6/2006 | Jacques et al. | |
| 7,079,989 B2 | 7/2006 | Wimer | |
| 7,093,208 B2 | 8/2006 | Williams et al. | |
| 7,093,228 B2 | 8/2006 | Andreev et al. | 716/21 |
| 7,103,870 B2 | 9/2006 | Misaka et al. | 716/21 |
| 7,105,871 B2 | 9/2006 | Or-Bach et al. | |
| 7,107,551 B1 | 9/2006 | de Dood et al. | |
| 7,115,343 B2 | 10/2006 | Gordon et al. | |
| 7,115,920 B2 | 10/2006 | Bernstein et al. | |
| 7,120,882 B2 | 10/2006 | Kotani et al. | 716/5 |
| 7,124,386 B2 | 10/2006 | Smith et al. | |
| 7,126,837 B1 | 10/2006 | Banachowicz et al. | |
| 7,132,203 B2 | 11/2006 | Pierrat | |
| 7,137,092 B2 * | 11/2006 | Maeda | 716/53 |
| 7,141,853 B2 | 11/2006 | Campbell et al. | |
| 7,143,380 B1 | 11/2006 | Anderson et al. | |
| 7,149,999 B2 | 12/2006 | Kahng et al. | 716/19 |
| 7,152,215 B2 | 12/2006 | Smith et al. | |
| 7,155,685 B2 | 12/2006 | Mori et al. | |
| 7,155,689 B2 | 12/2006 | Pierrat | 716/4 |
| 7,159,197 B2 | 1/2007 | Falbo et al. | |
| 7,174,520 B2 | 2/2007 | White et al. | |
| 7,175,940 B2 | 2/2007 | Laidig et al. | |
| 7,176,508 B2 | 2/2007 | Joshi et al. | |
| 7,177,215 B2 | 2/2007 | Tanaka et al. | |
| 7,185,294 B2 | 2/2007 | Zhang | |
| 7,188,322 B2 | 3/2007 | Cohn et al. | |
| 7,194,712 B2 | 3/2007 | Wu | |
| 7,200,835 B2 | 4/2007 | Zhang et al. | |
| 7,202,517 B2 | 4/2007 | Dixit et al. | |
| 7,208,794 B2 | 4/2007 | Hofmann et al. | |
| 7,214,579 B2 | 5/2007 | Widdershoven et al. | |
| 7,219,326 B2 | 5/2007 | Reed et al. | |
| 7,221,031 B2 | 5/2007 | Ryoo et al. | |
| 7,225,423 B2 | 5/2007 | Bhattacharya et al. | |
| 7,227,183 B2 | 6/2007 | Donze et al. | |
| 7,228,510 B2 | 6/2007 | Ono | |
| 7,231,628 B2 | 6/2007 | Pack et al. | |
| 7,235,424 B2 | 6/2007 | Chen et al. | |
| 7,243,316 B2 | 7/2007 | White et al. | |
| 7,252,909 B2 | 8/2007 | Shin et al. | |
| 7,264,990 B2 | 9/2007 | Rueckes et al. | |
| 7,269,803 B2 | 9/2007 | Khakzadi et al. | |
| 7,278,118 B2 | 10/2007 | Pileggi et al. | 716/1 |
| 7,279,727 B2 | 10/2007 | Ikoma et al. | |
| 7,287,320 B2 | 10/2007 | Wang et al. | |
| 7,294,534 B2 | 11/2007 | Iwaki | |
| 7,302,651 B2 | 11/2007 | Allen et al. | |

(56) References Cited

U.S. PATENT DOCUMENTS

| | | |
|---|---|---|
| 7,308,669 B2 | 12/2007 | Buehler et al. |
| 7,312,003 B2 | 12/2007 | Cote et al. |
| 7,315,994 B2 | 1/2008 | Aller et al. |
| 7,327,591 B2 | 2/2008 | Sadra et al. |
| 7,329,938 B2 | 2/2008 | Kinoshita |
| 7,335,966 B2 | 2/2008 | Ihme et al. |
| 7,337,421 B2 | 2/2008 | Kamat |
| 7,338,896 B2 | 3/2008 | Vanhaelemeersch et al. |
| 7,345,909 B2 | 3/2008 | Chang et al. |
| 7,346,885 B2 | 3/2008 | Semmler |
| 7,350,183 B2 | 3/2008 | Cui et al. |
| 7,353,492 B2 | 4/2008 | Gupta et al. |
| 7,360,179 B2 | 4/2008 | Smith et al. |
| 7,360,198 B2 | 4/2008 | Rana et al. |
| 7,366,997 B1 | 4/2008 | Rahmat et al. |
| 7,367,008 B2 | 4/2008 | White et al. |
| 7,376,931 B2 | 5/2008 | Kokubun |
| 7,383,521 B2 | 6/2008 | Smith et al. |
| 7,397,260 B2 | 7/2008 | Chanda et al. |
| 7,400,627 B2 | 7/2008 | Wu et al. |
| 7,402,848 B2 | 7/2008 | Chang et al. |
| 7,404,154 B1 | 7/2008 | Venkatraman et al. |
| 7,404,173 B2 | 7/2008 | Wu et al. |
| 7,411,252 B2 | 8/2008 | Anderson et al. |
| 7,421,678 B2 | 9/2008 | Barnes et al. |
| 7,423,298 B2 | 9/2008 | Mariyama et al. |
| 7,424,694 B2 | 9/2008 | Ikeda |
| 7,424,695 B2 | 9/2008 | Tamura et al. |
| 7,426,710 B2 | 9/2008 | Zhang et al. |
| 7,432,562 B2 | 10/2008 | Bhattacharyya |
| 7,434,185 B2 | 10/2008 | Dooling et al. |
| 7,441,211 B1 | 10/2008 | Gupta et al. |
| 7,442,630 B2 | 10/2008 | Kelberlau et al. |
| 7,444,609 B2 | 10/2008 | Charlebois et al. |
| 7,446,352 B2 | 11/2008 | Becker et al. |
| 7,449,371 B2 | 11/2008 | Kemerling et al. |
| 7,458,045 B2 | 11/2008 | Cote et al. |
| 7,459,792 B2 | 12/2008 | Chen |
| 7,465,973 B2 | 12/2008 | Chang et al. |
| 7,466,607 B2 | 12/2008 | Hollis et al. |
| 7,469,396 B2 | 12/2008 | Hayashi et al. |
| 7,480,880 B2 | 1/2009 | Visweswariah et al. |
| 7,480,891 B2 | 1/2009 | Sezginer |
| 7,484,197 B2 | 1/2009 | Allen et al. |
| 7,485,934 B2 | 2/2009 | Liaw |
| 7,487,475 B1 | 2/2009 | Kriplani et al. |
| 7,500,211 B2 | 3/2009 | Komaki |
| 7,502,275 B2 | 3/2009 | Nii et al. |
| 7,503,026 B2 | 3/2009 | Ichiryu et al. |
| 7,504,184 B2 | 3/2009 | Hung et al. |
| 7,506,300 B2 | 3/2009 | Sezginer et al. |
| 7,508,238 B2 | 3/2009 | Yamagami |
| 7,509,621 B2 | 3/2009 | Melvin, III |
| 7,509,622 B2 | 3/2009 | Sinha et al. |
| 7,512,017 B2 | 3/2009 | Chang |
| 7,512,921 B2 | 3/2009 | Shibuya |
| 7,514,959 B2 | 4/2009 | Or-Bach et al. |
| 7,523,429 B2 | 4/2009 | Kroyan et al. |
| 7,527,900 B2 | 5/2009 | Zhou et al. |
| 7,538,368 B2 | 5/2009 | Yano |
| 7,543,262 B2 | 6/2009 | Wang et al. |
| 7,563,701 B2 | 7/2009 | Chang et al. |
| 7,564,134 B2 | 7/2009 | Lee et al. |
| 7,568,174 B2 * | 7/2009 | Sezginer et al. ............ 716/136 |
| 7,569,309 B2 | 8/2009 | Blatchford et al. |
| 7,569,310 B2 | 8/2009 | Wallace et al. |
| 7,569,894 B2 | 8/2009 | Suzuki |
| 7,575,973 B2 | 8/2009 | Mokhlesi et al. |
| 7,598,541 B2 | 10/2009 | Okamoto et al. |
| 7,598,558 B2 | 10/2009 | Hashimoto et al. |
| 7,614,030 B2 | 11/2009 | Hsu |
| 7,625,790 B2 | 12/2009 | Yang |
| 7,632,610 B2 | 12/2009 | Wallace et al. |
| 7,640,522 B2 | 12/2009 | Gupta et al. |
| 7,646,651 B2 | 1/2010 | Lee et al. |
| 7,653,884 B2 | 1/2010 | Furnish et al. |
| 7,665,051 B2 | 2/2010 | Ludwig et al. |
| 7,700,466 B2 | 4/2010 | Booth et al. |
| 7,712,056 B2 | 5/2010 | White et al. |
| 7,739,627 B2 | 6/2010 | Chew et al. |
| 7,749,662 B2 | 7/2010 | Matthew et al. |
| 7,755,110 B2 | 7/2010 | Gliese et al. |
| 7,770,144 B2 | 8/2010 | Dellinger |
| 7,791,109 B2 | 9/2010 | Wann et al. |
| 7,802,219 B2 | 9/2010 | Tomar et al. |
| 7,825,437 B2 | 11/2010 | Pillarisetty et al. |
| 7,842,975 B2 | 11/2010 | Becker et al. |
| 7,873,929 B2 | 1/2011 | Kahng et al. |
| 7,882,456 B2 | 2/2011 | Zach |
| 7,888,705 B2 | 2/2011 | Becker et al. |
| 7,898,040 B2 | 3/2011 | Nawaz |
| 7,906,801 B2 | 3/2011 | Becker et al. |
| 7,908,578 B2 | 3/2011 | Becker et al. |
| 7,910,958 B2 | 3/2011 | Becker et al. |
| 7,910,959 B2 | 3/2011 | Becker et al. |
| 7,917,877 B2 | 3/2011 | Singh et al. |
| 7,917,879 B2 | 3/2011 | Becker et al. |
| 7,923,266 B2 | 4/2011 | Thijs et al. |
| 7,923,337 B2 | 4/2011 | Chang et al. |
| 7,923,757 B2 | 4/2011 | Becker et al. |
| 7,932,544 B2 | 4/2011 | Becker et al. |
| 7,932,545 B2 | 4/2011 | Becker et al. |
| 7,934,184 B2 | 4/2011 | Zhang |
| 7,943,966 B2 | 5/2011 | Becker et al. |
| 7,943,967 B2 | 5/2011 | Becker et al. |
| 7,948,012 B2 | 5/2011 | Becker et al. |
| 7,948,013 B2 | 5/2011 | Becker et al. |
| 7,952,119 B2 | 5/2011 | Becker et al. |
| 7,956,421 B2 | 6/2011 | Becker |
| 7,958,465 B2 | 6/2011 | Lu et al. |
| 7,962,867 B2 | 6/2011 | White et al. |
| 7,962,879 B2 | 6/2011 | Tang et al. |
| 7,964,267 B1 | 6/2011 | Lyons et al. |
| 7,971,160 B2 | 6/2011 | Osawa et al. |
| 7,989,847 B2 | 8/2011 | Becker et al. |
| 7,989,848 B2 | 8/2011 | Becker et al. |
| 7,992,122 B1 * | 8/2011 | Burstein et al. ............ 716/131 |
| 7,994,583 B2 | 8/2011 | Inaba |
| 8,004,042 B2 | 8/2011 | Yang et al. |
| 8,022,441 B2 | 9/2011 | Becker et al. |
| 8,030,689 B2 | 10/2011 | Becker et al. |
| 8,035,133 B2 | 10/2011 | Becker et al. |
| 8,044,437 B1 | 10/2011 | Venkatraman et al. |
| 8,058,671 B2 | 11/2011 | Becker et al. |
| 8,058,690 B2 | 11/2011 | Chang |
| 8,072,003 B2 | 12/2011 | Becker et al. |
| 8,072,053 B2 | 12/2011 | Li |
| 8,088,679 B2 | 1/2012 | Becker et al. |
| 8,088,680 B2 | 1/2012 | Becker et al. |
| 8,088,681 B2 | 1/2012 | Becker et al. |
| 8,088,682 B2 | 1/2012 | Becker et al. |
| 8,089,098 B2 | 1/2012 | Becker et al. |
| 8,089,099 B2 | 1/2012 | Becker et al. |
| 8,089,100 B2 | 1/2012 | Becker et al. |
| 8,089,101 B2 | 1/2012 | Becker et al. |
| 8,089,102 B2 | 1/2012 | Becker et al. |
| 8,089,103 B2 | 1/2012 | Becker et al. |
| 8,089,104 B2 | 1/2012 | Becker et al. |
| 8,101,975 B2 | 1/2012 | Becker et al. |
| 8,110,854 B2 | 2/2012 | Becker et al. |
| 8,129,750 B2 | 3/2012 | Becker et al. |
| 8,129,751 B2 | 3/2012 | Becker et al. |
| 8,129,752 B2 | 3/2012 | Becker et al. |
| 8,129,754 B2 | 3/2012 | Becker et al. |
| 8,129,755 B2 | 3/2012 | Becker et al. |
| 8,129,756 B2 | 3/2012 | Becker et al. |
| 8,129,757 B2 | 3/2012 | Becker et al. |
| 8,129,819 B2 | 3/2012 | Becker et al. |
| 8,130,529 B2 | 3/2012 | Tanaka |
| 8,134,183 B2 | 3/2012 | Becker et al. |
| 8,134,184 B2 | 3/2012 | Becker et al. |
| 8,134,185 B2 | 3/2012 | Becker et al. |
| 8,134,186 B2 | 3/2012 | Becker et al. |
| 8,138,525 B2 | 3/2012 | Becker et al. |

(56) References Cited

U.S. PATENT DOCUMENTS

| | | | |
|---|---|---|---|
| 8,161,427 B2 | 4/2012 | Morgenshtein et al. | |
| 8,178,905 B2 | 5/2012 | Toubou | |
| 8,178,909 B2 | 5/2012 | Venkatraman et al. | |
| 8,198,656 B2 | 6/2012 | Becker et al. | |
| 8,207,053 B2 | 6/2012 | Becker et al. | |
| 8,214,778 B2 | 7/2012 | Quandt et al. | |
| 8,217,428 B2 | 7/2012 | Becker et al. | |
| 8,225,239 B2 | 7/2012 | Reed et al. | |
| 8,225,261 B2 | 7/2012 | Hong et al. | |
| 8,245,180 B2 | 8/2012 | Smayling et al. | |
| 8,247,846 B2 | 8/2012 | Becker | |
| 8,253,172 B2 | 8/2012 | Becker et al. | |
| 8,253,173 B2 | 8/2012 | Becker et al. | |
| 8,258,547 B2 | 9/2012 | Becker et al. | |
| 8,258,548 B2 | 9/2012 | Becker et al. | |
| 8,258,549 B2 | 9/2012 | Becker et al. | |
| 8,258,550 B2 | 9/2012 | Becker et al. | |
| 8,258,551 B2 | 9/2012 | Becker et al. | |
| 8,258,552 B2 | 9/2012 | Becker et al. | |
| 8,264,007 B2 | 9/2012 | Becker et al. | |
| 8,264,008 B2 | 9/2012 | Becker et al. | |
| 8,264,009 B2 | 9/2012 | Becker et al. | |
| 8,283,701 B2 | 10/2012 | Becker et al. | |
| 8,316,327 B2 | 11/2012 | Herold | |
| 8,356,268 B2 | 1/2013 | Becker et al. | |
| 8,378,407 B2 | 2/2013 | Audzeyeu et al. | |
| 8,402,397 B2 | 3/2013 | Robles et al. | |
| 8,422,274 B2 | 4/2013 | Tomita et al. | |
| 8,436,400 B2 | 5/2013 | Becker et al. | |
| 8,453,094 B2 | 5/2013 | Kornachuk et al. | |
| 2002/0003270 A1 | 1/2002 | Makino | |
| 2002/0015899 A1* | 2/2002 | Chen et al. | 430/5 |
| 2002/0030510 A1 | 3/2002 | Kono et al. | |
| 2002/0079927 A1 | 6/2002 | Katoh et al. | |
| 2002/0149392 A1 | 10/2002 | Cho | |
| 2002/0166107 A1* | 11/2002 | Capodieci et al. | 716/19 |
| 2002/0194575 A1 | 12/2002 | Allen et al. | |
| 2003/0042930 A1 | 3/2003 | Pileggi et al. | 326/41 |
| 2003/0046653 A1 | 3/2003 | Liu | |
| 2003/0061592 A1 | 3/2003 | Agrawal et al. | |
| 2003/0088839 A1* | 5/2003 | Watanabe | 716/7 |
| 2003/0088842 A1 | 5/2003 | Cirit | |
| 2003/0106037 A1 | 6/2003 | Moniwa et al. | |
| 2003/0117168 A1 | 6/2003 | Uneme et al. | |
| 2003/0124847 A1 | 7/2003 | Houston et al. | |
| 2003/0125917 A1 | 7/2003 | Rich et al. | |
| 2003/0126569 A1 | 7/2003 | Rich et al. | |
| 2003/0145288 A1 | 7/2003 | Wang et al. | |
| 2003/0145299 A1 | 7/2003 | Fried et al. | |
| 2003/0177465 A1 | 9/2003 | MacLean et al. | |
| 2003/0185076 A1 | 10/2003 | Worley | |
| 2003/0229868 A1 | 12/2003 | White et al. | |
| 2003/0229875 A1 | 12/2003 | Smith et al. | |
| 2004/0049754 A1 | 3/2004 | Liao et al. | |
| 2004/0063038 A1 | 4/2004 | Shin et al. | |
| 2004/0115539 A1* | 6/2004 | Broeke et al. | 430/5 |
| 2004/0139412 A1 | 7/2004 | Ito et al. | |
| 2004/0145028 A1 | 7/2004 | Matsumoto et al. | 257/620 |
| 2004/0153979 A1 | 8/2004 | Chang | |
| 2004/0161878 A1 | 8/2004 | Or-Bach et al. | 438/113 |
| 2004/0169201 A1 | 9/2004 | Hidaka | |
| 2004/0194050 A1 | 9/2004 | Hwang et al. | |
| 2004/0196705 A1 | 10/2004 | Ishikura et al. | |
| 2004/0229135 A1 | 11/2004 | Wang et al. | |
| 2004/0232444 A1 | 11/2004 | Shimizu | |
| 2004/0243966 A1 | 12/2004 | Dellinger | 716/17 |
| 2004/0262640 A1 | 12/2004 | Suga | |
| 2005/0009312 A1 | 1/2005 | Butt et al. | |
| 2005/0009344 A1 | 1/2005 | Hwang et al. | |
| 2005/0012157 A1 | 1/2005 | Cho et al. | |
| 2005/0055828 A1 | 3/2005 | Wang et al. | 29/857 |
| 2005/0076320 A1 | 4/2005 | Maeda | |
| 2005/0087806 A1 | 4/2005 | Hokazono | |
| 2005/0093147 A1 | 5/2005 | Tu | |
| 2005/0101112 A1 | 5/2005 | Rueckes et al. | 438/584 |
| 2005/0110130 A1 | 5/2005 | Kitabayashi et al. | |
| 2005/0135134 A1 | 6/2005 | Yen | |
| 2005/0136340 A1 | 6/2005 | Baselmans et al. | |
| 2005/0138598 A1 | 6/2005 | Kokubun | |
| 2005/0156200 A1 | 7/2005 | Kinoshita | |
| 2005/0185325 A1 | 8/2005 | Hur | |
| 2005/0189604 A1 | 9/2005 | Gupta et al. | |
| 2005/0189614 A1 | 9/2005 | Ihme et al. | 257/532 |
| 2005/0196685 A1 | 9/2005 | Wang et al. | |
| 2005/0205894 A1 | 9/2005 | Sumikawa et al. | |
| 2005/0212018 A1 | 9/2005 | Schoellkopf et al. | |
| 2005/0224982 A1 | 10/2005 | Kemerling et al. | 257/758 |
| 2005/0229130 A1 | 10/2005 | Wu et al. | |
| 2005/0251771 A1 | 11/2005 | Robles | |
| 2005/0264320 A1 | 12/2005 | Chan et al. | |
| 2005/0264324 A1 | 12/2005 | Nakazato | |
| 2005/0266621 A1 | 12/2005 | Kim | |
| 2005/0268256 A1 | 12/2005 | Tsai et al. | |
| 2005/0280031 A1 | 12/2005 | Yano | |
| 2006/0038234 A1 | 2/2006 | Liaw | |
| 2006/0063334 A1 | 3/2006 | Donze et al. | |
| 2006/0070018 A1* | 3/2006 | Semmler | 716/21 |
| 2006/0084261 A1 | 4/2006 | Iwaki | |
| 2006/0091550 A1 | 5/2006 | Shimazaki et al. | |
| 2006/0095872 A1 | 5/2006 | McElvain | |
| 2006/0101370 A1 | 5/2006 | Cui et al. | |
| 2006/0112355 A1 | 5/2006 | Pileggi et al. | 716/1 |
| 2006/0113567 A1 | 6/2006 | Ohmori et al. | |
| 2006/0120143 A1 | 6/2006 | Liaw | |
| 2006/0121715 A1 | 6/2006 | Chang et al. | |
| 2006/0123376 A1 | 6/2006 | Vogel et al. | |
| 2006/0125024 A1 | 6/2006 | Ishigaki | |
| 2006/0131609 A1 | 6/2006 | Kinoshita et al. | |
| 2006/0136848 A1 | 6/2006 | Ichiryu et al. | |
| 2006/0146638 A1 | 7/2006 | Chang et al. | |
| 2006/0151810 A1 | 7/2006 | Ohshige | 257/207 |
| 2006/0158270 A1 | 7/2006 | Gibet et al. | |
| 2006/0177744 A1 | 8/2006 | Bodendorf et al. | |
| 2006/0181310 A1 | 8/2006 | Rhee | |
| 2006/0195809 A1 | 8/2006 | Cohn et al. | |
| 2006/0197557 A1 | 9/2006 | Chung | |
| 2006/0206854 A1 | 9/2006 | Barnes et al. | |
| 2006/0223302 A1 | 10/2006 | Chang et al. | |
| 2006/0248495 A1 | 11/2006 | Sezginer | |
| 2007/0001304 A1 | 1/2007 | Liaw | |
| 2007/0002617 A1 | 1/2007 | Houston | |
| 2007/0007574 A1 | 1/2007 | Ohsawa | |
| 2007/0038973 A1 | 2/2007 | Li et al. | |
| 2007/0074145 A1 | 3/2007 | Tanaka | |
| 2007/0094634 A1* | 4/2007 | Seizginer et al. | 716/21 |
| 2007/0101305 A1 | 5/2007 | Smith et al. | |
| 2007/0105023 A1 | 5/2007 | Zhou et al. | |
| 2007/0106971 A1 | 5/2007 | Lien et al. | |
| 2007/0113216 A1 | 5/2007 | Zhang | |
| 2007/0172770 A1 | 7/2007 | Witters et al. | |
| 2007/0196958 A1* | 8/2007 | Bhattacharya et al. | 438/128 |
| 2007/0209029 A1 | 9/2007 | Ivonin et al. | |
| 2007/0210391 A1 | 9/2007 | Becker et al. | |
| 2007/0234252 A1 | 10/2007 | Visweswariah et al. | |
| 2007/0256039 A1 | 11/2007 | White | |
| 2007/0257277 A1 | 11/2007 | Takeda et al. | |
| 2007/0274140 A1 | 11/2007 | Joshi et al. | |
| 2007/0277129 A1 | 11/2007 | Allen et al. | |
| 2007/0288882 A1 | 12/2007 | Kniffin et al. | |
| 2007/0290361 A1 | 12/2007 | Chen | |
| 2007/0294652 A1* | 12/2007 | Bowen | 716/10 |
| 2007/0297249 A1 | 12/2007 | Chang et al. | |
| 2008/0005712 A1 | 1/2008 | Charlebois et al. | |
| 2008/0046846 A1 | 2/2008 | Chew et al. | |
| 2008/0082952 A1 | 4/2008 | O'Brien | |
| 2008/0086712 A1 | 4/2008 | Fujimoto | |
| 2008/0097641 A1 | 4/2008 | Miyashita et al. | |
| 2008/0098334 A1 | 4/2008 | Pileggi et al. | |
| 2008/0099795 A1 | 5/2008 | Bernstein et al. | |
| 2008/0127000 A1 | 5/2008 | Majumder et al. | |
| 2008/0127029 A1 | 5/2008 | Graur et al. | |
| 2008/0134128 A1* | 6/2008 | Blatchford et al. | 716/19 |
| 2008/0144361 A1 | 6/2008 | Wong | |
| 2008/0148216 A1 | 6/2008 | Chan et al. | |

(56) References Cited

U.S. PATENT DOCUMENTS

| | | |
|---|---|---|
| 2008/0163141 A1 | 7/2008 | Scheffer et al. |
| 2008/0168406 A1 | 7/2008 | Rahmat et al. |
| 2008/0211028 A1 | 9/2008 | Suzuki |
| 2008/0216207 A1 | 9/2008 | Tsai |
| 2008/0244494 A1 | 10/2008 | McCullen |
| 2008/0251779 A1 | 10/2008 | Kakoschke et al. |
| 2008/0265290 A1 | 10/2008 | Nielsen et al. |
| 2008/0276105 A1 | 11/2008 | Hoberman et al. |
| 2008/0283910 A1 | 11/2008 | Dreeskornfeld et al. |
| 2008/0285331 A1 | 11/2008 | Torok et al. |
| 2008/0308848 A1 | 12/2008 | Inaba |
| 2008/0315258 A1 | 12/2008 | Masuda et al. |
| 2009/0014811 A1 | 1/2009 | Becker et al. |
| 2009/0024974 A1 | 1/2009 | Yamada |
| 2009/0031261 A1 | 1/2009 | Smith et al. |
| 2009/0032898 A1 | 2/2009 | Becker et al. |
| 2009/0032967 A1 | 2/2009 | Becker et al. |
| 2009/0037864 A1 | 2/2009 | Becker et al. |
| 2009/0057780 A1 | 3/2009 | Wong et al. |
| 2009/0075485 A1 | 3/2009 | Ban et al. |
| 2009/0077524 A1 | 3/2009 | Nagamura |
| 2009/0085067 A1 | 4/2009 | Hayashi et al. |
| 2009/0087991 A1 | 4/2009 | Yatsuda et al. |
| 2009/0101940 A1 | 4/2009 | Barrows et al. |
| 2009/0106714 A1 | 4/2009 | Culp et al. |
| 2009/0155990 A1 | 6/2009 | Yanagidaira et al. |
| 2009/0181314 A1 | 7/2009 | Shyu et al. |
| 2009/0187871 A1 | 7/2009 | Cork |
| 2009/0206443 A1 | 8/2009 | Juengling |
| 2009/0224408 A1 | 9/2009 | Fox |
| 2009/0228853 A1 | 9/2009 | Hong et al. |
| 2009/0228857 A1 | 9/2009 | Kornachuk et al. |
| 2009/0273100 A1 | 11/2009 | Aton et al. |
| 2009/0280582 A1 | 11/2009 | Thijs et al. |
| 2009/0302372 A1 | 12/2009 | Chang et al. |
| 2009/0319977 A1 | 12/2009 | Saxena et al. |
| 2010/0001321 A1 | 1/2010 | Becker et al. |
| 2010/0006897 A1 | 1/2010 | Becker et al. |
| 2010/0006898 A1 | 1/2010 | Becker et al. |
| 2010/0006899 A1 | 1/2010 | Becker et al. |
| 2010/0006900 A1 | 1/2010 | Becker et al. |
| 2010/0006901 A1 | 1/2010 | Becker et al. |
| 2010/0006902 A1 | 1/2010 | Becker et al. |
| 2010/0006903 A1 | 1/2010 | Becker et al. |
| 2010/0006947 A1 | 1/2010 | Becker et al. |
| 2010/0006948 A1 | 1/2010 | Becker et al. |
| 2010/0006950 A1 | 1/2010 | Becker et al. |
| 2010/0006951 A1 | 1/2010 | Becker et al. |
| 2010/0006986 A1 | 1/2010 | Becker et al. |
| 2010/0011327 A1 | 1/2010 | Becker et al. |
| 2010/0011328 A1 | 1/2010 | Becker et al. |
| 2010/0011329 A1 | 1/2010 | Becker et al. |
| 2010/0011330 A1 | 1/2010 | Becker et al. |
| 2010/0011331 A1 | 1/2010 | Becker et al. |
| 2010/0011332 A1 | 1/2010 | Becker et al. |
| 2010/0011333 A1 | 1/2010 | Becker et al. |
| 2010/0012981 A1 | 1/2010 | Becker et al. |
| 2010/0012982 A1 | 1/2010 | Becker et al. |
| 2010/0012983 A1 | 1/2010 | Becker et al. |
| 2010/0012984 A1 | 1/2010 | Becker et al. |
| 2010/0012985 A1 | 1/2010 | Becker et al. |
| 2010/0012986 A1 | 1/2010 | Becker et al. |
| 2010/0017766 A1 | 1/2010 | Becker et al. |
| 2010/0017767 A1 | 1/2010 | Becker et al. |
| 2010/0017768 A1 | 1/2010 | Becker et al. |
| 2010/0017769 A1 | 1/2010 | Becker et al. |
| 2010/0017770 A1 | 1/2010 | Becker et al. |
| 2010/0017771 A1 | 1/2010 | Becker et al. |
| 2010/0017772 A1 | 1/2010 | Becker et al. |
| 2010/0019280 A1 | 1/2010 | Becker et al. |
| 2010/0019281 A1 | 1/2010 | Becker et al. |
| 2010/0019282 A1 | 1/2010 | Becker et al. |
| 2010/0019283 A1 | 1/2010 | Becker et al. |
| 2010/0019284 A1 | 1/2010 | Becker et al. |
| 2010/0019285 A1 | 1/2010 | Becker et al. |
| 2010/0019286 A1 | 1/2010 | Becker et al. |
| 2010/0019287 A1 | 1/2010 | Becker et al. |
| 2010/0019288 A1 | 1/2010 | Becker et al. |
| 2010/0019308 A1 | 1/2010 | Chan et al. |
| 2010/0023906 A1 | 1/2010 | Becker et al. |
| 2010/0023907 A1 | 1/2010 | Becker et al. |
| 2010/0023908 A1 | 1/2010 | Becker et al. |
| 2010/0023911 A1 | 1/2010 | Becker et al. |
| 2010/0025731 A1 | 2/2010 | Becker et al. |
| 2010/0025732 A1 | 2/2010 | Becker et al. |
| 2010/0025733 A1 | 2/2010 | Becker et al. |
| 2010/0025734 A1 | 2/2010 | Becker et al. |
| 2010/0025735 A1 | 2/2010 | Becker et al. |
| 2010/0025736 A1 | 2/2010 | Becker et al. |
| 2010/0032722 A1 | 2/2010 | Becker et al. |
| 2010/0032723 A1 | 2/2010 | Becker et al. |
| 2010/0032724 A1 | 2/2010 | Becker et al. |
| 2010/0032726 A1 | 2/2010 | Becker et al. |
| 2010/0037194 A1 | 2/2010 | Becker et al. |
| 2010/0037195 A1 | 2/2010 | Becker et al. |
| 2010/0096671 A1 | 4/2010 | Becker et al. |
| 2010/0203689 A1 | 8/2010 | Bernstein et al. |
| 2010/0224943 A1 | 9/2010 | Kawasaki |
| 2010/0229140 A1 | 9/2010 | Strolenberg et al. |
| 2010/0232212 A1 | 9/2010 | Anderson et al. |
| 2010/0264468 A1 | 10/2010 | Xu |
| 2010/0270681 A1 | 10/2010 | Bird et al. |
| 2010/0287518 A1 | 11/2010 | Becker |
| 2011/0016909 A1 | 1/2011 | Mirza et al. |
| 2011/0108890 A1 | 5/2011 | Becker et al. |
| 2011/0108891 A1 | 5/2011 | Becker et al. |
| 2011/0154281 A1 | 6/2011 | Zach |
| 2011/0207298 A1 | 8/2011 | Anderson et al. |
| 2011/0260253 A1 | 10/2011 | Inaba |
| 2011/0298025 A1 | 12/2011 | Haensch et al. |
| 2012/0012932 A1 | 1/2012 | Perng et al. |
| 2012/0273841 A1 | 11/2012 | Quandt et al. |
| 2013/0097574 A1 | 4/2013 | Balabanov et al. |
| 2013/0200465 A1 | 8/2013 | Becker et al. |
| 2013/0200469 A1 | 8/2013 | Becker et al. |
| 2013/0207198 A1 | 8/2013 | Becker et al. |
| 2013/0207199 A1 | 8/2013 | Becker et al. |
| 2013/0254732 A1 | 9/2013 | Kornachuk et al. |

FOREIGN PATENT DOCUMENTS

| | | |
|---|---|---|
| EP | 1394858 | 3/2004 |
| EP | 1670062 | 6/2006 |
| EP | 1833091 | 8/2007 |
| EP | 1730777 | 9/2007 |
| EP | 2251901 | 11/2010 |
| FR | 2860920 | 4/2005 |
| JP | 58-182242 | 10/1983 |
| JP | 61-182244 | 8/1986 |
| JP | S63-310136 A | 12/1988 |
| JP | H07-153927 A | 6/1995 |
| JP | 2684980 | 7/1995 |
| JP | 1995-302706 | 11/1995 |
| JP | 1997-09289251 A | 11/1997 |
| JP | 10-116911 | 5/1998 |
| JP | 1999-045948 | 2/1999 |
| JP | 2001-068558 | 3/2001 |
| JP | 2002-026125 | 1/2002 |
| JP | 2002-026296 A | 1/2002 |
| JP | 2002-184870 | 6/2002 |
| JP | 2001-056463 | 9/2002 |
| JP | 2002-258463 | 9/2002 |
| JP | 2002-289703 | 9/2002 |
| JP | 2001-272228 | 3/2003 |
| JP | 2003-264231 | 9/2003 |
| JP | 2004-013920 | 1/2004 |
| JP | 2004-200300 | 1/2004 |
| JP | 2004-241529 | 8/2004 |
| JP | 2004-342757 A | 12/2004 |
| JP | 2005-020008 | 12/2004 |
| JP | 2005-020008 | 1/2005 |
| JP | 2003-359375 | 5/2005 |
| JP | 2005-135971 A | 5/2005 |
| JP | 2005-149265 | 6/2005 |

(56) References Cited

FOREIGN PATENT DOCUMENTS

| JP | 2005-183793 | 7/2005 |
|---|---|---|
| JP | 2005-203447 | 7/2005 |
| JP | 2005-114752 | 10/2006 |
| JP | 2006-303022 A | 11/2006 |
| KR | 10-0417093 | 6/1997 |
| KR | 10-1998-087485 | 12/1998 |
| KR | 1998-0084215 A | 12/1998 |
| KR | 10-1999-0057943 A | 7/1999 |
| KR | 10-2000-0028830 A | 5/2000 |
| KR | 10-2002-0034313 | 5/2002 |
| KR | 10-2002-0070777 | 9/2002 |
| KR | 2003-0022006 | 3/2003 |
| KR | 10-2005-0030347 A | 3/2005 |
| KR | 2005-0037965 A | 4/2005 |
| KR | 2006-0108233 A | 10/2006 |
| TW | 386288 | 4/2000 |
| WO | WO 2005/104356 | 11/2005 |
| WO | WO 2006/014849 | 2/2006 |
| WO | WO 2006/052738 | 5/2006 |
| WO | WO 2007/014053 | 2/2007 |
| WO | WO 2007/103587 | 9/2007 |

OTHER PUBLICATIONS

Wang, J. et al., Statndard Cell Layout with Regular Contact Placement, IEEE Trans. on Semicon. Mfg., vol. 17, No. 3, Aug. 2004.
Kang, S.M., Metal-Metal Matrix (M3) for High-Speed MOS VLSI Layout, IEEE Trans. on CAD, vol. CAD-6, No. 5, Sep. 1987.
Liebmann, L. W., Layout Impact of Resolution Enhancement Techniques: Impediment or Opportunity?, International Symposium on Physical Design, 2003.
Jhaveri, T. et al., Maximization of Layout Printability/Manufacturability by Extreme Layout Regularity, Proc. of the SPIE, Apr. 2006.
Acar, et al., "A Linear-Centric Simulation Framework for Parametric Fluctuations", 2002, IEEE, Carnegie Mellon University USA, pp. 1-8.
Amazawa, et al., "Fully Planarized Four-Level Interconnection with Stacked VLAS Using CMP of Selective CVD-A1 and Insulator and its Application to Quarter Micron Gate Array LSIs", 1995, IEEE, Japan, pp. 473-476.
Burkhardt, et al., "Dark Field Double Dipole Lithography (DDL) for Back-End-Of-Line Processes", 2007, SPIE Proceeding Series, vol. 6520; 65200K.
Capetti, et al., "Sub k1=0.25 Lithography with Double Patterning Technique for 45nm Technology Node Flash Memory Devices at λ=193nm", 2007, SPIE Proceeding Series, vol. 6520; 65202K.
Chandra, et al., "An Interconnect Channel Design Methodology for High Performance Integrated Circuits", 2004, IEEE, Carnegie Mellon University, pp. 1-6.
Cheng, et al., "Feasibility Study of Splitting Pitch Technology on 45nm Contact Paterning with 0.93 NA", 2007, SPIE Proceeding Series, vol. 6520; 65202N.
Chow, et al., "The Design of a SRAM-Based Field-Programmable Gate Array—Part II: Circuit Design and Layout", 1999, IEEE, vol. 7 # 3 pp. 321-330.
DeVor, et al., "Statistical Quality Design and Control", 1992, Macmillan Publishing Company, pp. 264-267.
Dusa, et al. "Pitch Doubling Through Dual Patterning Lithography Challenges in Integration and Litho Budgets", 2007, SPIE Proceeding Series, vol. 6520; 65200G.
El-Gamal, "Fast, Cheap and Under Control: The Next Implementation Fabric", Jun. 2-6, 2003, ACM Press, pp. 354-355.
Frankel, "Quantum State Control Interference Lithography and Trim Double Patterning for 32-16nm Lithography", 2007, SPIE Proceeding Series, vol. 6520; 65202L.
Hayashida, et al., "Manufactuable Local Interconnect technology Fully Compatible with Titanium Salicide Process", Jun. 11-12, 1991, VMIC Conference.
Heng, et al., "A VLSI Artwork Legalization Technique Base on a New Criterion of Minimum Layout Perturbation", 1997, ACM Press, pp. 116-121.

Hu, et al., "Synthesis and Placemant Flow for Gain-Based Programmable Regular Fabrics", Apr. 6-9, 2003, ACM Press, pp. 197-203.
Hutton, et al., "A Methodology for FPGA to Structured-ASIC Synthesis and Verification", 2006, EDAA, pp. 64-69.
Jayakumar, et al., "A Metal and VIA Maskset Programmable VLSI Design Methodology using PLAs", 2004, IEEE, pp. 590-594.
Kheterpal, et al., "Routing Architecture Exploration for Regular Fabrics", DAC, Jun. 7-11, 2004, ACM Press, pp. 204-207.
Kheterpal, et al., "Design Methodolgy for IC Manufactrability Based on Regular Logic-Bricks", DAC, Jun. 13-17, 2005, IEEE/AMC, vol. 6520.
Kim, et al., "Issues and Challenges of Double Patterning Lithography in DRAM", 2007, SPIE Proceeding Series, vol. 6520; 65200H.
Kim, et al., "Double Exposure Using 193nm Negative Tone Photoresist", 2007, SPIE Proceeding Series, vol. 6520; 65202M.
Koorapaty, et al., "Heterogeneous Logic Block Architectures for Via-Patterned Programmable Fabric", 13th International Conference on Field Programmable Logic and Applications (FPL) 2003, Lecture Notes in Computer Science (LNCS), Sep. 2003, Springer-Verlag, vol. 2778, pp. 426-436.
Koorapaty, et al., "Modular, Fabric-Specific Synthesis for Programmable Architectures", 12th International Conference on Field Programmable Logic and Applications (FPL_2002, Lecture Notes in Computer Science (LNCS)), Sep. 2002, Springer-Verlag, vol. 2438 pp. 132-141.
Koorapaty, et al., "Exploring Logic Block Granularity for Regular Fabrics", 2004, IEEE, pp. 1-6.
Li, et al., "A Linear-Centric Modeling Approach to Harmonic Balance Analysis", 2002, IEEE, pp. 1-6.
Li, et al., "Nonlinear Distortion Analysis Via Linear-Centric Models", 2003, IEEE, pp. 897-903.
Liebmann et al., "Integrating DfM Components Into a Cohesive Design-To-Silicon Solution", IBM Systems and Technology Group, b IBM Research, pp. 1-12.
Liebmann, et al., "High-Performance Circuit Design for the RET-Enabled 65nm Technology Node", Feb. 26-27, 2004, SPIE Proceeding Series, vol. 5379 pp. 20-29.
Liu, et al., "Double Patterning with Multilayer Hard Mask Shrinkage for Sub-0.25 k1 Lithography", 200, SPIE Proceeding Series, vol. 6520; 65202J.
Mo, et al., "Checkerboard: A Regular Structure and its Synthesis, International Workshop on Logic and Synthesis", 2003, Department of Electrical Engineering and Computer Sciences, UC Berkeley, California, pp. 1-7.
Mo, et al., "PLA-Based Regular Structures and Their Synthesis", 2003, Department of Electrical Engineering and Computer Sciences, IEEE, pp. 723-729.
Mo, et al., "Regular Farbrics in Deep Sub-Micron Integrated-Circuit Design", 2004, Kluwer Academic Publishers, Entire Book.
Op de Beek, et al., "Manufacturability issues with Double Patterning for 50nm half pitch damscene applications, using RELACS® shrink and corresponding OPC", 2007, SPIE Proceeding Series, vol. 6520; 65200I.
Or-Bach, "Programmable Circuit Fabrics", Sep. 18, 2001, e-ASIC, pp. 1-36.
Otten, et al., "Planning for Performance", DAC 1998, ACM Inc., pp. 122-127.
Pandini, et al., "Congestion-Aware Logic Synthesis", 2002, IEEE, pp. 1-8.
Pandini, et al., "Understanding and Addressing the Impact of Wiring Congestion During Technology Mapping", ISPD Apr. 7-10, 2002, ACM Press, pp. 131-136.
Reis, et al., "Physical Design Methodologies for Performance Predictability and Manufacturability", Apr. 14-16, 2004, ACM Press, pp. 390-397.
Robertson, et al., "The Modeling of Double Patterning Lithographic Processes", 2007, SPIE Proceeding Series, vol. 6520; 65200J.
Rovner, "Design for Manufacturability in Via Programmable Gate Arrays", May 2003, Graduate School of Cagegie Mellon University.
Sengupta, "An Integrated CAD Framework Linking VLSI Layout Editors and Process Simulators", 1998, Thesis for Rice University, pp. 1-101.

(56) References Cited

OTHER PUBLICATIONS

Sengupta, et al., "An Integrated CAD Framework Linking VLSI Layout Editors and Process Simulators", 1996, SPIE Proceeding Series, vol. 2726; pp. 244-252.
Sherlekar, "Design Considerations for Regular Fabrics", Apr. 18-21, 2004, ACM Press, pp. 97-102.
Stapper, "Modeling of Defects in Integrated Circuit Photolithographic Patterns", Jul. 1, 1984, IBM, vol. 28 # 4, pp. 461-475.
Taylor, et al., "Enabling Energy Efficiency in Via-Patterned Gate Array Devices", Jun. 7-11, 2004, ACM Press, pp. 874-877.
Patel, et al., "An Architectural Exploration of Via Patterned Gate Arrays, ISPD 2003", Apr. 6, 2003, pp. 184-189.
Pileggi, et al., "Exploring Regular Fabrics to Optimize the Performance-Cost Trade-Offs, Proceedings of the 40th ACM/IEEE Design Automation Conference (DAC) 2003", Jun. 2003, ACM Press, pp. 782-787.
Poonawala, et al., "ILT for Double Exposure Lithography with Conventional and Novel Materials", 2007, SPIE Proceeding Series, vol. 6520; 65202Q.
Ran, et al., "Designing a Via-Configurable Regular Fabric", Custom Integrated Circuits Coference (CICC). Proceedings of the IEEE, Oct. 2004, Oct. 1, 2004, pp. 423-426.
Ran, et al., "On Designing Via-Configurable Cell Blocks for Regular Fabrics" Proceedings of the Design Automation Conference (DAC) 2004, Jun. 2004, ACM Press, s 198-203.
Ran, et al., "An Integrated Design Flow for a Via-Configurable Gate Array", 2004, IEEE, pp. 582-589.
Ran, et al., "Via-Configurable Routing Architectures and Fast Design Mappability Estimation for Regular Fabrics", 2005, IEEE, pp. 25-32.
Ran, et al., "The Magic of a Via-Configurable Regular Fabric", Proceedings of the IEEE International Conference on Computer Design (ICCD) Oct. 2004.
Tong, et al., "Regular Logic Fabrics for a Via Patterned Gate Array (VPGA), Custom Integrated Circuits Conference", Sep. 2003, Proceedings of the IEEE, pp. 53-56.
Vanleehgove, et al., "A Litho-Only Approach to Double Patterning", 2007, SPIE Proceeding Series, vol. 6520; 65202F.
Wenren, et al., "The Improvement of Photolithographic Fidelity of Two-dimensional Structures Though Double Exposure Method", 2007, SPIE Proceeding Series, vol. 6520; 65202I.
Wilcox, et al., "Design for Manufacturability: A Key to Semiconductor Manufacturing Excellence", 1998, IEEE, pp. 308-313.
Wu, et al., "A Study of Process Window Capabilities for Two-dimensional Structures under Double Exposure Condition", 2007, SPIE Proceeding Series, vol. 6520; 65202O.
Xiong, et al., "The Constrained Via Minimization Problem for PCB and VLSI Design", 1988, ACM Press/IEEE, pp. 573-578.
Yamamaoto, et al., "New Double Exposure Technique without Alternating Phase Shift Mask", 2007, SPIE Proceeding Series, vol. 6520; 652052P.
Yang, et al., "Interconnection Driven VLSI Module Placement Based on Quadratic Programming and Considering Congestion Using LFF Principles", 2004, IEEE, pp. 1243-1247.
Yao, et al., "Multilevel Routing With Redundant Via Insertion", Oct. 2006, IEEE, pp. 1148-1152.
Zheng, et al."Modeling and Analysis of Regular Symmetrically Structured Power/Ground Distribution Networks", DAC, Jun. 10-14, 2002, ACM Press, pp. 395-398.
Zhu, et al., "A Study of Double Exposure Process Design with Balanced Performance Parameters for Line/Space Applications", 2007, SPIE Proceeding Series, vol. 6520; 65202H.
Zuchowski, et al., "A Hybrid ASIC and FPGA Architecture", 2003, IEEE, pp. 187-194.
Axelrad et al. "Efficient Full-Chip Yield Analysis Methodology for OPC-Corrected VLSI Design", 2000, International Symposium on Quality Electronic Design (ISQED).
Balasinski et al. "Impact of Subwavelength CD Tolerance on Device Performance", 2002, SPIE.
Capodieci, L., et al., "Toward a Methodology for Manufacturability-Driven Design Rule Exploration," DAC 2004, Jun. 7-11, 2004, San Diego, CA.
Clark et al. "Managing Standby and Active Mode Leakage Power in Deep Sub-Micron Design", Aug. 9-11, 2004, ACM.
Cobb et al. "Using OPC to Optimize for Image Slope and Improve Process Window", 2003, SPIE.
Devgan "Leakage Issues in IC Design: Part 3", 2003, CCAD.
Dictionary.com, "channel," in Collins English Dictionary—Complete & Unabridged 10th Edition. Source location: HarperCollins Publishers. http://dictionary.reference.com/browse/channel. Available: http://dictionary.reference.com.
Garg, et al. "Lithography Driven Layout Design", 2005, IEEE.
Grobman et al. "Reticle Enhancement Technology Trends: Resource and Manufacturability Implications for the Implementation of Physical Designs" Apr. 1-4, 2001, ACM.
Grobman et al. "Reticle Enhancement Technology: Implications and Challenges for Physical Design" Jun. 18-22, 2001, ACM.
Gupta et al. "Enhanced Resist and Etch CD Control by Design Perturbation", Oct. 4-7, 2006, Society of Photo-Optical Instrumentation Engineers.
Gupta et al. "A Practical Transistor-Level Dual Threshold Voltage Assignment Methodology", 2005, Sixth International Symposium on Quality Electronic Design (ISQED).
Gupta et al. "Detailed Placement for Improved Depth of Focus and CD Control", 2005, ACM.
Gupta et al. "Joining the Design and Mask Flows for Better and Cheaper Masks", Oct. 14-17, 2004, Society of Photo-Optical Instrumentation Engineers.
Gupta et al. "Manufacturing-Aware Physical Design", 2003, ACM.
Gupta et al. "Selective Gate-Length Biasing for Cost-Effective Runtime Leakage Control", Jun. 7-11, 2004, ACM.
Gupta et al. "Wafer Topography-Aware Optical Proximity Correction for Better DOF Margin and CD Control", Apr. 13-15, 2005, SPIE.
Gupta, Puneet, et al., "Manufacturing-aware Design Methodology for Assist Feature Correctness," 2005.
Ha et al., "Reduction in the Mask Error Factor by Optimizing the Diffraction Order of a Scattering Bar in Lithography," Journal of the Korean Physical Society, vol. 46, No. 5, May 2005, pp. 1213-1217.
Halpin et al., "Detailed Placement with Net Length Constraints," Publication Year 2003, Proceedings of the 3rd IEEE International Workshop on System-on-Chip for Real-Time Applications, pp. 22-27.
Heng, et al., "Toward Through-Process Layout Quality Metrics", Mar. 3-4, 2005, Society of Photo-Optical Instrumentation Engineers.
Hur et al., "Mongrel: Hybrid Techniques for Standard Cell Placement," Publication Year 2000, IEEE/ACM International Conference on Computer Aided Design, ICCAD-2000, pp. 165-170.
Intel Core Microarchitecture White Paper "Introducing the 45 nm Next-Generation Intel Core Microarchitecture," 2007, Intel Corporation.
Kuh et al., "Recent Advances in VLSI Layout," Publication Year 1990, Proceedings of the IEEE, vol. 78, Issue 2, pp. 237-263.
Lavin et al. "Backend DAC Flows for "Restrictive Design Rules"", 2004, IEEE.
Liebmann et al., "Optimizing Style Options for Sub-Resolution Assist Features," Proc. of SPIE vol. 4346, 2001, pp. 141-152.
Mansfield et al., "Lithographic Comparison of Assist Feature Design Strategies," Proc. of SPIE vol. 4000, 2000, pp. 63-76.
Miller, "Manufacturing-Aware Design Helps Boost IC Yield", Sep. 9, 2004, http://www.eetimes.com/showArticle. jhtml?articleID=47102054.
Mishra, P., et al., "FinFET Circuit Design," Nanoelectronic Circuit Design, pp. 23-54, 2011.
Moore, Samuel K., "Intel 45-nanometer Penryn Processors Arrive," Nov. 13, 2007, IEEE Spectrum, http://spectrum.ieee.org/semiconductors/design/intel-45nanometer-penryn-processors-arrive.
Mutoh et al. "1-V Power Supply High-Speed Digital Circuit Technology with Multithreshold-Voltage CMOS", 1995, IEEE.
Pack et al. "Physical & Timing Verification of Subwavelength-Scale Designs—Part I: Lithography Impact on MOSFETs", 2003, SPIE.

(56) References Cited

OTHER PUBLICATIONS

Pham, D., et al., "FINFET Device Junction Formation Challenges," 2006 International Workshop on Junction Technology, pp. 73-77, Aug. 2006.
Qian et al. "Advanced Physical Models for Mask Data Verification and Impacts on Physical Layout Synthesis" 2003. IEEE.
Shi et al., "Understanding the Forbidden Pitch and Assist Feature Placement," Proc. of SPIE vol. 4562, 2002, pp. 968-979.
Smayling et al., "APF Pitch Halving for 22 nm Logic Cells Using Gridded Design Rules," Proceedings of SPIE, USA, vol. 6925, Jan. 1, 2008, pp. 69251E-1-69251E-7.
Sreedhar et al. "Statistical Yield Modeling for Sub-Wavelength Lithography", 2008, IEEE.
Tian et al. "Model-Based Dummy Feature Placement for Oxide Chemical_Mechanical Polishing Manufacturability" 2000, ACM.
Wang, et al., "Performance Optimization for Gridded-Layout Standard Cells", 2004, vol. 5567 SPIE.
Webb, Clair, "Layout Rule Trends and Affect upon CPU Design", 2006, vol. 6156 SPIE.
Webb, Clair, "45nm Design for Manufacturing," Intel Technology Journal, vol. 12, Issue 02, Jun. 17, 2008, ISSN 1535-864X, pp. 121-130.
Zhu, et al., "A Stochastic Integral Equation Method for Modeling the Rough Surface Effect on Interconnect Capacitance", 2004, IEEE.
Firedberg, et al., "Modeling Within-Field Gate Length Spatial Variation for Process-Design Co-Optimization," 2005 Proc. of SPIE vol. 5756, pp. 178-188.
Hakko, et al., "Extension of the 2D-TCC Technique to Optimize Mask Pattern Layouts," 2008 Proc. of SPIE vol. 7028, 11 pages.
Kawashima, et al., "Mask Optimization for Arbitrary Patterns with 2D-TCC Resolution Enhancement Technique," 2008 Proc. of SPIE vol. 6924, 12 pages.
Rosenbluth, et al., "Optimum Mask and Source Patterns to Print a Given Shape," 2001 Proc. of SPIE vol. 4346, pp. 486-502.
Socha, et al., "Simultaneous Source Mask Optimization (SMO)," 2005 Proc. of SPIE vol. 5853, pp. 180-193.
Wong, et al., "Resolution Enhancement Techniques and Design for Manufacturability: Containing and Accounting for Variabilities in Integrated Circuit Creation," J. Micro/Nanolith. MEMS MOEMS, Jul.-Sep. 2007, vol. 6(3), 2 pages.
Yamazoe, et al., "Resolution Enhancement by Aerial Image Approximation with 2D-TCC," 2007 of SPIE vol. 6730, 12 pages.
Yu, et al., "True Process Variation Aware Optical Proximity Correction with Variational Lithography Modeling and Model Calibration," J. Micro/Nanolith. MEMS MOEMS, Jul.-Sep. 2007, vol. 6(3), 16 pages.
Alam, Syed M. et al., "A Comprehensive Layout Methodology and Layout-Specific Circuit Analyses for Three-Dimensional Integrated Circuits," Mar. 21, 2002, 6 pages.
Alam, Syed M. et al., "Layout-Specific Circuit Evaluation in 3-D Integrated Circuits," May 2003, pp. 199-205.
Aubusson, Russel, "Wafer-Scale Integration of Semiconductor Memory," Apr. 1979, 241 pages.
Bachtold, "Logic Circuits with Carbon," Nov. 9, 2001, pp. 1317-1320.
Baker, R. Jacob, "CMOS: Circuit Design, Layout, and Simulation (2nd Edition)," Nov. 1, 2004, title page, contents, 15 pages.
Baldi et al., "A Scalable Single Poly EEPROM Cell for Embedded Memory Applications, " Sep. 1997, pp. 657-661.
Cao, Ke, "Design for Manufacturing (DFM) in Submicron VLSI Design," Aug. 2007, pp. 1-79.
Capodieci, Luigi, "From Optical Proximity Correction to Lithography-Driven Physical Design (1996-2006): 10 years of Resolution Enhancement Technology and the roadmap enablers for the next decade," Proc. SPIE 6154, Optical Microlithography XIX, 615401, Mar. 20, 2006, 12 pages.
Chang, Leland et al., "Stable SRAM Cell Design for the 32 nm Node and Beyond," Jun. 16, 2005, pp. 128-129.
Cheung, Peter, "Layout Design," Apr. 4, 2004, 22 pages.
Chinnery, David, "Closing the Gap Between ASIC & Custom: Tools and Techniques for High-Performance ASIC Design," Jun. 30, 2002, 5 pages.
Chou, Dyiann et al., "Line End Optimization through Optical Proximity Correction (OPC): A Case Study," Feb. 19, 2006, 12 pages.
Clein, Dan, "CMOS IC Layout: Concepts, Methodologies, and Tools," Dec. 22, 1999, title page, contents, 5 pages.
Cowell, "Exploiting Non-Uniform Access Time," Jul. 2003, pp. 1-52.
Das, Shamik, "Design Automation and Analysis of Three-Dimensional Integrated Circuits," May 1, 2004, pp. 1-176.
"Technology-Aware Design of SRAM Memory Circuits," Mar. 2007, Evelyn Grossar, pp. 1-227.
Deng, Liang et al., "Coupling-aware Dummy Metal Insertion for Lithography," 2007, pp. 13-18.
Devoivre et al., "Validated 90nm CMOS Technology Platform with Low-k Copper Interconnects for Advanced System-on-Chip (SoC)," 2002, 6 pages.
Enbody, R. J., "Near-Optimal n-Layer Channel Routing," 1986, pp. 708-714.
Ferretti, Marcos et al., "High Performance Asynchronous ASIC Back-End Design Flow Using Single-Track Full-Buffer Standard Cells," Apr. 23, 2004, 11 pages.
Garg, Manish et al., "Litho-driven Layouts for Reducing Performance Variability," May 23, 2005, pp. 3551-3554.
Greenway, Robert et al., "32nm 1-D Regular Pitch SRAM Bitcell Design for Interference-Assisted Lithography," 2008, 12 pages.
Gupta et al., "Modeling Edge Placement Error Distribution in Standard Cell Library," Feb. 23-24, 2006, 12 pages.
Grad, Johannes et al., "A standard cell library for student projects," Proceedings of the 2003 IEEE International Conference on Microelectronic Systems Education, Jun. 2, 2003, 2 pages.
Hartono, Roy et al., "Active Device Generation for Automatic Analog Layout Retargeting Tool," May 13, 2004, pp. 1-36.
Hartono, Roy et al., "IPRAIL—Intellectual Property Reuse-based Analog IC Layout Automation," Mar. 17, 2003, pp. 1-31.
Hastings, Alan, "The Art of Analog Layout (2nd Edition)," 2005, 12 pages.
Hurata et al., "A Genuine Design Manufacturability Check for Designers," 2006, 7 pages.
Institute of Microelectronic Systems, "Digital Subsystem Design," Oct. 13, 2006, 36 pages.
Ishida, M. et al., "A Novel 6T-SRAM Cell Technology Designed with Rectangular Patterns Scalable beyond 0.18 pm Generation and Desirable for Ultra High Speed Operation," 1998, pp. 201-204.
Jakusovszky, "Linear IC Parasitic Element Simulation Methodology," Oct. 1, 1993, pp. 500-506.
Jangkrajarng, Nuttorn et al., "Template-Based Parasitic-Aware Optimization and Retargeting of Analog and RF Integrated Circuit Layouts," Nov. 5, 2006, pp. 342-348.
Kahng, Andrew B., "Design Optimizations DAC-2006 DFM Tutorial, part V)," 2006, 53 pages.
Kang, Sung-Mo et al., "CMOS Digital Integrated Circuits Analysis & Design," Oct. 29, 2002, Chapter 2, pp. 1-48.
Kottoor, Mathew Francis, "Development of a Standard Cell Library based on Deep Sub-Micron SCMOS Design Rules using Open Source Software (MS Thesis)," Aug. 1, 2005, pp. 1-88.
Kubicki, "Intel 65nm and Beyond (or Below): IDF Day 2 Coverage (available at http://www.anandtech.com/show/1468/4)," Sep. 9, 2004, 4 pages, comments.
Kuhn, Kelin J., "Reducing Variation in Advanced Logic Technologies: Approaches to Process and Design for Manufacturability of Nanoscale CMOS," Dec. 12, 2007, 4 pages.
Kurokawa, Atsushi et al., "Dummy Filling Methods for Reducing Interconnect Capacitance and Number of Fills, Proc. of ISQED," pp. 586-591, 2005.
Lavin, Mark, "Open Access Requirements from RDR Design Flows," Nov. 11, 2004, 24 pages.
Liebmann, Lars et al., "Layout Methodology Impact of Resolution Enhancement Techniques," 2003, 7 pages.
Liebmann, Lars et al., "TCAD development for lithography resolution enhancement," Sep. 2001, pp. 651-665.

(56) References Cited

OTHER PUBLICATIONS

Lin, Chung-Wei et al., "Recent Research and Emerging Challenges in Physical Design for Manufacturability/Reliability," Jan. 26, 2007, 6 pages.
McCullen, Kevin W., "Layout Techniques for Phase Correct and Gridded Wiring," 2006, pp. 1-96.
MOSIS, "Design Rules MOSIS Scalable CMOS (SCMOS) (Revision 8.00)," Oct. 4, 2004, 27 pages.
MOSIS, "MOSIS Scalable CMOS (SCMOS) Design Rules (Revision 7.2).", 30 pages.
Muta et al., "Manufacturability-Aware Design of Standard Cells," pp. 2682-2690, Dec. 2007.
Na, Kee-Yeol et al., "A Novel Single Polysilicon EEPROM Cell With a Polyfinger Capacitor," Nov. 30, 2007, pp. 1047-1049.
Park, Tae Hong, "Characterization and Modeling of Pattern Dependencies in Copper Interconnects for Integrated Circuits," Ph.D. Thesis, MIT, 2002, pp. 1-204.
Patel, Chetan, "An Architectural Exploration of Via Patterned Gate Arrays (CMU Master's Project)," May 2003, pp. 1-24.
Pease, R. Fabian et al., "Lithography and Other Patterning Techniques for Future Electronics," 2008, pp. 248-270.
Pramanik, "Impact of layout on variability of devices for sub 90nm technologies," 2004, 42 pages.
Pramanik, Dipankar et al., "Lithography-driven layout of logic cells for 65-nm node (SPIE Proceedings vol. 5042)," Jul. 10, 2003, pp. 126-134.
Roy et al., "Extending Aggressive Low-K1 Design Rule Requirements For 90 And 65 Nm Nodes Via Simultaneous Optimization Of Numerical Aperture, Illumination And Optical Proximity Correction," J.Micro/Nanolith, MEMS MOEMS, 4(2), 023003, Apr. 26, 2005, 10 pages.
Saint, Christopher et al., "IC Layout Basics: A Practical Guide,", 2002, title page, contents, 5 pages.
Saint, Christopher et al., "IC Mask Design: Essential Layout Techniques," 2002, 6 pages.
Scheffer, "Physical CAD Changes to Incorporate Design for Lithography and Manufacturability," Feb. 4, 2004, 6 pages.
Smayling, Michael C., "Part 3: Test Structures, Test Chips, In-Line Metrology & Inspection," 2006, pp. 1-32.
Spence, Chris, "Full-Chip Lithography Simulation and Design Analysis: How OPC is changing IC Design, Emerging Lithographic Technologies IX," May 6, 2005, pp. 1-14.
Subramaniam, Anupama R., "Design Rule Optimization of Regular layout for Leakage Reduction in Nanoscale Design," pp. 474-479, Mar. 24, 2008.
Tang, C. W. et al., "A compact large signal model of LDMOS," 2002, pp. 2111-2115.
Taylor, Brian et al., "Exact Combinatorial Optimization Methods for Physical Design of Regular Logic Bricks," Jun. 8, 2007, pp. 344-349.
Tian, Ruiqi et al., "Dummy Feature Placement for Chemical-Mechanical Uniformity in a Shallow Trench Isolation Process," IEEE Trans. on Computer-Aided Design of Integrated Circuits and Systems, vol. 21, No. 1, pp. 63-71, Jan. 2002.
Tian, Ruiqi et al., "Proximity Dummy Feature Placement and Selective Via Sizing for Process Uniformity in a Trench-First-Via-Last Dual-Inlaid Metal Process," Proc. of IITC, pp. 48-50, 2001.
Torres, J. A. et al., "RET Compliant Cell Generation for sub-130nm Processes," 2002, pp. 529-539.
Uyemura, John P., "Introduction to VLSI Circuits and Systems," 2002, title page, contents, 6 pages.
Uyemura, John, "Chip Design for Submicron VLSI: CMOS Layout and Simulation,", 2006, contents, 8 pages.
Verhaegen et al., "Litho Enhancements for 45nm-nod MuGFETs," Aug. 1, 2005, 4 web pages 2013.
Wong, Ban P., "Bridging the Gap between Dreams and Nano-Scale Reality (DAC-2006 DFM Tutorial)," 2006, pp. 1-51.
Wang, Dunwei et al., "Complementary Symmetry Silicon Nanowire Logic: Power-Efficient Inverters with Gain," 2006, pp. 1153-1158.
Wang, Jun et al., "Effects of grid-placed contacts on circuit performance," pp. 134-141 Feb. 28, 2003.
Wang, Jun et al., "Standard cell design with regularly placed contacts and gates (SPIE vol. 5379)," 2004, pp. 55-66.
Wang, Jun et al., "Standard cell design with resolution-enhancement-technique-driven regularly placed contacts and gates," J. Micro/Nanolith, MEMS MOEMS, 4(1), 013001, Mar. 16, 2005, 10 pages.
Watson, Bruce, "Challenges and Automata Applications in Chip-Design Software," 2007, 46 pages.
Weste, Neil et al., "CMOS VLSI Design: A Circuits and Systems Perspective, 3rd Edition,", 2005, contents 17 pages.
Wingerden, Johannes van, "Experimental verification of improved printability for litho-driven designs,", SPIE 2006, 11 pages.
Wong, Alfred K., "Microlithography: Trends, Challenges, Solutions, and Their Impact on Design," 2003, pp. 12-21.
Xu, Gang, "Redundant-Via Enhanced Maze Routing for Yield Improvement," 2005, 4 pages.
Yang, Jie, "Manufacturability Aware Design," 2007, pp. 1-118.
Yongshun, Wang et al., "Static Induction Devices with Planar Type Buried Gate," 2004, pp. 126-132.
Zobrist, George (editor), "Progress in Computer Aided VLSI Design: Implementations," 1990, title page, table of contents, 3 pages.
Serrano, Diego Emilio, Pontificia Universidad Javeriana Facultad De Ingenieria, Departamento De Electronica, "Diseño De Multiplicador 4×8 en VLSI, Introduccion al VLSI," 2006.

* cited by examiner

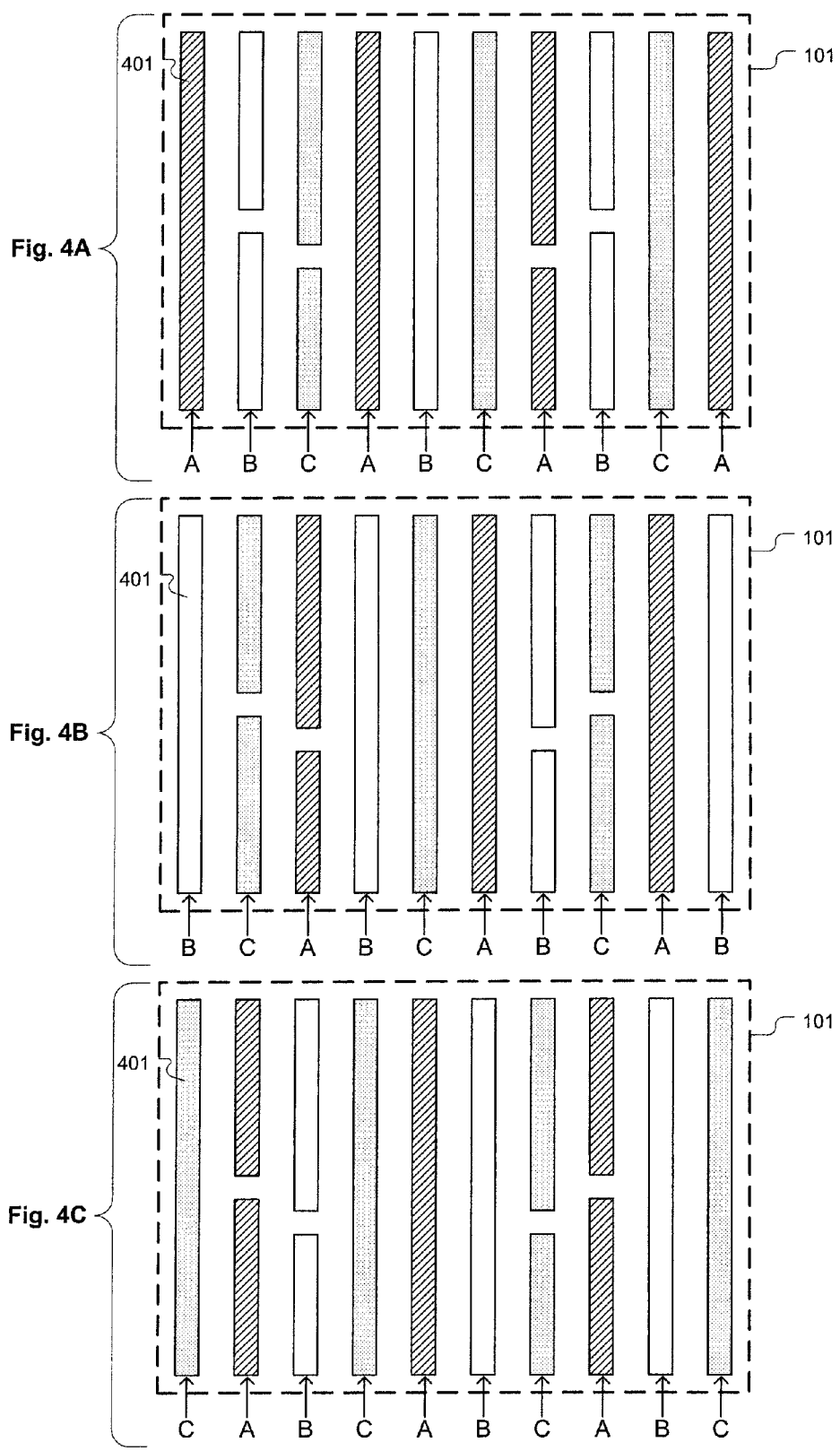

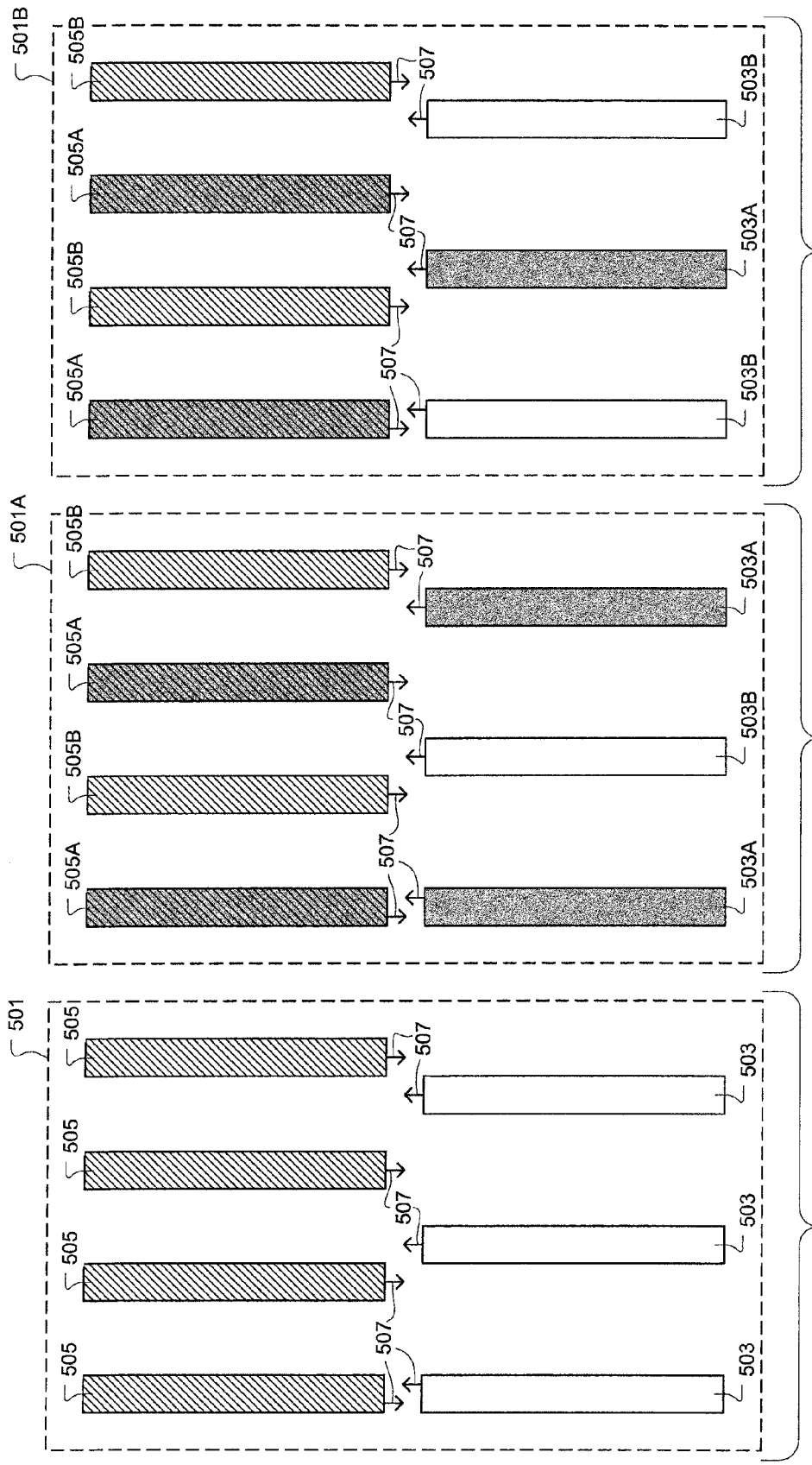

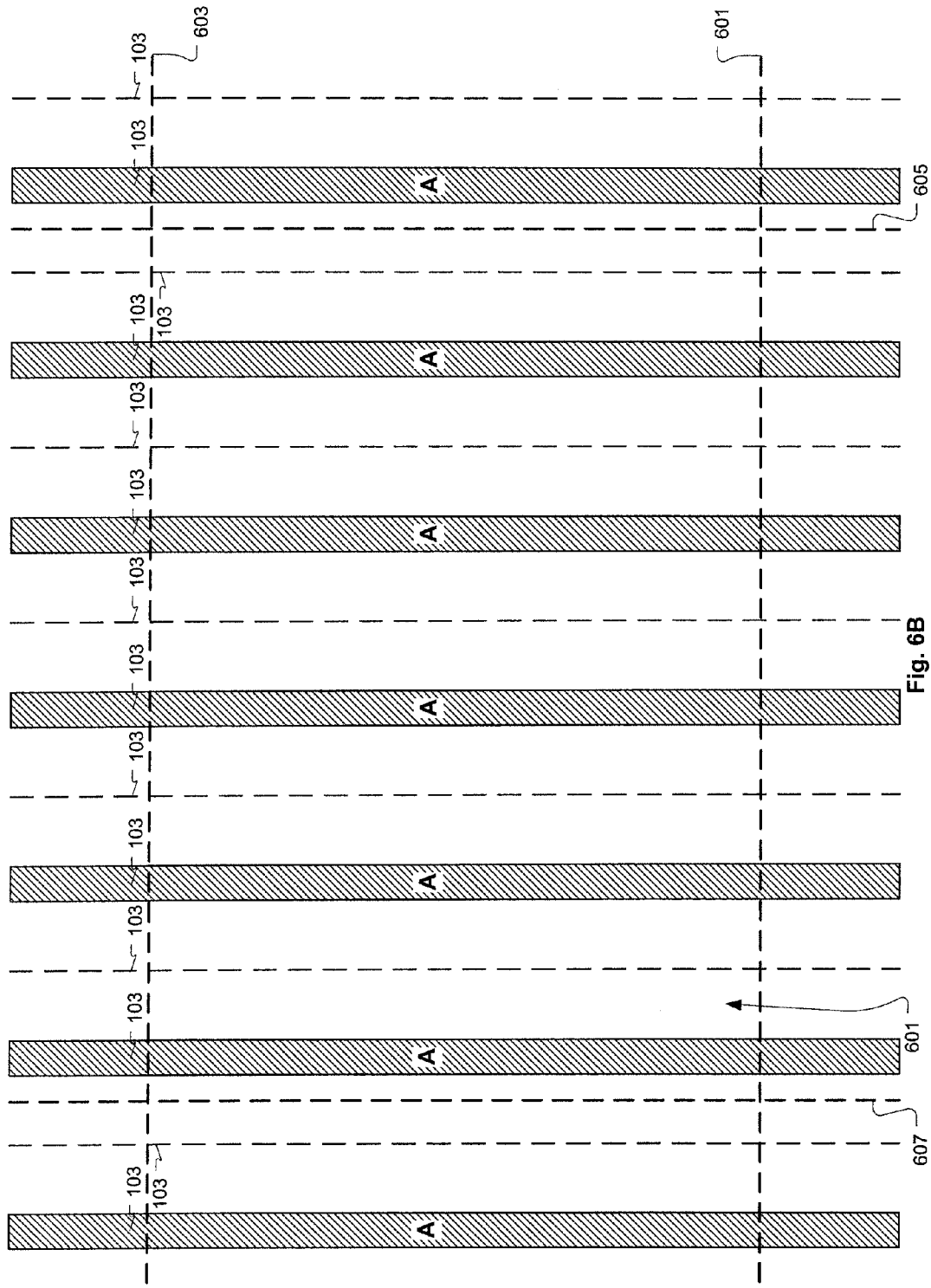

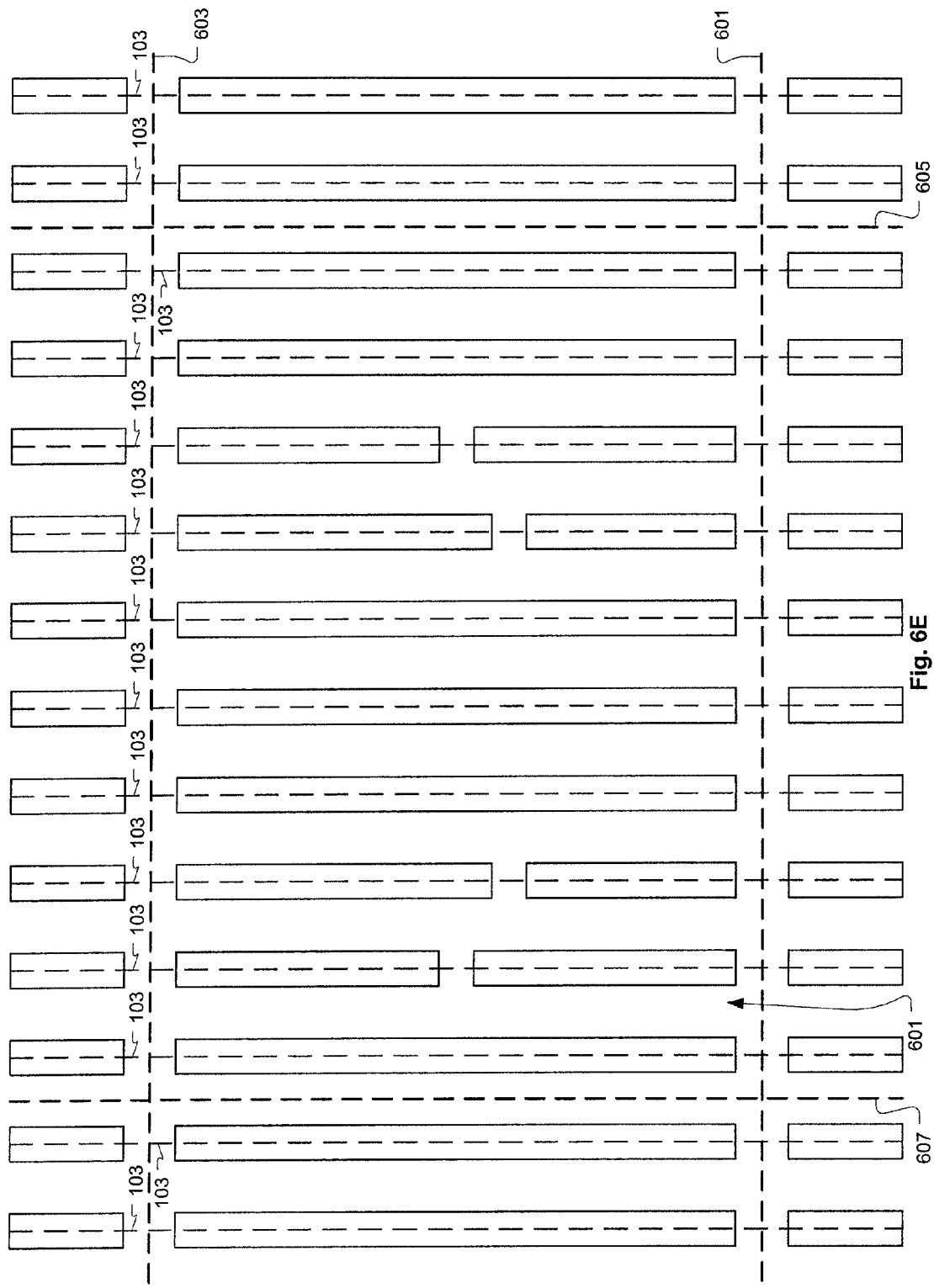

INTEGRATED CIRCUIT CELL LIBRARY FOR MULTIPLE PATTERNING

CLAIM OF PRIORITY

This application claims priority under 35 U.S.C. 119(e) to U.S. Provisional Patent Application No. 60/892,982, filed Mar. 5, 2007, entitled "Integrated Circuit Cell Library Suitable for Multiple Patterning." The disclosure of the above-identified provisional patent application is incorporated herein by reference.

CROSS-REFERENCE TO RELATED APPLICATIONS

This application is also related to U.S. patent application Ser. No. 11/683,402, filed on Mar. 7, 2007, and entitled "Dynamic Array Architecture." This application is also related to U.S. patent application Ser. No. 12/013,342, filed on Jan. 11, 2008, and entitled "Semiconductor Device with Dynamic Array Section." This application is also related to U.S. patent application Ser. No. 12/013,356, filed on Jan. 11, 2008, and entitled "Methods for Designing Semiconductor Device with Dynamic Array Section." This application is also related to U.S. patent application Ser. No. 12/013,366, filed on Jan. 11, 2008, and entitled "Methods for Defining Dynamic Array Section with Manufacturing Assurance Halo and Apparatus Implementing the Same." This application is also related to U.S. patent application Ser. No. 12/033,807, filed on Feb. 19, 2008, and entitled "Integrated Circuit Cell Library with Cell-Level Process Compensation Technique (PCT) Application and Associated Methods." The disclosures of the above-identified patent applications are incorporated herein by reference.

BACKGROUND

In modern semiconductor fabrication, optical lithography is used to pattern layout features onto a semiconductor wafer. Current step-and-repeat optical lithography systems and step-scan-and-repeat optical lithography systems use illumination sources with wavelengths of 365 nanometers (nm) (Hg I-line), 248 nm (KrF B-X excimer laser), and 193 nm (ArF B-X excimer laser). Historically, it has been possible to use illumination wavelengths larger than the layout feature sizes to be patterned. However, as layout feature sizes continue to decrease without a corresponding decrease in available illumination wavelength, the difference between the smallest wavelength and smallest layout feature size has become too large for successful lithographic rendering of the features. For example, lithographers are having great difficulty patterning 65 nm layout feature sizes with the 193 nm illumination source. Moreover, layout feature sizes are expected to continue to decrease from 65 nm to 45 nm, and on to 32 nm.

Lithographers use the following formula from Lord Rayleigh to estimate the optical system capability: resolution (half-pitch)=$k_1$ $\lambda$/NA, where $k_1$ is a fitting variable roughly corresponding to a process window, $\lambda$ is the illumination wavelength, and NA is the numerical aperture of the lithographic system. When the wavelength $\lambda$ was larger than the half-pitch, typical values for $k_1$ were over 0.50. Because the feature size has been decreasing by a factor of 0.7 for each technology node, the value of $k_1$ has been steadily decreasing for each technology node, while the wavelength $\lambda$ has been constant, and the NA has been increasing by only 1.1 to 1.2 per technology node step. Additionally, for a NA greater than about 0.93, immersion systems are needed in which water replaces air as the medium between the final lens and the photoresist on the wafer. These immersion systems are expected to support a NA up to about 1.35, with no clear, cost-effective solution thereafter.

In view of the foregoing, a solution is needed to enable patterning of nano-scale feature sizes without having to further decrease illumination wavelength $\lambda$ and/or further increase numerical aperture NA.

SUMMARY

In one embodiment, a method is disclosed for defining a multiple patterned cell layout for use in an integrated circuit design. The method includes an operation for defining a layout for a level of a cell. The layout is defined in accordance with a dynamic array architecture to include a number of layout features. The number of layout features are linear-shaped and commonly oriented. The method also includes an operation for splitting the layout into a number of sub-layouts for the level of the cell, such that each of the number of layout features in the layout is allocated to any one of the number of sub-layouts. The layout is split such that each sub-layout is independently fabricatable. The method further includes an operation for storing the number of sub-layouts for the level of the cell on a computer readable medium.

In another embodiment, a method is disclosed for creating a cell library for multiple patterning of a chip layout. The method includes an operation for defining a cell to include a number of levels having a respective linear layout defined in accordance with a dynamic array architecture. The dynamic array architecture is defined by layout features that are linear-shaped and commonly oriented. The cell represents an abstraction of a logic function and encapsulates lower-level integrated circuit layouts for implementing the logic function. For one or more select levels of the cell, the method includes an operation for splitting the respective linear layout into a number of sub-layouts, such that each of the number of layout features in the respective linear layout is allocated to any one of the number of sub-layouts, and such that each sub-layout is independently fabricatable. The method further includes an operation for storing a definition of the cell in a cell library on a computer readable medium. The definition of the cell includes the number of sub-layouts associated with each of the select levels of the cell.

In another embodiment, a method is disclosed for designing an integrated circuit for fabrication. In the method, a plurality of cells are placed together on a chip layout to satisfy a netlist of the integrated circuit. The plurality of cells are selected from a cell library for multiple patterning of the chip layout. Each of the plurality of cells includes a common level having a respective linear layout defined in accordance with a dynamic array architecture. The dynamic array architecture is defined by layout features that are linear-shaped and commonly oriented. Each linear layout is split into a number of sub-layouts, such that each layout feature in each linear layout is allocated to any one of the number of sub-layouts. Layout features allocated to a given sub-layout form a consistent pattern within the common level of a given cell. The plurality of cells are placed together such that the consistent pattern of layout features, as formed by the given sub-layout within the common level, extends in an uninterrupted manner across the plurality of cells. The extension of the consistent pattern of layout features formed by the given sub-layout across the plurality of cells defines a portion of a chip-wide mask layout for the common level. The method also includes an operation for storing the chip-wide mask layout for the common level on a computer readable medium.

In another embodiment, a set of masks for fabricating a common level of a semiconductor chip is disclosed. The set of masks includes a first mask having an area defined in accordance with a dynamic array architecture to include a first number of linear layout features. The first number of linear layout features are commonly oriented. Also, each of the first number of linear layout features is devoid of a substantial change in traversal direction across the first mask. The first number of linear layout features form a first sub-layout that defines a first portion of one or more cells. Each of the one or more cells represents an abstraction of a logic function and encapsulates lower-level integrated circuit layouts for implementing the logic function. The set of masks also includes a second mask having an area defined in accordance with the dynamic array architecture to include a second number of linear layout features. The second number of linear layout features are commonly oriented with the first number of linear layout features. Also, each of the second number of linear layout features is devoid of a substantial change in traversal direction across the second mask. The area of the second mask defined in accordance with the regular architecture is to be aligned with the area of the first mask defined in accordance with the regular architecture. The second number of linear layout features form a second sub-layout which defines a second portion of the one or more cells.

Other aspects and advantages of the invention will become more apparent from the following detailed description, taken in conjunction with the accompanying drawings, illustrating by way of example the present invention.

BRIEF DESCRIPTION OF THE DRAWINGS

FIGS. 4A-4C are illustrations showing possible sub-layout sequences for a layout that is split into three sub-layouts, in accordance with one embodiment of the present invention;

FIG. 5A is an illustration showing a gate level layout and metal 2 level layout for a cell, in accordance with one embodiment of the present invention;

FIGS. 5B-5E are illustrations showing different variants of the cell of FIG. 5A, in accordance with one embodiment of the present invention;

FIG. 6B is an illustration showing a first non-segmented sub-layout including the linear-shaped layout features designated by the label A in FIG. 6A, in accordance with one embodiment of the present invention;

FIG. 6E is an illustration showing the level of the cell following the line cutting by the layout of FIG. 6D, in accordance with one embodiment of the present invention;

DETAILED DESCRIPTION

Figure 1:
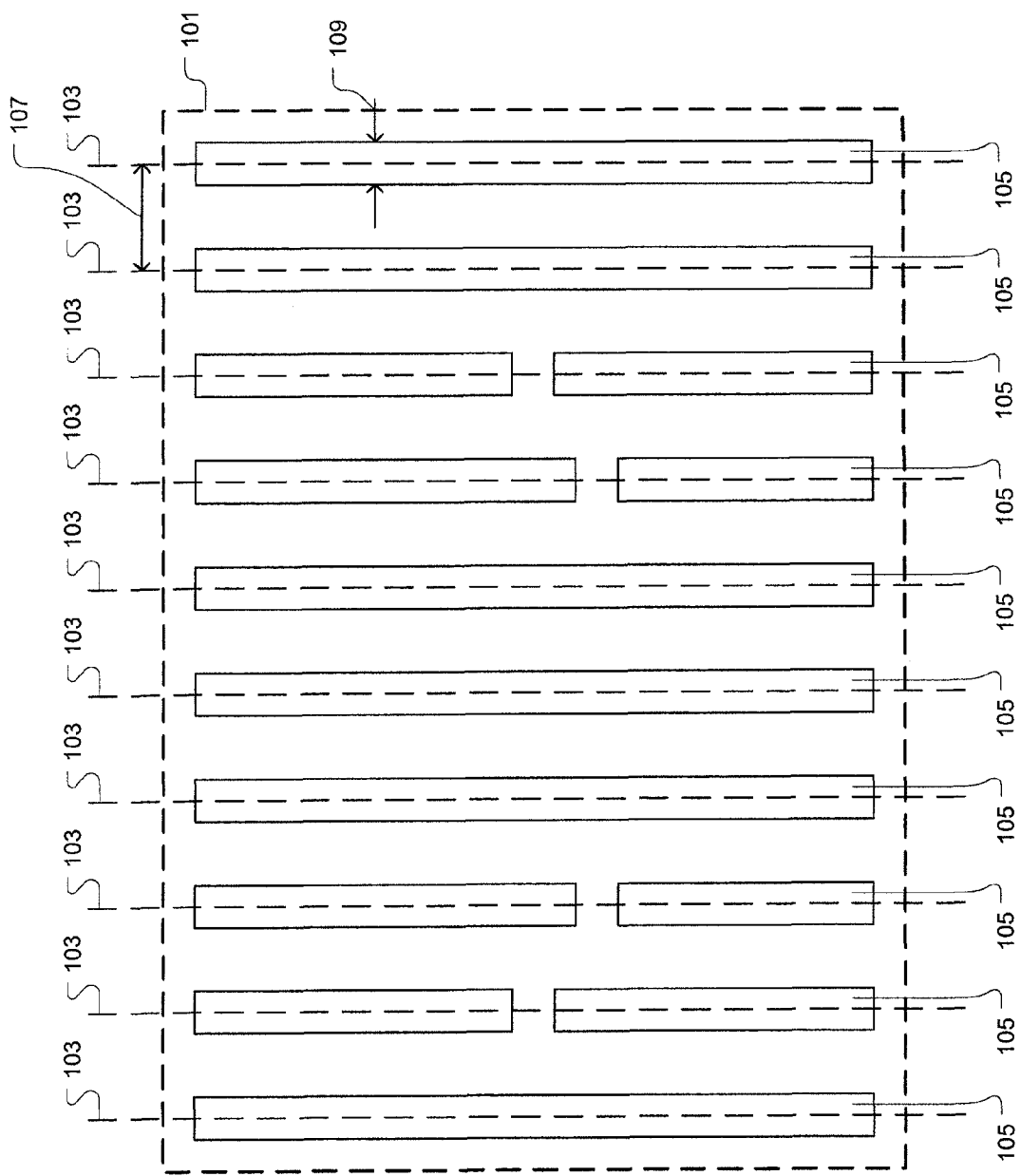
FIG. 1 is an illustration showing an exemplary layout for a level of a cell defined in accordance with the dynamic array architecture, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

One technique for resolving nano-scale layout features without further decreasing the illumination wavelength and without further increasing the numerical aperture NA is to utilize multiple patterning. More specifically, in multiple patterning, a given layout is split into two or more sub-layouts that are each exposed separately over the same area of the chip in the optical lithography process. Although the individual feature sizes in each of the sub-layouts may be small, i.e., nano-scale, a spacing between adjacent layout features in a given sub-layout is sufficiently large to enable resolution of the small layout features.

It should be appreciated that multiple patterning can be quite difficult in traditional random logic patterns and associated cell libraries because of their two-dimensionally varying nature, i.e., with layout features having bends and forks. Additionally, there can be complex issues associated with splitting of two-dimensionally varying patterns, such as phase shifting conflicts. However, use of a cell library defined in accordance with a dynamic array architecture enables straightforward splitting of a layout into multiple sub-layouts to be used for lithographic exposure.

A cell, as referenced herein, represents an abstraction of a logic function, and encapsulates lower-level integrated circuit layouts for implementing the logic function. It should be understood that a given logic function can be represented by multiple cell variations, wherein the cell variations may be differentiated by feature size, performance, and process compensation technique (PCT) processing. For example, multiple cell variations for a given logic function may be differentiated by power consumption, signal timing, current leakage, chip area, OPC, RET, etc. Additionally, multiple cell variations may be differentiated by sub-layout sequence combination, as described herein. It should also be understood that each cell description includes the layouts for the cell in each level of a chip, as required to implement the logic function of the cell. More specifically, a cell description includes layouts for the cell in each level of the chip extending from the substrate level up through a particular interconnect level.

The dynamic array architecture represents a semiconductor device design paradigm in which linear-shaped layout features are defined along a regular-spaced virtual grate (or regular-spaced virtual grid) in a number of levels of a cell, i.e., in a number of levels of a semiconductor chip. The virtual grate is defined by a set of equally spaced, parallel virtual lines extending across a given level in a given chip area. The virtual grid is defined by a first set of equally spaced, parallel virtual lines extending across a given level in a given chip area in a first direction, and by a second set of equally spaced, parallel virtual lines extending across the given level in the given chip area in a second direction, where the second direction is perpendicular to the first direction. In one embodiment, the virtual grate of a given level is oriented to be substantially perpendicular to the virtual grate of an adjacent level. However, in other embodiments, the virtual grate of a given level is oriented to be either perpendicular or parallel to the virtual grate of an adjacent level.

In one embodiment, each linear-shaped layout feature of a given level is substantially centered upon one of the virtual lines of the virtual grate associated with the given level. A linear-shaped layout feature is considered to be substantially centered upon a particular line of a virtual grate when a deviation in alignment between of the centerline of the linear-shaped layout feature and the particular line of the virtual grate is sufficiently small so as to not reduce a manufacturing process window from what would be achievable with a true alignment between of the centerline of the linear-shaped layout feature and the line of the virtual grate.

In one embodiment, the above-mentioned manufacturing process window is defined by a lithographic domain of focus and exposure that yields an acceptable fidelity of the layout feature. In one embodiment, the fidelity of a layout feature is defined by a characteristic dimension of the layout feature. Also, it should be understood that the centerline of a given linear-shaped layout feature is defined as a virtual line that passes through the cross-sectional centroid of the linear-shaped layout feature at all points along its length, wherein the cross-sectional centroid of the linear-shaped layout feature at any given point along its length is the centroid of its vertical cross-section area at the given point.

In another embodiment, some linear-shaped layout features in a given level may not be centered upon a virtual line of the virtual grate associated with the given level. However, in this embodiment, the linear-shaped layout features remain parallel to the virtual lines of the virtual grate, and hence parallel to the other linear-shaped layout features in the given level. Therefore, it should be understood that the various linear-shaped layout features defined in a layout of a given level are oriented to extend across the given level in a parallel manner.

Also, in the dynamic array architecture, each linear-shaped layout feature is defined to be devoid of a substantial change in direction along its length. The lack of substantial change in direction of a linear-shaped layout feature is considered relative to the line of the virtual grate along which the linear-shaped layout feature is defined. In one embodiment, a substantial change in direction of a linear-shaped layout feature exists when the width of the linear-shaped layout feature at any point thereon changes by more than 50% of the nominal width of the linear-shaped layout feature along its entire length. In another embodiment, a substantial change in direction of a linear-shaped layout feature exists when the width of the linear-shaped layout feature changes from any first location on the linear-shaped layout feature to any second location on the linear-shaped layout feature by more that 50% of the linear-shaped layout feature width at the first location. Therefore, it should be appreciated that the dynamic array architecture specifically avoids the use of non-linear-shaped layout features, wherein a non-linear-shaped layout feature includes one or more bends within a plane of the associated level.

In the dynamic array architecture, variations in a vertical cross-section shape of an as-fabricated linear-shaped layout feature can be tolerated to an extent, so long as the variation in the vertical cross-section shape is predictable from a manufacturing perspective and does not adversely impact the manufacture of the given linear-shaped layout feature or its neighboring layout features. In this regard, the vertical cross-section shape corresponds to a cut of the as-fabricated linear-shaped layout feature in a plane perpendicular to the centerline of the linear-shaped layout feature. It should be appreciated that variation in the vertical cross-section of an as-fabricated linear-shaped layout feature along its length can correspond to a variation in width along its length. Therefore, the dynamic array architecture also accommodates variation in the width of an as-fabricated linear-shaped layout feature along its length, so long as the width variation is predictable from a manufacturing perspective and does not adversely impact the manufacture of the linear-shaped layout feature or its neighboring layout features.

Additionally, different linear-shaped layout features within a given level can be designed to have the same width or different widths. Also, the widths of a number of linear-shaped layout features defined along adjacent lines of a given virtual grate can be designed such that the number of linear-shaped layout features contact each other so as to form a single linear-shaped layout feature having a width equal to the sum of the widths of the number of linear-shaped layout features.

Within a given level defined according to the dynamic array architecture, proximate ends of adjacent, co-aligned linear-shaped layout features may be separated from each other by a substantially uniform gap. More specifically, adjacent ends of linear-shaped layout features defined along a common line of a virtual grate are separated by an end gap, and such end gaps within the level associated with the virtual grate may be defined to span a substantially uniform distance. Additionally, in one embodiment, a size of the end gaps is minimized within a manufacturing process capability so as to optimize filling of a given level with linear-shaped layout features.

Also, in the dynamic array architecture, a level can be defined to have any number of virtual grate lines occupied by any number of linear-shaped layout features. In one example, a given level can be defined such that all lines of its virtual grate are occupied by at least one linear-shaped layout feature. In another example, a given level can be defined such that some lines of its virtual grate are occupied by at least one linear-shaped layout feature, and other lines of its virtual grate are vacant, i.e., not occupied by any linear-shaped layout features. Furthermore, in a given level, any number of successively adjacent virtual grate lines can be left vacant. Also, the occupancy versus vacancy of virtual grate lines by linear-shaped layout features in a given level may be defined according to a pattern or repeating pattern across the given level.

Additionally, within the dynamic array architecture, vias and contacts are defined to interconnect a number of the linear-shaped layout features in various levels so as to form a number of functional electronic devices, e.g., transistors, and electronic circuits. Layout features for the vias and contacts can be aligned to virtual grid, wherein a specification of this virtual grid is a function of the specifications of the virtual grates associated with the various levels to which the vias and contacts will connect. Thus, a number of the linear-shaped layout features in various levels form functional components of an electronic circuit. Additionally, some of the linear-shaped layout features within various levels may be non-functional with respect to an electronic circuit, but are manufactured nonetheless so as to reinforce manufacturing of neighboring linear-shaped layout features. It should be understood that the dynamic array architecture is defined to enable accurate prediction of semiconductor device manufacturability with a high probability.

In view of the foregoing, it should be understood that the dynamic array architecture is defined by placement of linear-shaped layout features on a regular-spaced grate (or regular-spaced grid) in a number of levels of a cell, such that the linear-shaped layout features in a given level of the cell are oriented to be substantially parallel with each other in their traversal direction across the cell. Also, in the dynamic array architecture, prior to PCT processing, each linear-shaped layout feature is defined to be devoid of a substantial change in direction relative to its traversal direction across the cell. Further description of the dynamic array architecture as referenced herein can be found in each of co-pending U.S. patent application Ser. Nos. 11/683,402; 12/013,342; 12/013,356; and 12/013,366, which are incorporated in their entirety herein by reference.

FIG. 1 is an illustration showing an exemplary layout for a level of a cell 101 defined in accordance with the dynamic array architecture, in accordance with one embodiment of the present invention. A number of linear-shaped layout features 105 are placed along virtual lines 103 of a virtual grate associated with the level of the cell 101. The virtual grate is defined by a pitch 107 representing a perpendicular spacing between adjacent virtual lines 103. In this exemplary embodiment, each of the linear-shaped layout features 105 is defined to have a width 109. It should be understood, however, that in other embodiments various linear-shaped layout features in a given level of a cell may be defined to have a number of different widths.

For purposes of description, it should be considered that the pitch 107 of the virtual grate, the width 109 of the linear-shaped features 105, and the occupancy of the virtual grate by the linear-shaped layout features 105, combine such that the layout of the level of the cell 101 is outside a fabrication capability of a given semiconductor fabrication process. Therefore, to facilitate fabrication of the level of the cell 101, the layout can be split into a number of sub-layouts, such that each of the number of linear-shaped layout features 105 in the layout is allocated to any one of the number of sub-layouts, and such that each sub-layout is independently fabricatable within the fabrication capability of the given semiconductor fabrication process.

In one embodiment, a layout including linear-shaped layout features defined in accordance with the dynamic array architecture is split by allocating sidewardly adjacent layout features to different sub-layouts. It should be understood that allocation of sidewardly adjacent layout features to different sub-layouts can be applied with any number of sub-layouts. For example, in the case of double patterning in which two sub-layouts are used, every other layout feature in the layout for the level of the cell is allocated to a common sub-layout. In this case, identification of every other layout feature is made in accordance with a direction perpendicular to a traversal direction of the layout features across the cell.

Figure 2A:
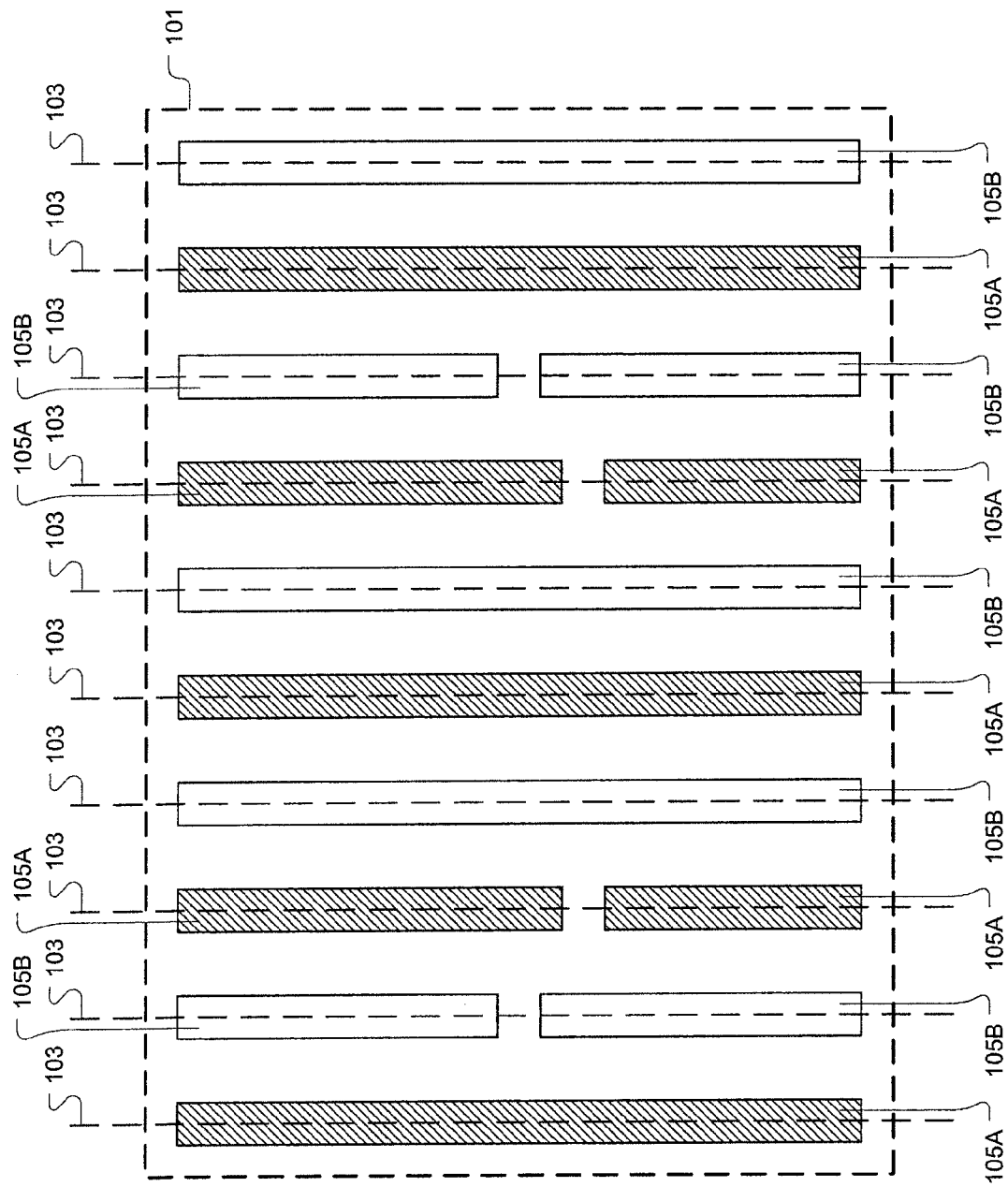
FIG. 2A is an illustration showing a splitting of the layout of FIG. 1 into two sub-layouts, in accordance with one embodiment of the present invention.

FIG. 2A is an illustration showing a splitting of the layout of FIG. 1 into two sub-layouts, in accordance with one embodiment of the present invention. Thus, FIG. 2A is an example of double-patterning. A first sub-layout in FIG. 2A includes the layout features 105A. A second sub-layout in FIG. 2A includes the layout features 105B. Therefore, the layout is split such that sidewardly adjacent layout features are allocated to different sub-layouts. More specifically, every other sidewardly adjacent layout feature is allocated to a common sub-layout. Additionally, it should be understood that when multiple linear-shaped layout features are placed in a co-aligned manner on a common virtual grate line, e.g., virtual grate line 103, each of the multiple linear-shaped layout features is allocated to the same sub-layout. In other words, each layout feature on a given virtual grate line is allocated to the same sub-layout.

Figure 2B:
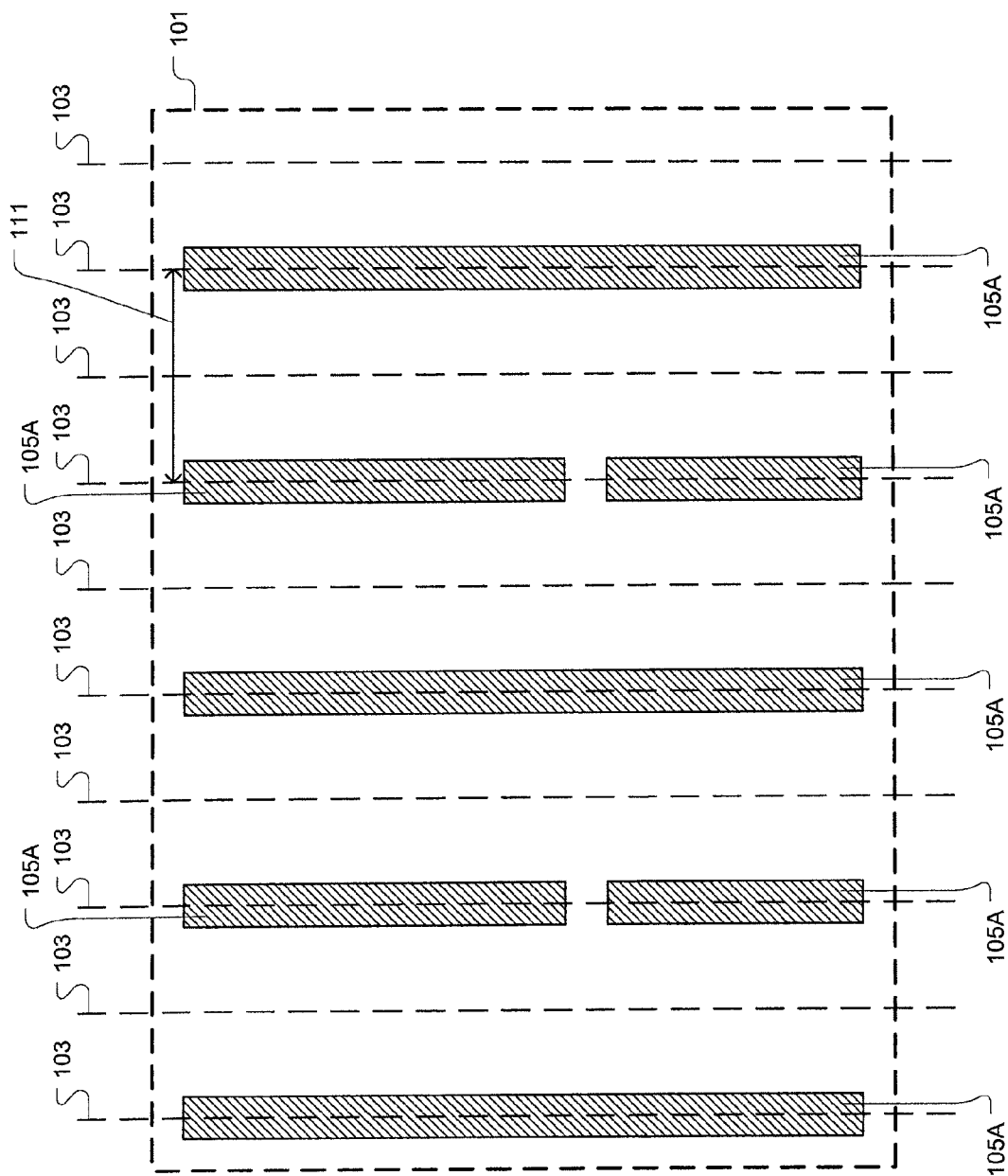
FIG. 2B is an illustration showing the first sub-layout as defined in the layout splitting of FIG. 2A, in accordance with one embodiment of the present invention.
Figure 2C:
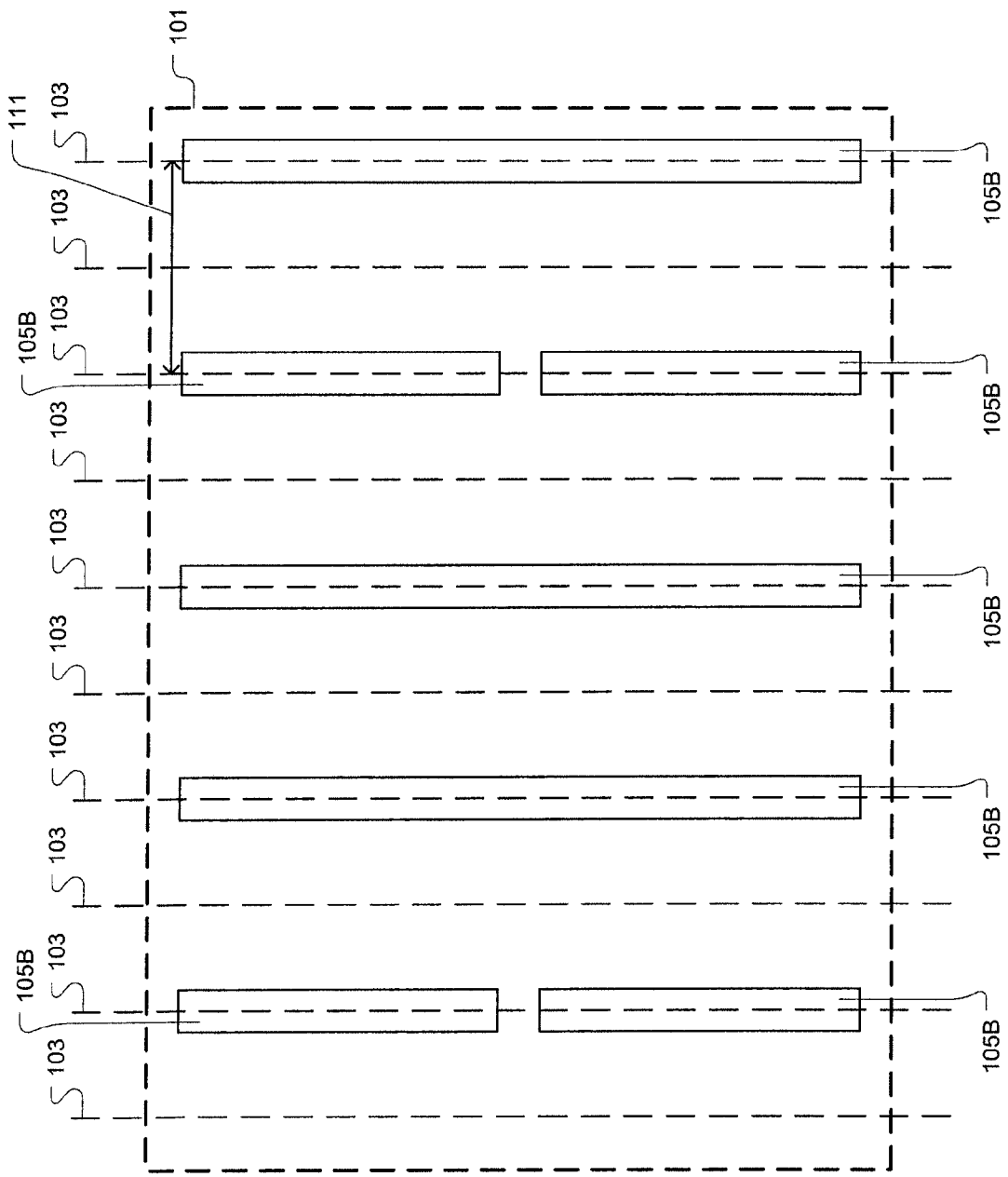
FIG. 2C is an illustration showing the second sub-layout as defined in the layout splitting of FIG. 2A, in accordance with one embodiment of the present invention.

FIG. 2B is an illustration showing the first sub-layout as defined in the layout splitting of FIG. 2A. FIG. 2C is an illustration showing the second sub-layout as defined in the layout splitting of FIG. 2A. It should be understood that each of the first and second sub-layouts of FIGS. 2B and 2C are to fabricated separately on the chip. In the sub-layout of FIG. 2B, adjacent linear-shaped layout features 105A are separated by a distance 111. Similarly, in the sub-layout of FIG. 2C, adjacent linear-shaped layout features 105B are also separated by the distance 111. If the distance 111 is sufficiently large such that each of the first and second sub-layouts is independently fabricatable within the fabrication capability of a given semiconductor fabrication process, then use of two sub-layouts is adequate. However, if the distance 111 is not sufficiently large to enable independent fabrication of the first and second sub-layouts, the layout of FIG. 2A could be split into more than two sub-layouts.

Figure 2D:
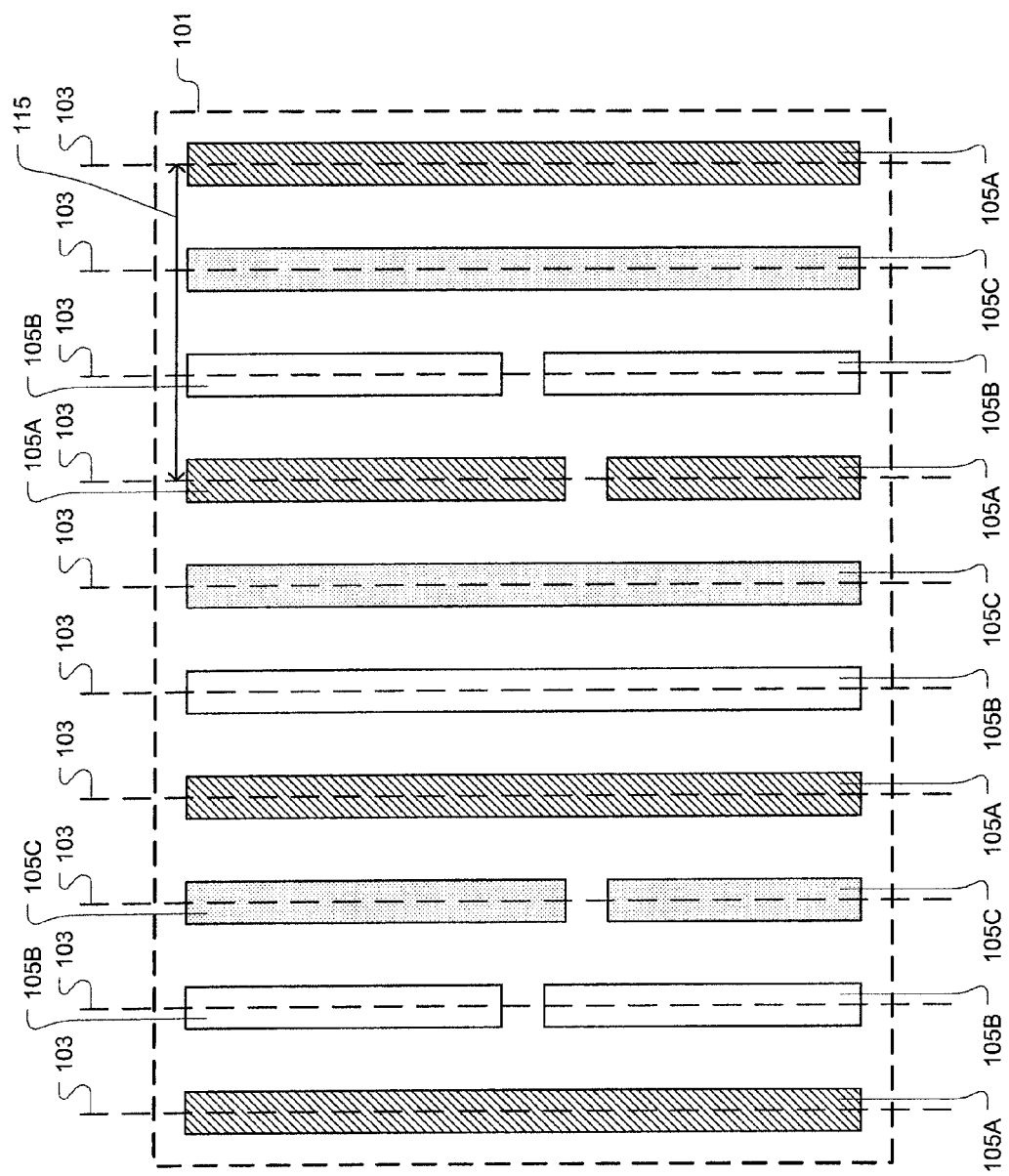
FIG. 2D is an illustration showing the splitting of the layout of FIG. 2A into three sub-layouts, in accordance with one embodiment of the present invention.

FIG. 2D is an illustration showing the splitting of the layout of FIG. 2A into three sub-layouts. A first sub-layout in FIG. 2D includes the layout features 105A. A second sub-layout in FIG. 2D includes the layout features 105B. A third sub-layout in FIG. 2D includes the layout features 105C. It should be appreciated that the distance 115 between adjacent layout features in each of the three sub-layouts of FIG. 2D is larger than the distance 111 in the two sub-layouts of FIGS. 2B and 2C. Therefore, each of the three sub-layouts having the layout feature separation distance 115 should be more likely to fall within the fabrication capability of a given semiconductor fabrication process, as compared to the two sub-layouts having the layout feature separation distance 111. Thus, by splitting the layout of a given level of a cell into multiple sub-layouts, it is possible to resolve smaller layout feature sizes.

It should be understood that a given layout can be split into essentially any number of sub-layouts, wherein each sub-layout for the given level of the cell is to be fabricated separately. Also, in various embodiments, a layout for a given level of a cell can be split into a number of sub-layouts based on layout feature function, layout feature location, or a combination thereof. In one embodiment, layout features sharing a common electrical function can be allocated to a common sub-layout. For example, layout features for active region contacts can be commonly allocated to one sub-layout, and layout features for gate contacts can be commonly allocated to another sub-layout. Also, in one embodiment, layout features for vias can be allocated to sub-layouts in accordance with alternating rows and/or columns of the virtual grid upon which the via layout features are placed.

Once a given layout is split into multiple sub-layouts, each of the sub-layouts can be process compensation technique (PCT) processed separately, as each of the sub-layouts will be exposed separately during the lithography process. As used herein, a process compensation technique (PCT) refers to essentially any processing or adjustment of an integrated circuit (IC) layout for the purpose of improving or ensuring successful fabrication of the features defined by the IC layout. Examples of various PCTs include optical proximity correction (OPC), resolution enhancement techniques (RET), etch proximity compensation, gap fill compensation (e.g., use of dielectric or metal to fill gaps), chemical mechanical planarization (CMP) compensation, among others. It should be understood that the term PCT processing, as used herein, refers to any existing or future form of IC layout processing used to improve or ensure successful fabrication of features defined by the IC layout.

Figure 3:
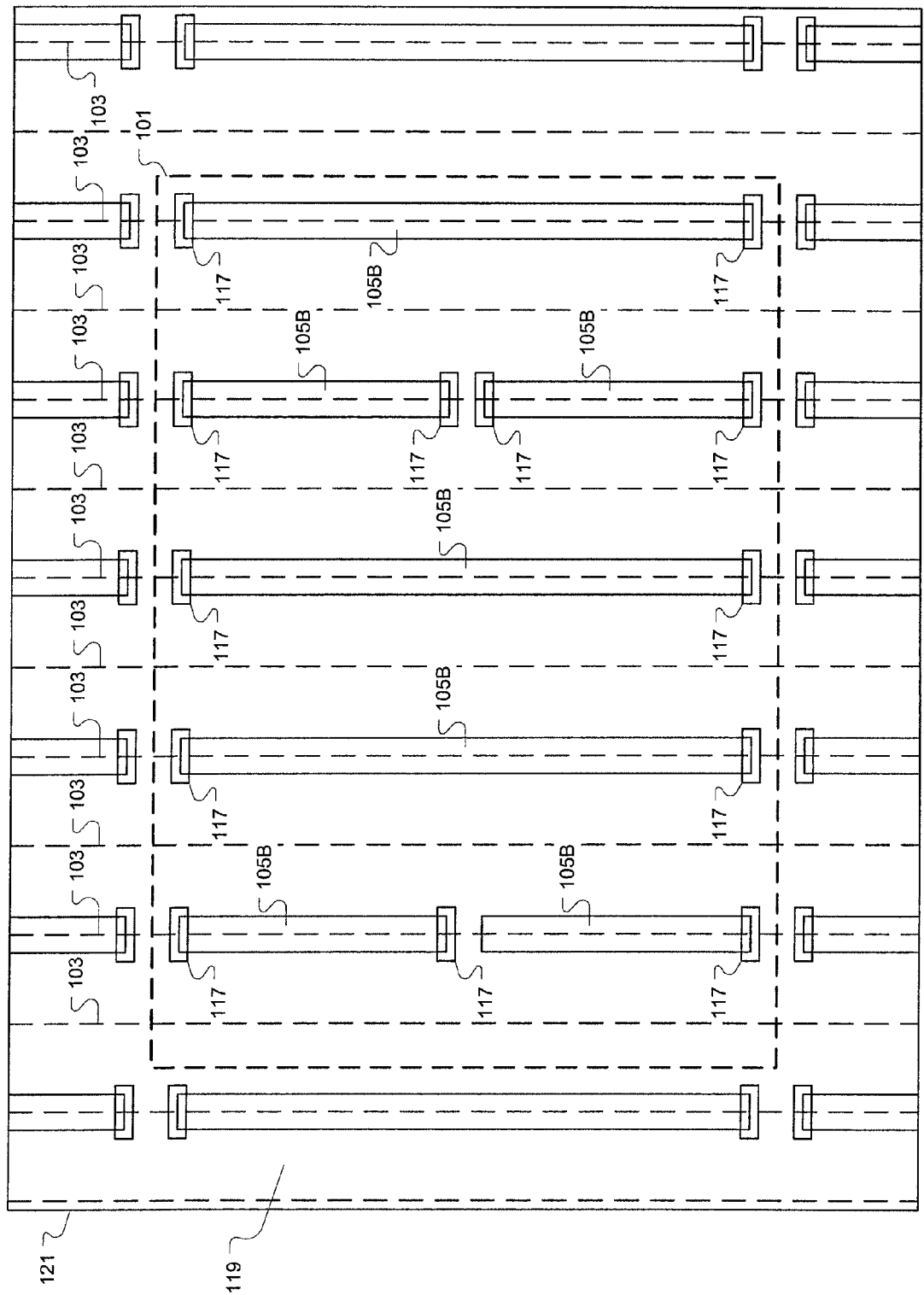
FIG. 3 is an illustration showing a PCT processed version of the sub-layout of FIG. 2C, in accordance with one embodiment of the present invention.

FIG. 3 is an illustration showing a PCT processed version of the sub-layout of FIG. 2C, in accordance with one embodiment of the present invention. A number of OPC shapes 117 are placed at various ends of the linear-shaped layout features 105B as part of the PCT processing of the sub-layout. In performing the PCT processing on a given sub-layout, a lithographic buffer region ("litho-buffer" hereafter) 119 is defined around the cell 101 to simulate a chip environment in which the sub-layout for the level of the cell 101 may be placed and fabricated. Generally speaking, a litho-buffer associated with a given sub-layout for a cell level is defined to include a number of features that simulate the neighborhood in which the sub-layout for the cell level will be placed during fabrication on the chip. The size of the litho-buffer for a given cell level is defined by the outward extent of the litho-buffer from the cell. For example, in FIG. 3, the litho-buffer 119 extends outward from the cell 101 to a boundary 121. The size of the litho-buffer for a given cell level is set such that the litho-buffer covers an area capable of lithographically influencing fabrication of the sub-layout in the given cell level.

In one embodiment, a litho-buffer for a cell level defined in accordance with the dynamic array architecture can be defined by surrounding the cell level with duplicate instantiations of itself. However, in another embodiment, the litho-buffer for the cell level defined in accordance with the dynamic array architecture can be defined in a more generalized manner to include a "blanket" of linear features which approximate those present in the cell level. For example, the blanket of linear features can be defined to include a number of linear features placed according to an extension of the virtual grate/virtual grid utilized within the cell level, and according to an extension of the sub-layout of the cell level. Additionally, in the dynamic array architecture, it should be appreciated that PCT corrections may be primarily intended to maintain the line width of each linear-shaped layout feature in critical regions. Therefore, the PCT corrections can be relatively simple, such as one-dimensional corrections similar to those provided by the OPC shapes 117 in FIG. 3. Further description of PCT processing of a given level of a cell can be found in co-pending U.S. patent application Ser. No. 12/033,807, which is incorporated in its entirety herein by reference.

For each layout that is split into a number of sub-layouts, a particular sub-layout sequence can be specified. The sub-layout sequence is defined by allocating an edge layout feature of the layout to a particular sub-layout and by allocating sidewardly adjacent layout features, relative to a direction extending across the layout away from the edge layout feature, according to a fixed ordering of the number of sub-layouts. Because each sub-layout sequence is based on allocation of an edge layout feature to a particular sub-layout, the number of possible sub-layout sequences is equal to the number of sub-layouts into which the layout is split.

FIGS. 4A-4C are illustrations showing possible sub-layout sequences for a layout that is split into three sub-layouts, in accordance with one embodiment of the present invention. In each of FIGS. 4A-4C, the three sub-layouts are designed by the letters A, B, and C, respectively. Also, in each of FIGS. 4A-4C, the fixed ordering of the number of sub-layouts is specified as A-B-C. Therefore, FIG. 4A shows a first sub-layout sequence in which the left edge layout feature 401 is allocated to sub-layout A, and the fixed ordering of sub-layouts (A-B-C) is applied to sidewardly adjacent features based on the allocation of the left edge layout feature 401 to sub-layout A. FIG. 4B shows a second sub-layout sequence in which the left edge layout feature 401 is allocated to sub-layout B, and the fixed ordering of sub-layouts (A-B-C) is applied to sidewardly adjacent features based on the allocation of the left edge layout feature 401 to sub-layout B. FIG. 4C shows a third sub-layout sequence in which the left edge layout feature 401 is allocated to sub-layout C, and the fixed ordering of sub-layouts (A-B-C) is applied to sidewardly adjacent features based on the allocation of the left edge layout feature 401 to sub-layout C.

Figure 5E:
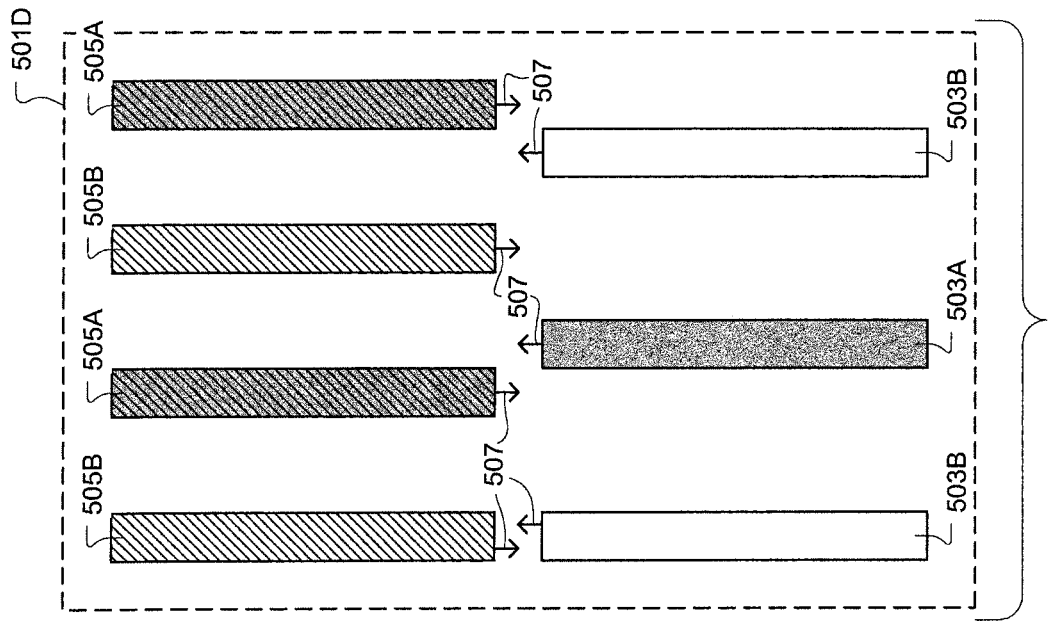

A number of variants of a cell can be generated by specifying different combinations of sub-layout sequences across the various levels of the cell. For example, FIG. 5A is an illustration showing a gate level layout and metal 2 level layout for a cell 501, in accordance with one embodiment of the present invention. For ease of illustration, gate level layout features 503 and metal 2 level layout features 505 are abbreviated in their traversal direction across the cell 501 to avoid obscuring each other. However, it should be understood that each gate level feature 503 and each metal 2 level feature 505 extends across the cell 501, as indicated by arrows 507.

In the present example, the gate level layout is split into two sub-layouts. Similarly, the metal 2 level layout is split into two sub-layouts. For ease of description, it is assumed that no other levels of the cell 501 are split into sub-layouts. FIGS. 5B-5E are illustrations showing different variants of the cell 501. The gate level layout is split into two sub-layouts identified as 503A and 503B, respectively. The metal 2 level layout is split into two sub-layouts identified as 505A and 505B, respectively. Because the gate level layout is split into two sub-layouts, there are two possible sub-layout sequences for the gate level, i.e., 503A-503B, and 503B-503A. Also, because the metal 2 level layout is split into two sub-layouts, there are two possible sub-layout sequences for the metal 2 level layout, i.e., 505A-505B, and 505B-505A. Therefore, in considering the combination of sub-layout sequences across the levels of the cell 501, four variants of the cell 501 can be generated based on unique sub-layout sequence combinations.

Figure 5D:
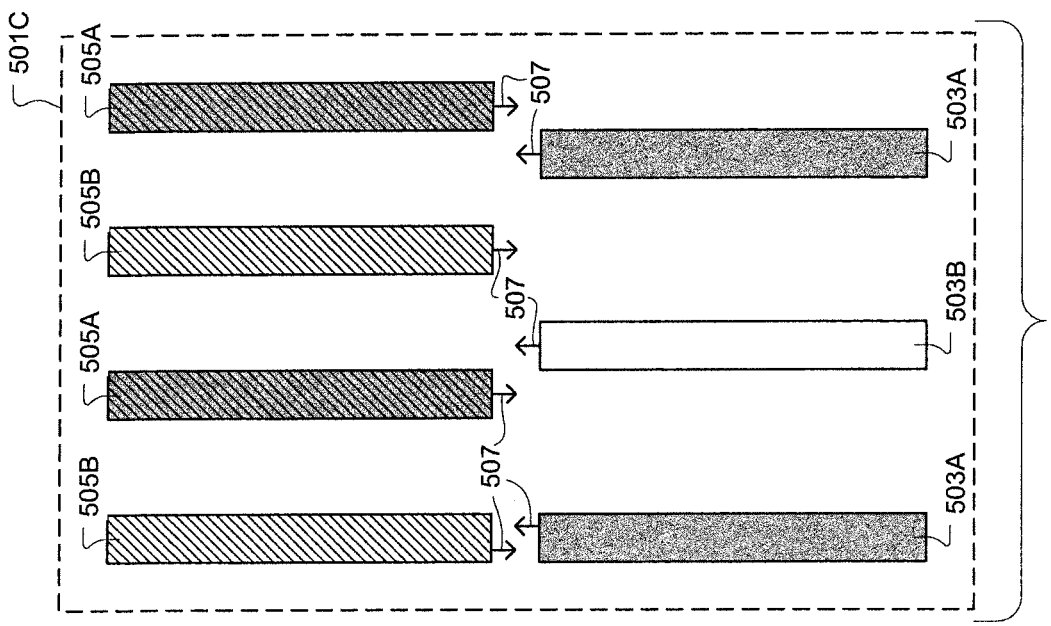

FIG. 5A shows a cell variant 501A in which the combination of sub-layout sequences applied across the levels of the cell 501 is defined by 503A-503B for the gate level and 505A-505B for the metal 2 level. FIG. 5B shows a cell variant 501B in which the combination of sub-layout sequences applied across the levels of the cell 501 is defined by 503B-503A for the gate level and 505A-505B for the metal 2 level. FIG. 5C shows a cell variant 501C in which the combination of sub-layout sequences applied across the levels of the cell 501 is defined by 503A-503B for the gate level and 505B-505A for the metal 2 level. FIG. 5D shows a cell variant 501D in which the combination of sub-layout sequences applied across the levels of the cell 501 is defined by 503B-503A for the gate level and 505B-505A for the metal 2 level.

Figure 5F:
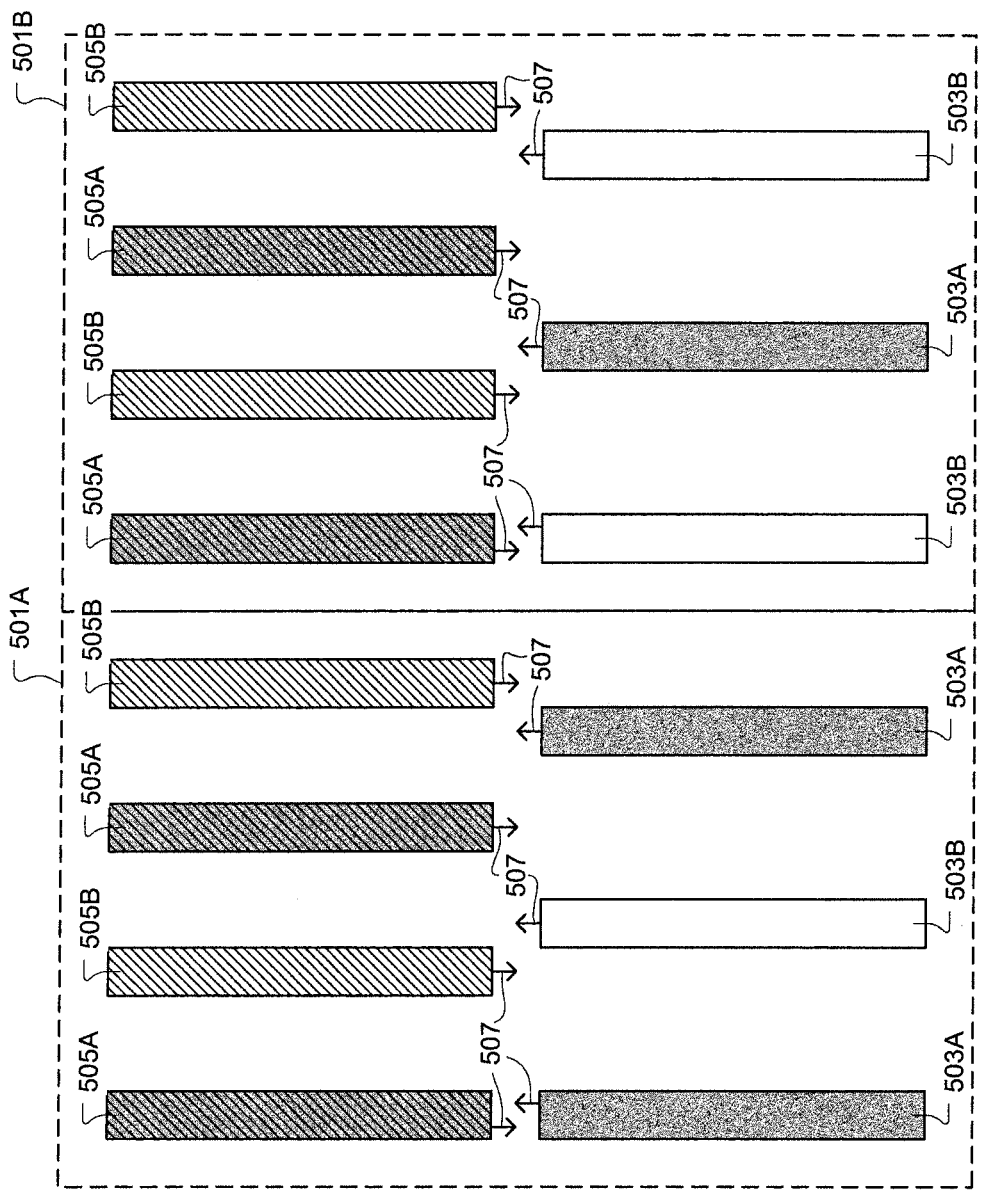
FIG. 5F-5G are illustrations showing placement of cell variants next to each other such that the sub-layout patterns for multiple levels extend across the cell boundaries, in accordance with one embodiment of the present invention.
Figure 5G:
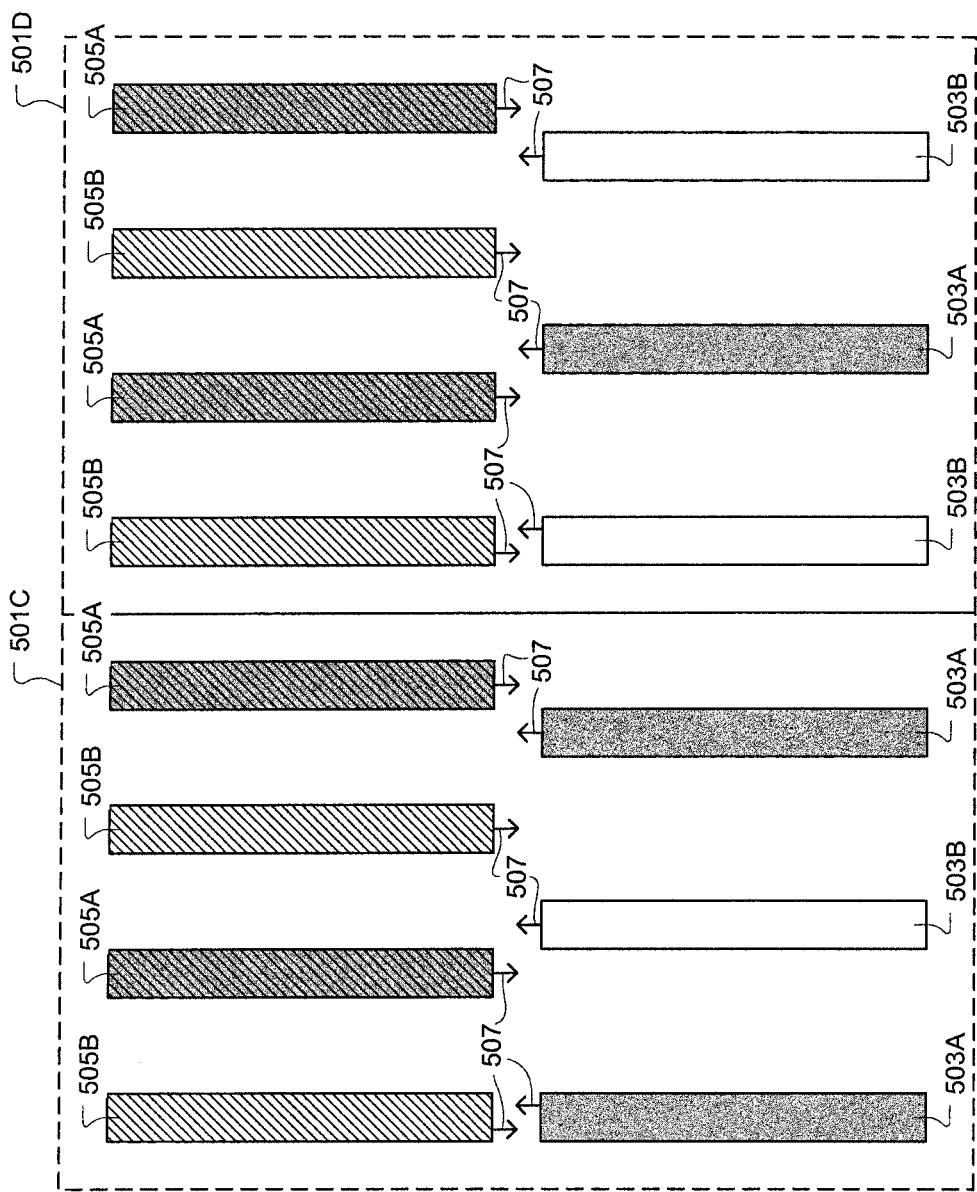

Because a chip-wide mask is used to fabricate a conglomeration of cells, a given sub-layout pattern should extend across cell boundaries. Therefore, a cell variant having an appropriate sub-layout sequence in each level thereof should be placed next to another cell when the chip-wide layout is placed and routed, such that the sub-layout pattern for a given level extends across cell boundaries. For example, FIG. 5F is an illustration showing placement of cell variant 501B next to cell variant 501A such that the sub-layout patterns for the gate level and the metal 2 level extend across the cell boundaries. Also, FIG. 5G is an illustration showing placement of cell variant 501D next to cell variant 501C such that the sub-layout patterns for the gate level and the metal 2 level extend across the cell boundaries.

The splitting of various layouts of a cell into multiple sub-layouts can be built into the cell library. Through use of the dynamic array architecture, it is possible to split a layout of a given cell level into multiple sub-layouts as the cell library is being created. Also, each variant of a given cell can be stored in the cell library, wherein each cell variant corresponds to a unique combination of sub-layout sequences applied across the levels of the given cell. Thus, during placing and routing of the chip, appropriate cell variants can be selected from the cell library for placement on the chip to ensure that chip-level layout patterns are maintained across the chip. In one embodiment, a router used to place and route the chip is defined to understand how the various layouts for each level of the chip are split, thereby enabling placement of cells such that sub-layouts for a given level align and extend across cell boundaries.

In one embodiment, chip-wide layout splitting of a given level is accomplished by placing appropriate cell variants during the chip place and route process, without considering the chip-wide layout as a whole. In another embodiment, chip-wide layout splitting of a given level can be performed following the chip place and route process. It should be appreciated that in this embodiment, definition of the various cells in accordance with the dynamic array architecture serves to significantly improve the ease by which the chip-wide layout can be split. Each chip-wide sub-layout for a given level is defined on a respective mask. The masks for the various sub-layouts of each level of the chip are stored as layout data files to be sent to the mask fabrication facility. The layout data files can be formatted as GDS II (Graphic Data System) database files, OASIS (Open Artwork System Interchange Standard) database files, or any other type of date file format that can be understood by the mask fabrication facility.

Figure 6A:
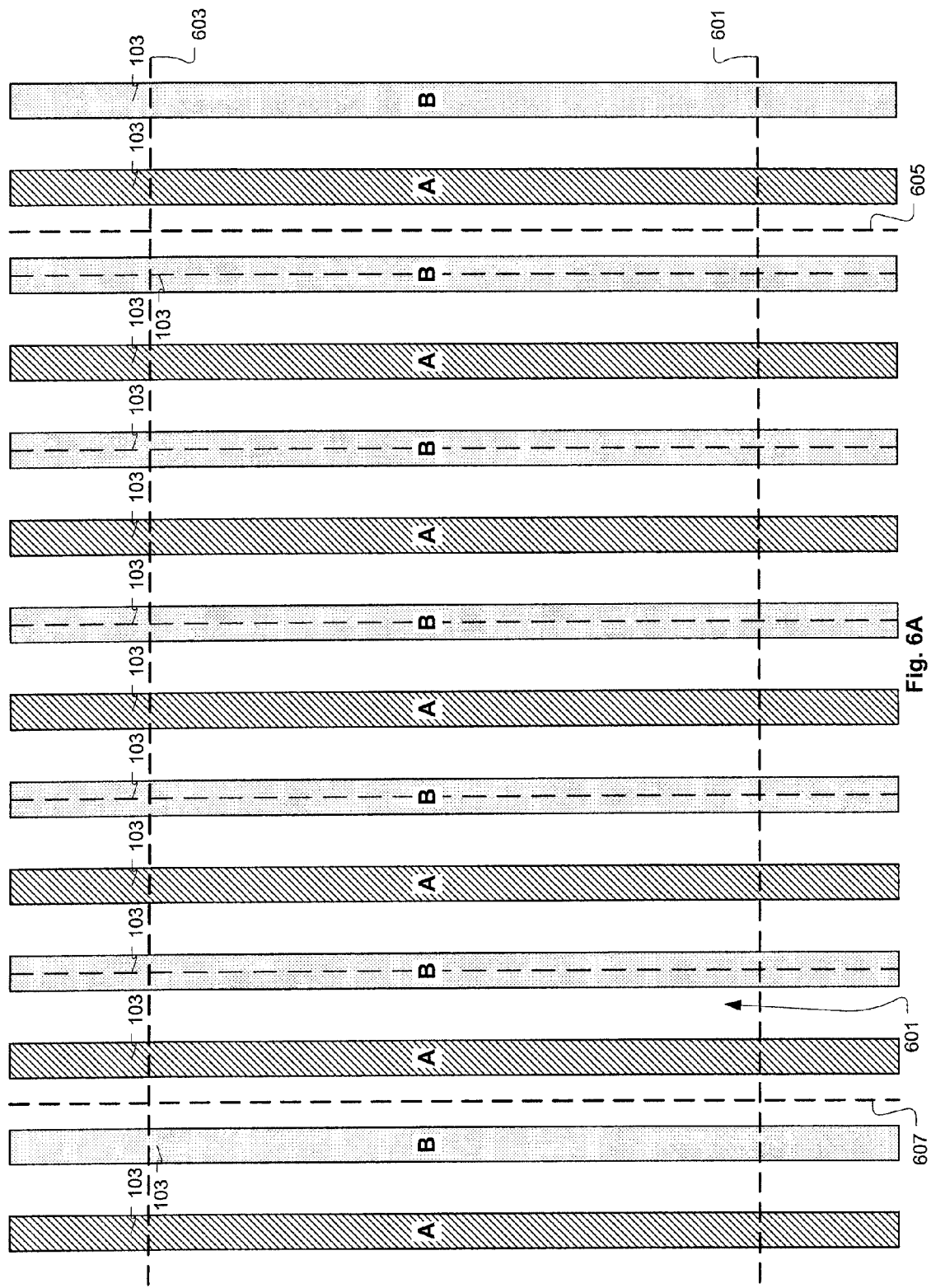
FIG. 6A is an illustration showing a non-segmented layout of a level of a cell, in accordance with one embodiment of the present invention.
Figure 6C:
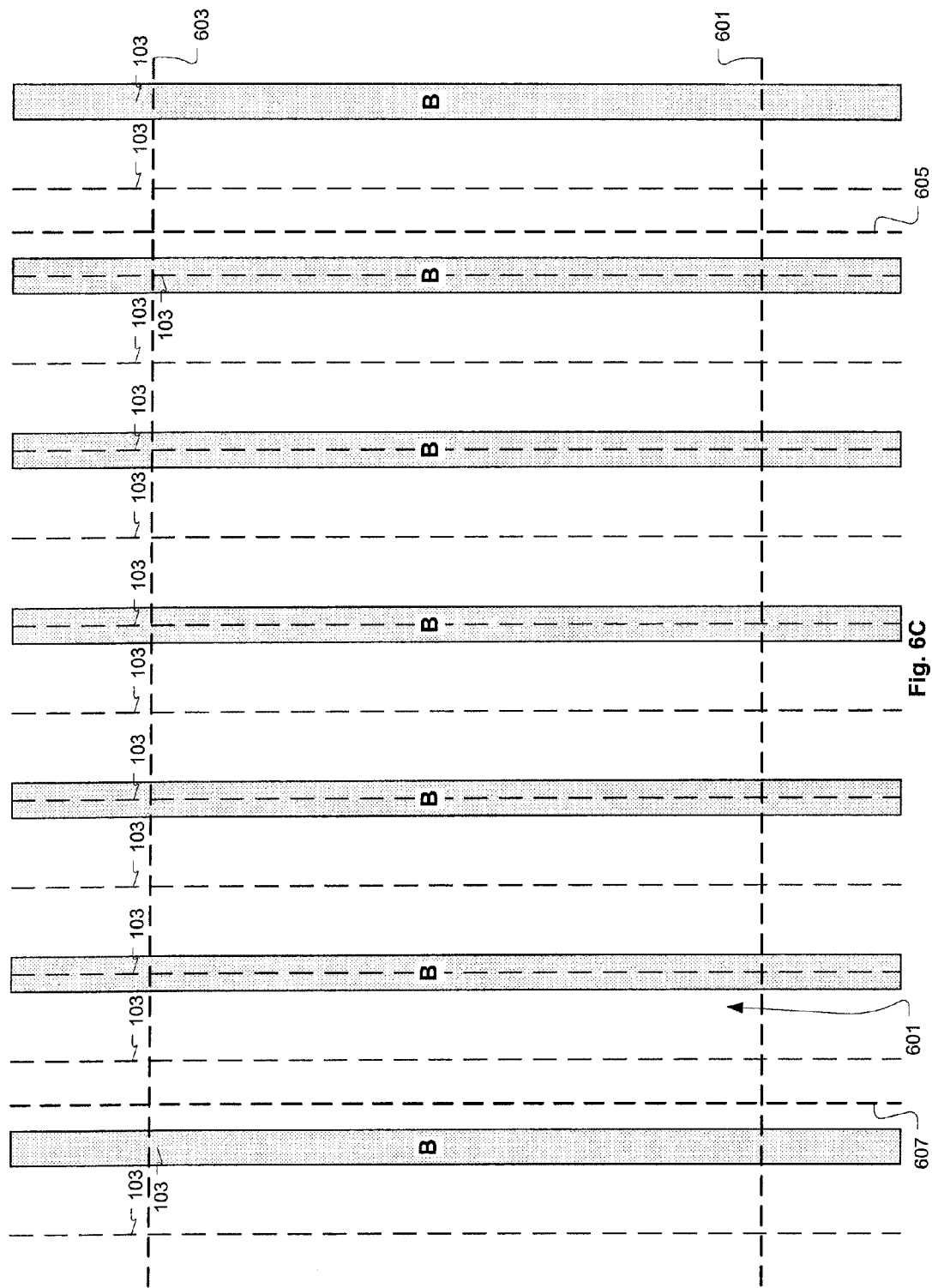
FIG. 6C is an illustration showing a second non-segmented sub-layout including the linear-shaped layout features designated by the label B in FIG. 6A, in accordance with one embodiment of the present invention.

In another embodiment, multiple patterning can be used to implement a line cutting technique for segmentation of a layout defined in accordance with the dynamic array architecture. FIG. 6A is an illustration showing a non-segmented layout of a level of a cell 601, in accordance with one embodiment of the present invention. In the non-segmented layout, each linear-shaped layout feature is defined to extend continuously across the layout, including across cell boundaries. The non-segmented layout can be split into a number of sub-layouts. In the example of FIG. 6A, the non-segmented layout is split into two sub-layouts designated by labels A and B, respectively. FIG. 6B is an illustration showing a first non-segmented sub-layout including the linear-shaped layout features designated by the label A. FIG. 6C is an illustration showing a second non-segmented sub-layout including the linear-shaped layout features designated by the label B. Each of the first and second non-segmented sub-layouts are fabricated separately on the same level of the chip.

Figure 6D:
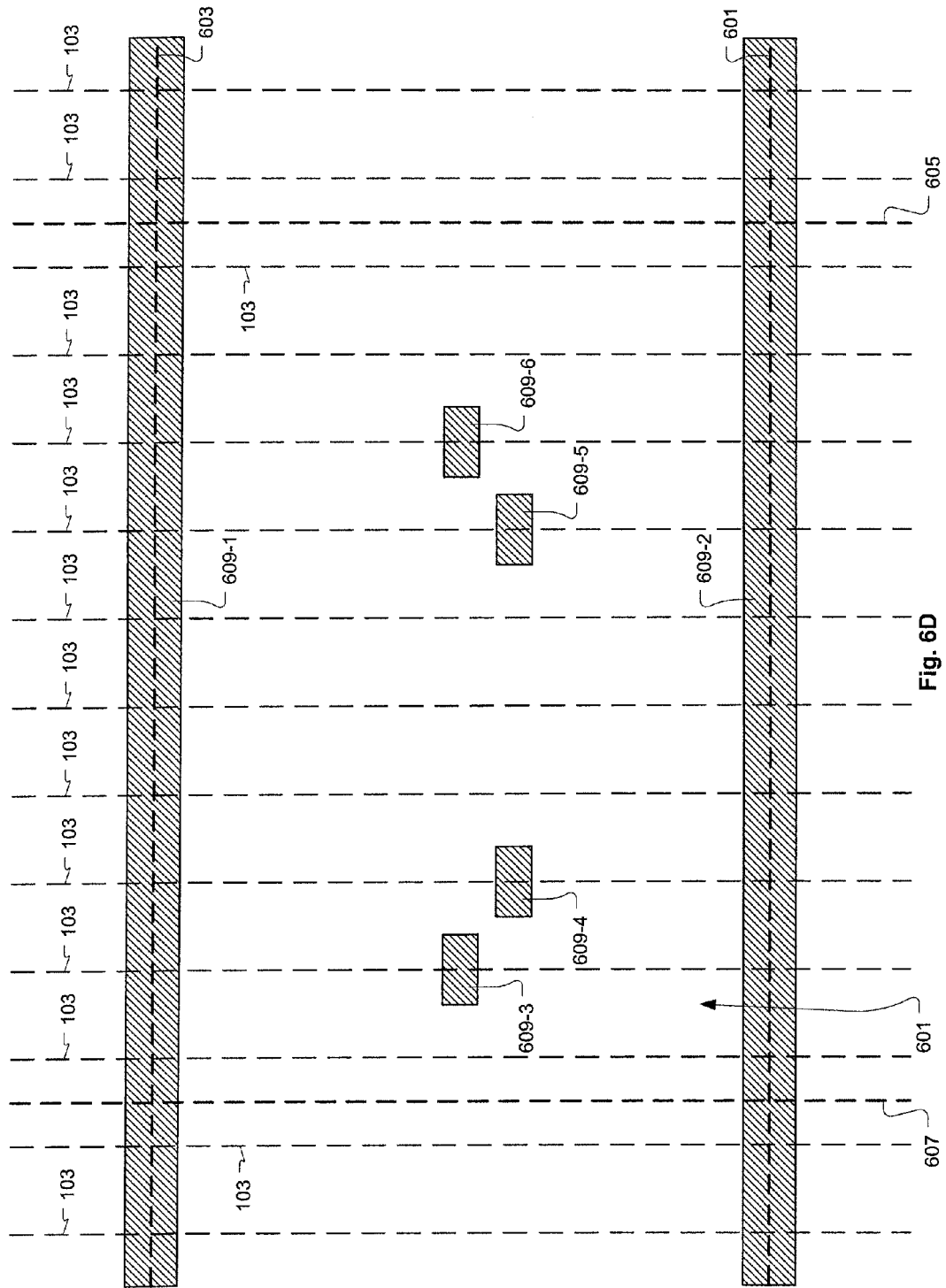
FIG. 6D is an illustration showing a layout to be used for cutting the linear-shaped features as fabricated by the first and second non-segmented sub-layouts of FIGS. 6B and 6C, in accordance with one embodiment of the present invention.

FIG. 6D is an illustration showing a layout to be used for cutting the linear-shaped features as fabricated by the first and second non-segmented sub-layouts of FIGS. 6B and 6C. The layout of FIG. 6D includes layout features 609-1 and 609-2 for line cutting at the cell 601 boundary. Also, layout features 609-3 through 609-6 are provided for segmentation of linear features within the cell 601. The layout of FIG. 6D is defined to cut the linear-shaped features as fabricated by the first and second non-segmented sub-layouts of FIGS. 6B and 6C, so as to enable electrical connectivity necessary for the logic function of the cell 601. FIG. 6E is an illustration showing the level of the cell 601 following the line cutting by the layout of FIG. 6D.

In one embodiment, a set of masks are generated for fabricating a common level of a semiconductor chip in accordance with the line cutting technique illustrated by FIGS. 6A-6E. The set of masks includes a first mask having an area defined in accordance with a dynamic array architecture to include a first number of linear layout features defined to extend continuously across the area of the first mask. The first number of linear layout features are commonly oriented. Also, each of the first number of linear layout features is devoid of a substantial change in traversal direction across the first mask. The first number of linear layout features form a first sub-layout, wherein the first sub-layout defines a first portion of one or more cells.

The set of masks also includes a second mask having an area defined in accordance with the dynamic array architecture to include a second number of linear layout features defined to extend continuously across the area of the second mask. The second number of linear layout features are commonly oriented with the first number of linear layout features of the first mask. Each of the second number of linear layout features is devoid of a substantial change in traversal direction across the second mask. The area of the second mask defined in accordance with the dynamic array architecture is to be aligned with the area of the first mask defined in accordance with the dynamic array architecture, thereby causing the second number of linear layout features to be interleaved with the first number of linear layout features. The second number of linear layout features form a second sub-layout, wherein the second sub-layout defines a second portion of the one or more cells.

The set of masks also includes a third mask having an area defined to include a third number of linear layout features. The third number of linear layout features are oriented to be substantially perpendicular to both the first and second number of linear layout features, when the area of the third mask is aligned with the areas of the first and second masks. The third number of linear layout features are defined to provide for cutting of a portion of the first and second number of linear layout features, so as to segment the first and second number of linear layout features to enable electrical connectivity necessary for the logic function of each of the one or more cells. It should be understood that enumeration of the above-mentioned masks as "first," "second," and "third" is provided for purposes of mask differentiation and is not intended to convey an absolute number of a given mask.

Also, in another embodiment, the non-segmented layout of FIG. 6A can be formed using a self-aligned double patterning (SADP) process, in lieu of using the separate sub-layout masks of FIGS. 6B and 6C. In this embodiment, the cutting layout, i.e., cut mask, of FIG. 6D can be used to cut the non-segmented layout features formed using the SADP process, so as to yield the layout shown in FIG. 6E. Also, it should be appreciated that the SADP process in this embodiment can be extended to a self-aligned quadruple patterning (SAQP) process, and beyond.

In one embodiment, multiple patterning, as described herein, is performed by separately loading different sub-layouts for a given level into a stepper. In this embodiment, alignment between the layout features of the different sub-layouts should be performed accurately to ensure proper spacing between layout features in the given level. In another embodiment, multiple patterning is performed using a double exposure technique in which multiple sub-layouts can be exposed on a wafer with a single alignment of the wafer to the scanner optical column. In one embodiment, the double exposure technique can be performed with each of multiple sub-layouts on a respective mask. In another embodiment, if the chip size allows, the double exposure technique can be performed with each of the multiple sub-layouts on the same mask, with an offset between the sub-layouts.

Moreover, it should be appreciated that use of the dynamic array architecture assists with alignment of sub-layouts when fabricating a given level of the chip. For example, in one embodiment, alignment in the direction along the length of the linear-shaped layout features may be more relaxed relative to alignment in the perpendicular direction extending between layout features. Also, given the parallelism of the linear-shaped layout features in a given level, proper rotational alignment of the sub-layouts for the given level may be more easily identified.

Figure 7:
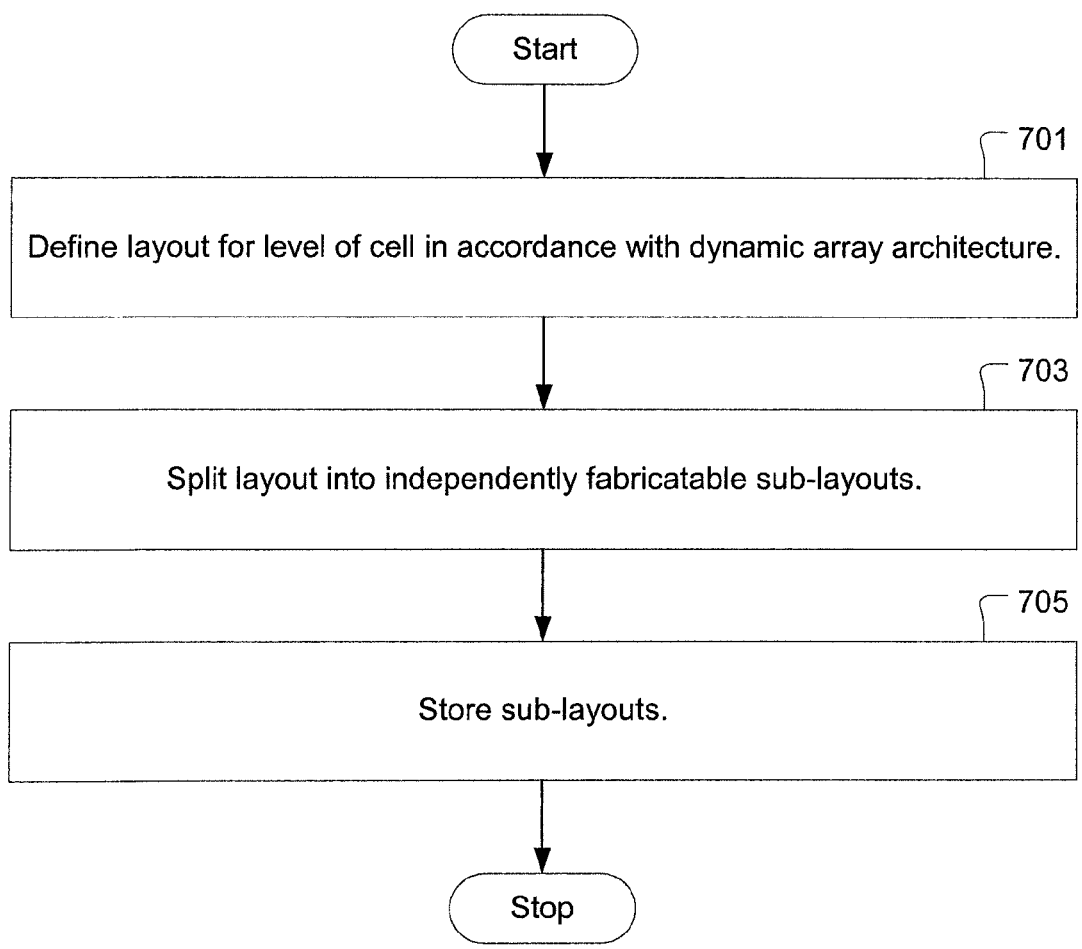
FIG. 7 is an illustration showing a flowchart of a method for defining a multiple patterned cell layout for use in an integrated circuit design, in accordance with one embodiment of the present invention.

FIG. 7 is an illustration showing a flowchart of a method for defining a multiple patterned cell layout for use in an integrated circuit design, in accordance with one embodiment of the present invention. The method includes an operation 701 for defining a layout for a level of a cell, wherein the layout is defined in accordance with a dynamic array architecture to include a number of layout features. The number of layout features are linear-shaped and commonly oriented. The method also includes an operation 703 for splitting the layout into a number of sub-layouts for the level of the cell, such that each of the number of layout features in the layout is allocated to any one of the number of sub-layouts, and such that each sub-layout is independently fabricatable.

In one embodiment, a size of the layout features and a spacing between adjacent layout features in the layout for the level of the cell, prior to the splitting of operation 703, are outside a fabrication capability of a given semiconductor fabrication process. However, the size of the layout features and a spacing between adjacent layout features in each sub-layout for the level of the cell, after the splitting of operation 703, are within the fabrication capability of the given semiconductor fabrication process.

In one embodiment, sidewardly adjacent layout features in the layout for the level of the cell are allocated to different sub-layouts. In one embodiment, layout features sharing a common electrical function in the layout for the level of the cell are allocated to a common sub-layout. In one embodiment, layout features for active region contacts are commonly allocated to one sub-layout, and layout features for gate contacts are commonly allocated to another sub-layout. In one embodiment, every other layout feature in the layout for the level of the cell is allocated to a common sub-layout, wherein an identification of every other layout feature is made in accordance with a direction perpendicular to a traversal direction of the layout features across the cell.

The method further includes an operation 705 for storing the number of sub-layouts for the level of the cell on a computer readable medium. It should be understood that each sub-layout for the level of the cell is to be fabricated separately within a common area of a chip. Additionally, operations 701-705 are repeated for a number of levels of the cell.

In one embodiment, the method can also include an operation for defining a sub-layout sequence for the level of the cell by allocating an edge layout feature of the level of the cell to a particular sub-layout, and by allocating sidewardly adjacent layout features (relative to a direction extending across the level of the cell away from the edge layout feature) according to a fixed ordering of the number of sub-layouts for the level of the cell. In this embodiment, the method can further include an operation for generating a number of variants of the cell, wherein each variant of the cell is defined by a unique combination of sub-layout sequences applied across levels of the cell. Each variant of the cell can be stored in a cell library on a computer readable medium.

Additionally, in one embodiment of the method, PCT processing can be performed on each sub-layout to generate a PCT processed version each sub-layout. The PCT processed version of each sub-layout can be stored in a cell library on a computer readable medium. In this embodiment, the PCT processing is performed on a given sub-layout by defining a lithographic buffer region around the given sub-layout. The lithographic buffer region is defined to include a number of features that simulate a neighborhood of the given sub-layout around the cell when placed on a chip.

Figure 8:
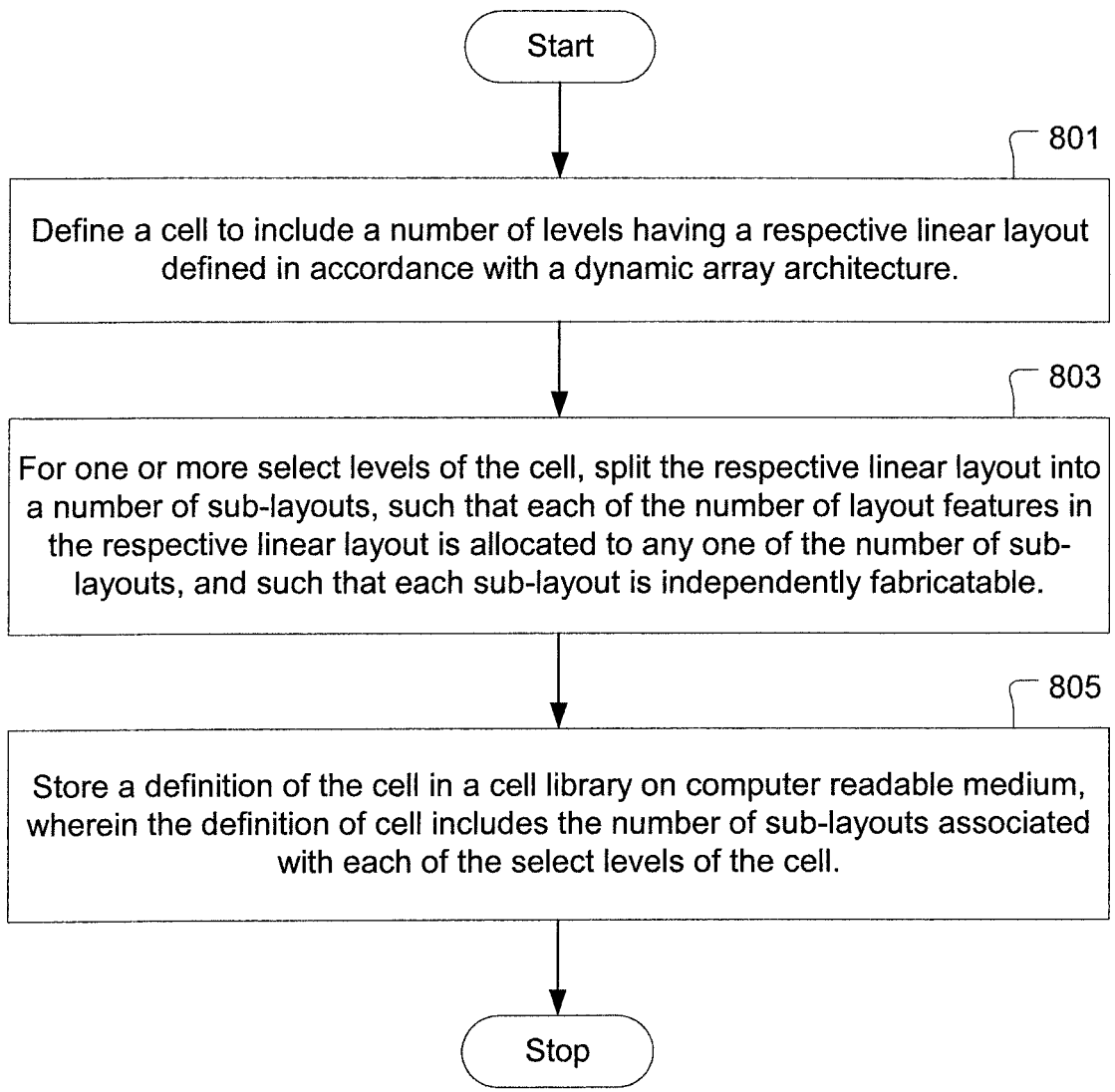
FIG. 8 is an illustration showing a flowchart of a method for creating a cell library for multiple patterning of a chip layout, in accordance with one embodiment of the present invention.

FIG. 8 is an illustration showing a flowchart of a method for creating a cell library for multiple patterning of a chip layout, in accordance with one embodiment of the present invention. The method includes an operation 801 for defining a cell to include a number of levels having a respective linear layout defined in accordance with a dynamic array architecture. The method also includes an operation 803 in which, for one or more select levels of the cell, the respective linear layout is split into a number of sub-layouts, such that each of the number of layout features in the respective linear layout is allocated to any one of the number of sub-layouts, and such that each sub-layout is independently fabricatable. The method further includes an operation 805 for storing a definition of the cell in a cell library on a computer readable medium. The definition of the cell includes the number of sub-layouts associated with each of the select levels of the cell.

In one embodiment, the method of FIG. 8 further includes an operation for generating a number of variants of the cell. Each variant of the cell is defined by a unique combination of sub-layout sequences applied across the select levels of the cell. A sub-layout sequence for a given level of the cell is defined by allocating an edge layout feature of the given level of the cell to a particular sub-layout, and by allocating sidewardly adjacent layout features (relative to a direction extending across the given level of the cell away from the edge layout feature) according to a fixed ordering of the number of sub-layouts for the given level of the cell. In this embodiment, each variant of the cell is stored in the cell library on the computer readable medium.

Also, in one embodiment, the method of FIG. 8 can include an operation for PCT processing each sub-layout to generate a PCT processed version of each sub-layout. In this embodiment, the PCT processed version of each sub-layout is stored in the cell library on the computer readable medium. Additionally, in one embodiment, prior to being split into the number of sub-layouts in operation 803, each linear layout is outside a fabrication capability of a given semiconductor fabrication process. However, in this embodiment, after splitting of the linear layout in operation 803, each of the number of sub-layouts is within the fabrication capability of the given semiconductor fabrication process.

Figure 9:
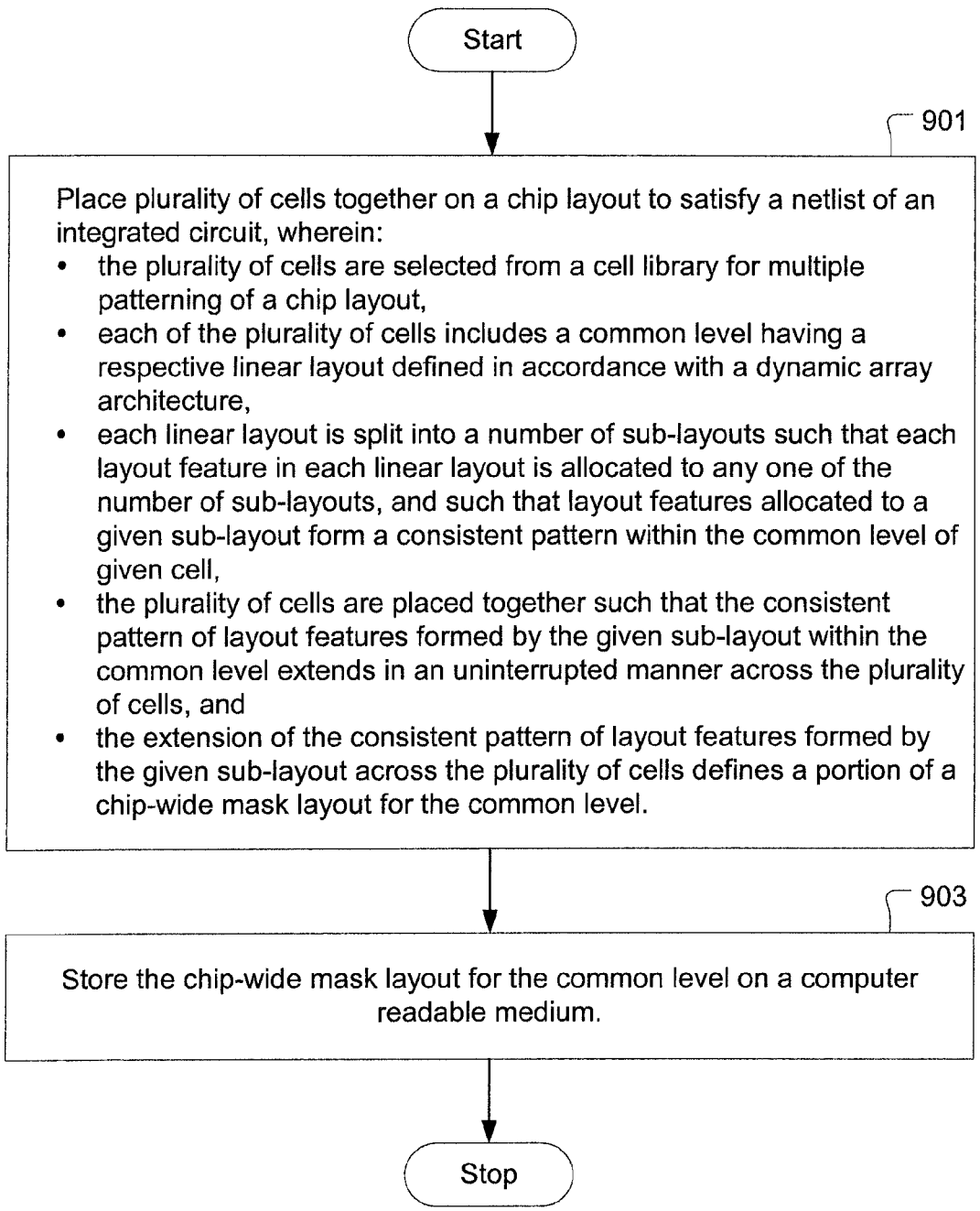
FIG. 9 is an illustration showing a flowchart of a method for designing an integrated circuit for fabrication, in accordance with one embodiment of the present invention.

FIG. 9 is an illustration showing a flowchart of a method for designing an integrated circuit for fabrication, in accordance with one embodiment of the present invention. The method includes an operation 901 for placing a plurality of cells together on a chip layout to satisfy a netlist of the integrated circuit. In operation 901, the plurality of cells are selected from a cell library for multiple patterning of the chip layout.

Each of the plurality of cells includes a common level having a respective linear layout defined in accordance with a dynamic array architecture. Also, each linear layout is split into a number of sub-layouts, such that each layout feature in each linear layout is allocated to any one of the number of sub-layouts, and such that layout features allocated to a given sub-layout form a consistent pattern within the common level of a given cell.

Also, the plurality of cells are placed together in operation 901 such that the consistent pattern of layout features formed by the given sub-layout within the common level extends in an uninterrupted manner across the plurality of cells. Moreover, the extension of the consistent pattern of layout features formed by the given sub-layout across the plurality of cells defines a portion of a chip-wide mask layout for the common level. Additionally, each sub-layout is defined on a separate chip-wide mask layout for the common level, wherein each chip-wide mask layout is to be independently fabricated in a co-aligned manner on the common level. The method further includes an operation 903 for storing the chip-wide mask layout for the common level on a computer readable medium.

The invention described herein can be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Additionally, a graphical user interface (GUI) implemented as computer readable code on a computer readable medium can be developed to provide a user interface for performing any embodiment of the present invention.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for defining a multiple patterned cell layout for use in an integrated circuit design, comprising:
    defining a layout for a level of a cell, the layout defined by a number of linear-shaped layout features commonly oriented to extend lengthwise in a same direction, each of the number of linear-shaped layout features devoid of a substantial change in direction along its length;
    splitting the layout into a plurality of sub-layouts for the level of the cell, such that each of the number of linear-shaped layout features in the layout is allocated to any one of the plurality of sub-layouts, and wherein each of the plurality of sub-layouts is defined on a separate mask, and wherein each separate mask for the plurality of sub-layouts corresponds to a same portion of the level of the cell; and
    storing the plurality of sub-layouts for the level of the cell in a digital data format on a data storage device.

2. A method for defining a multiple patterned cell layout for use in an integrated circuit design as recited in claim 1, wherein a size of the linear-shaped layout features and a spacing between adjacent ones of the linear-shaped layout features in the layout for the level of the cell are outside a fabrication capability of a given semiconductor fabrication process, and
    wherein the size of the linear-shaped layout features and a spacing between adjacent ones of the linear-shaped layout features in each sub-layout for the level of the cell are within the fabrication capability of the given semiconductor fabrication process.

3. A method for defining a multiple patterned cell layout for use in an integrated circuit design as recited in claim 1, wherein each sub-layout for the level of the cell is to be fabricated separately within a common area of a chip.

4. A method for defining a multiple patterned cell layout for use in an integrated circuit design as recited in claim 1, wherein the cell represents an abstraction of a logic function and encapsulates lower-level integrated circuit layouts for implementing the logic function.

5. A method for defining a multiple patterned cell layout for use in an integrated circuit design as recited in claim 1, wherein sidewardly adjacent ones of the linear-shaped layout features in the layout for the level of the cell are allocated to different sub-layouts.

6. A method for defining a multiple patterned cell layout for use in an integrated circuit design as recited in claim 1, wherein linear-shaped layout features sharing a common electrical function in the layout for the level of the cell are allocated to a common sub-layout.

7. A method for defining a multiple patterned cell layout for use in an integrated circuit design as recited in claim 6, wherein linear-shaped layout features for active region contacts are commonly allocated to one sub-layout, and wherein linear-shaped layout features for gate contacts are commonly allocated to another sub-layout.

8. A method for defining a multiple patterned cell layout for use in an integrated circuit design as recited in claim 1, wherein every other linear-shaped layout feature in the layout for the level of the cell is allocated to a common sub-layout, wherein an identification of every other linear-shaped layout feature is made in accordance with a direction perpendicular to a lengthwise traversal direction of the linear-shaped layout features across the cell.

9. A method for defining a multiple patterned cell layout for use in an integrated circuit design as recited in claim 1, further comprising:
    repeating the defining, splitting, and storing for a number of levels of the cell.

10. A method for defining a multiple patterned cell layout for use in an integrated circuit design as recited in claim 1, further comprising:
    defining a sub-layout sequence for the level of the cell by allocating an edge layout feature of the level of the cell to a particular sub-layout and by allocating sidewardly adjacent ones of the linear-shaped layout features relative to a direction extending across the level of the cell away from the edge layout feature according to a fixed ordering of the plurality of sub-layouts for the level of the cell, wherein a number of possible sub-layout sequences for the level of the cell is equal to the number of the plurality of sub-layouts for the level of the cell.

11. A method for defining a multiple patterned cell layout for use in an integrated circuit design as recited in claim 10, further comprising:
    generating a number of variants of the cell, wherein each variant of the cell is defined by a unique combination of sub-layout sequences applied across levels of the cell; and storing each variant of the cell in a cell library on a data storage device for storing data to be read by a computer system.

12. A method for defining a multiple patterned cell layout for use in an integrated circuit design as recited in claim 1, further comprising:
performing process compensation technique (PCT) processing on each sub-layout to generate a PCT processed version of each sub-layout; and
storing the PCT processed version of each sub-layout in a cell library on a data storage device for storing data to be read by a computer system.

13. A method for defining a multiple patterned cell layout for use in an integrated circuit design as recited in claim 12, wherein the PCT processing is performed on a given sub-layout by defining a lithographic buffer region around the given sub-layout, wherein the lithographic buffer region is defined to include a number of features that simulate a neighborhood of the given sub-layout around the cell when placed on a chip.

14. A method for defining a multiple patterned cell layout for use in an integrated circuit design as recited in claim 1, wherein the substantial change in direction of a given linear-shaped layout feature exists when a width of the given linear-shaped layout feature changes at any point thereon by more than 50% of a nominal width of the given linear-shaped layout feature along its entire length.

15. A method for defining a multiple patterned cell layout for use in an integrated circuit design as recited in claim 1, wherein the substantial change in direction of a given linear-shaped layout feature exists when a width of the given linear-shaped layout feature changes from any first location on the given linear-shaped layout feature to any second location on the given linear-shaped layout feature by more that 50% of the width of the given linear-shaped layout feature at the first location.

16. A method for creating a cell library for multiple patterning of a chip layout, comprising:
defining a cell to include a number of levels having a respective linear layout defined by a number of linear-shaped layout features commonly oriented to extend lengthwise in a same direction, each of the number of linear-shaped layout features devoid of a substantial change in direction along its length, wherein the cell represents an abstraction of a logic function and encapsulates lower-level integrated circuit layouts for implementing the logic function;
splitting the respective linear layout of a given level of the cell into a plurality of sub-layouts, such that each of the number of linear-shaped layout features in the respective linear layout of the given level of the cell is allocated to any one of the plurality of sub-layouts, and wherein each of the plurality of sub-layouts is defined on a separate mask, and wherein each separate mask for the plurality of sub-layouts corresponds to a same portion of the given level of the cell; and
storing a definition of the cell in a cell library in a digital data format on a data storage device, wherein the definition of the cell includes the plurality of sub-layouts associated with the given level of the cell.

17. A method for creating a cell library for multiple patterning of a chip layout as recited in claim 16, further comprising:
generating a number of variants of the cell, wherein each variant of the cell is defined by a unique combination of sub-layout sequences applied across one or more levels of the cell, wherein a sub-layout sequence for a particular level of the cell is defined by allocating an edge layout feature of the particular level of the cell to a first sub-layout and by allocating sidewardly adjacent ones of the linear-shaped layout features relative to a direction extending across the particular level of the cell away from the edge layout feature according to a fixed ordering of the plurality of sub-layouts for the particular level of the cell, wherein a number of possible sub-layout sequences for the particular level of the cell is equal to the plurality of sub-layouts into which the particular level of the cell is split; and
storing each variant of the cell in the cell library on the data storage device.

18. A method for defining a multiple patterned cell layout for use in an integrated circuit design as recited in claim 16, further comprising:
performing process compensation technique (PCT) processing on each sub-layout to generate a PCT processed version of each sub-layout; and
storing the PCT processed version of each sub-layout in the cell library on the data storage device.

19. A method for defining a multiple patterned cell layout for use in an integrated circuit design as recited in claim 16, wherein each linear layout prior to being split into the plurality of sub-layouts is outside a fabrication capability of a given semiconductor fabrication process, and wherein each of the plurality of sub-layouts is within the fabrication capability of the given semiconductor fabrication process.

20. A method for designing an integrated circuit for fabrication, comprising:
placing a plurality of cells together on a chip layout to satisfy a netlist of an integrated circuit,
wherein the plurality of cells are selected from a cell library for multiple patterning of the chip layout,
wherein each of the plurality of cells includes a common level having a respective linear layout defined by a number of linear-shaped layout features commonly oriented to extend lengthwise in a same direction, each of the number of linear-shaped layout features devoid of a substantial change in direction along its length,
wherein each linear layout is split into a plurality of sub-layouts such that each linear-shaped layout feature in each linear layout is allocated to any one of the plurality of sub-layouts, and such that linear-shaped layout features allocated to a given sub-layout form a consistent pattern within the common level of a given cell,
wherein the plurality of cells are placed together such that the consistent pattern of linear-shaped layout features formed by the given sub-layout within the common level extends in an uninterrupted manner across the plurality of cells, and
wherein the extension of the consistent pattern of linear-shaped layout features formed by the given sub-layout across the plurality of cells defines a portion of a chip-wide mask layout for the common level,
wherein each sub-layout is defined on a separate chip-wide mask layout for the common level; and
storing the chip-wide mask layout for the common level in a digital data format on a data storage device.

21. A method for designing an integrated circuit for fabrication as recited in claim 20, wherein every other linear-shaped layout feature in each linear layout is allocated to a common sub-layout, wherein every other linear-shaped layout feature is defined relative to a direction extending perpendicular to a lengthwise traversal direction of the linear-shaped layout features across the common level.

22. A method for designing an integrated circuit for fabrication as recited in claim 20, wherein each chip-wide mask layout is to be independently fabricated in a co-aligned manner on the common level.

23. A set of masks for fabricating a common level of a semiconductor chip, comprising:

a first mask having an area defined to include a first number of linear-shaped layout features commonly oriented to extend lengthwise in a same direction, and wherein each of the first number of linear-shaped layout features is devoid of a substantial change in its lengthwise traversal direction across the first mask, wherein the first number of linear-shaped layout features form a first sub-layout, wherein the first sub-layout defines a first portion of one or more cells, wherein each of the one or more cells represents an abstraction of a logic function and encapsulates lower-level integrated circuit layouts for implementing the logic function; and a second mask having an area defined to include a second number of linear-shaped layout features, wherein the second number of linear-shaped layout features are commonly oriented to extend lengthwise in the same direction as the first number of linear-shaped layout features, and wherein each of the second number of linear-shaped layout features is devoid of a substantial change in its lengthwise traversal direction across the second mask, wherein the area of the second mask is to be aligned with the area of the first mask, wherein the second number of linear-shaped layout features form a second sub-layout, and wherein the second sub-layout defines a second portion of the one or more cells.

24. A set of masks for fabricating a common level of a semiconductor chip as recited in claim 23, wherein the second number of linear-shaped layout features are interleaved with the first number of linear-shaped layout features when the area of the second mask is aligned with the area of the first mask.

25. A set of masks for fabricating a common level of a semiconductor chip as recited in claim 23, further comprising:

a third mask having an area defined to include a third number of linear-shaped layout features, the third number of linear-shaped layout features oriented to be substantially perpendicular to both the first and second number of linear-shaped layout features when the area of the third mask is aligned with the areas of the first and second masks, wherein the third number of linear-shaped layout features are defined to provide for cutting of a portion of the first and second number of linear-shaped layout features so as to segment the first and second number of linear-shaped layout features to enable electrical connectivity necessary for the logic function of each of the one or more cells.

26. A set of masks for fabricating a common level of a semiconductor chip as recited in claim 25, wherein the first number of linear-shaped layout features is defined to extend continuously across the area of the first mask, and wherein the second number of linear-shaped layout features is defined to extend continuously across the area of the second mask.

* * * * *